US006584447B1

(12) United States Patent
Fox et al.

(10) Patent No.: US 6,584,447 B1
(45) Date of Patent: *Jun. 24, 2003

(54) METHOD AND COMPUTER PROGRAM PRODUCT FOR WEATHER ADAPTED, CONSUMER EVENT PLANNING

(75) Inventors: Frederic D. Fox, Wayne, PA (US); Douglas R. Pearson, Wyomissing Hills, PA (US); Barb Frutchy Senst, Oreland, PA (US); Tim Brown, West Chester, PA (US); Syd Weinstein, Huntington, PA (US)

(73) Assignee: Planalytics, Inc., Wayne, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/126,950

(22) Filed: Jul. 31, 1998

Related U.S. Application Data

(63) Continuation-in-part of application No. 09/907,714, filed on Jun. 16, 1998, which is a continuation of application No. 08/588,248, filed on Jan. 18, 1996, now Pat. No. 5,832,456.

(51) Int. Cl.[7] .............................................. G06F 17/60
(52) U.S. Cl. .............................. 705/10; 705/7; 705/8; 705/9; 705/1; 705/500
(58) Field of Search ............................ 705/10, 1, 500, 705/9, 7, 8

(56) References Cited

U.S. PATENT DOCUMENTS

| 3,808,410 A | | 4/1974 | Schlesinger ................. 235/156 |
|---|---|---|---|
| 4,015,366 A | | 4/1977 | Hall, III ........................... 47/1 |
| 4,218,755 A | | 8/1980 | Root ........................... 364/900 |
| 4,642,775 A | * | 2/1987 | Cline et al. .................. 701/200 |
| 4,766,539 A | | 8/1988 | Fox ............................. 364/401 |

(List continued on next page.)

FOREIGN PATENT DOCUMENTS

| JP | 1-236396 | | 9/1989 | ............. G07G/1/14 |
|---|---|---|---|---|
| JP | 1-259488 | | 10/1989 | ............. G07G/1/12 |
| JP | 2-268396 | | 11/1990 | ............. G07G/1/14 |
| JP | 2-299059 | | 12/1990 | ........... G06F/15/20 |
| JP | 4-77896 | | 3/1992 | ............. G07G/1/12 |
| JP | 9128411 A | * | 5/1997 | ........... G06F/17/60 |

OTHER PUBLICATIONS

Gagne, James, 'Fair–weather trends', May 1997, American Demographics, pp. 1–5.*

Rao, S.R.;Thomas, Edward G; Javalgi, Rajshekhar G., 'Activity Preferences and Trip–Planning Behavior of the U.S. Outbound Pleasure Travel Market', Winter, 1992, Journal of Travel Research, pp 1–12.*

(List continued on next page.)

Primary Examiner—Tariq R. Hafiz
Assistant Examiner—Akiba Robinson-Boyce
(74) Attorney, Agent, or Firm—Sterne, Kessler, Goldstein & Fox P.L.L.C.

(57) ABSTRACT

A system and method for forecasting future retail performance are described herein. The system includes a storage device that stores a sales history database, a weather history database, and a weather forecast database. An analyzer determines the extent to which past retail performance of a plurality of products at a plurality of locations was affected by weather using the sales history database and the weather history database. A configurator, coupled to the analyzer, estimates expected future retail performance of the products at the stores for a plurality of future time periods using the weather forecast database and results produced by the analyzer. A graphical user interface, coupled to the analyzer and the configurator, enables users to view and manipulate results produced by the analyzer and the configurator to thereby forecast future retail performance of the products at the locations. In an embodiment of the present invention, a consumer weather planner system allows consumers to perform weather-based planning for future events (e.g., golfing, vacations, weddings, etc.).

8 Claims, 53 Drawing Sheets

U.S. PATENT DOCUMENTS

| | | | | |
|---|---|---|---|---|
| 4,784,150 | A | | 11/1988 | Voorhies et al. ............ 128/664 |
| 5,063,506 | A | | 11/1991 | Brockwell et al. .......... 364/402 |
| 5,128,861 | A | | 7/1992 | Kagami et al. ............. 364/403 |
| 5,128,862 | A | | 7/1992 | Mueller ...................... 364/405 |
| 5,130,925 | A | | 7/1992 | Janes et al. ................. 364/420 |
| 5,140,523 | A | | 8/1992 | Frankel et al. .............. 364/420 |
| 5,168,445 | A | | 12/1992 | Kawashima et al. ........ 364/403 |
| 5,189,606 | A | | 2/1993 | Burns et al. ................ 364/401 |
| 5,208,665 | A | | 5/1993 | McCalley et al. ............ 358/86 |
| 5,237,496 | A | | 8/1993 | Kagami et al. ............. 364/401 |
| 5,250,941 | A | | 10/1993 | McGregor et al. ..... 340/825.25 |
| 5,253,165 | A | | 10/1993 | Leiseca et al. .............. 364/407 |
| 5,253,181 | A | | 10/1993 | Marui et al. .................. 716/17 |
| 5,283,865 | A | | 2/1994 | Johnson ...................... 395/161 |
| 5,295,064 | A | | 3/1994 | Malec et al. ................ 364/401 |
| 5,295,069 | A | | 3/1994 | Hersey et al. ......... 364/419.17 |
| 5,309,355 | A | | 5/1994 | Lockwood .................. 364/401 |
| 5,491,629 | A | | 2/1996 | Fox et al. ....................... 702/3 |
| 5,521,813 | A | | 5/1996 | Fox et al. ....................... 705/8 |
| 5,712,985 | A | | 1/1998 | Lee et al. ....................... 705/7 |
| 5,796,932 | A | | 8/1998 | Fox et al. .................... 345/326 |
| 5,855,006 | A | | 12/1998 | Huemoeller et al. ........... 705/9 |
| 5,983,200 | A | * | 11/1999 | Slotznick ..................... 705/26 |
| 6,018,640 | A | | 1/2000 | Blackman et al. .......... 399/364 |
| 6,035,285 | A | | 3/2000 | Schlect et al. ................ 705/30 |

OTHER PUBLICATIONS

'Urilicorp's Aquila energy to Greatly Expand it's Weather Hedging Products', Nov. 20, 1997, McGraw–Hill Publications, vol. 17, No. 1, p. 4.*
wysiwyg://171/http://www.aquilaenergy.com/northamerica/about/.*
http://www.bysb.com/sponsors/weathr.htm.*
Brennan, P.J., "Portfolio Managers Weather Global Risk Management Challenge," *Wall Street Computer Review*, Dealer's Digest, pp. 20–22, 24, 54 and 56 (Oct. 1989).
Ehrenberg, A.S.C. et al., "The After–Effects of Price–Related Consumer Promotions", *Journal of Advertising Research*, Advertising Research Foundation, vol. 34, No. 4, pp. 11–21 (Jul./Aug. 1994).
Engle, R.F. et al., "Modeling Peak Electricity Deman", *Journal of Forecasting*, John Wiley & Sons, vol. 11, No. 3, pp. 241–251 (Apr. 1992).
Jensen, C. and Anderson, L. *Harvard Graphics: The Complete Reference*, Obsborne McGraw–Hill, pp. 5, 16, 17, 126–129 and 737–747 (1990).
Mithcell, R. et al., "Where No Computer Has Gone Before: Massively Parallel Processing Promises Unparalleled Performance," *Business Week*, McGraw–Hill, 80–84 and 88 (Nov. 25, 1991).
English–language Abstract of Japanese Patent Publication No. 01–236396, from *http://www1.ipdl.jpo.go.jp*, 2 Pages (Sep. 21, 1989 –Date of publication of application).

English–language Abstract of Japanese Patent Publication No. 01–259488, from *http://www1.ipdl.jpo.go.jp*, 2 Pages (Oct. 17, 1989 –Date of publication of application).
English–language Abstract of Japanese Patent Publication No. 02–268396, from *http://www1.ipdl.jpo.go.jp*, 2 Pages (Nov. 2, 1990 –Date of publication of application).
English–language Abstract of Japanese Patent Publication No. 02–299059, from *http://www1.ipdl.jpo.go.jp*, 2 Pages (Dec. 11, 1990 –Date of publication of application).
English–language Abstract of Japanese Patent Publication No. 04–077896, from *http://www1.ipdl.jpo.go.jp*, 2 Pages (Mar. 11, 1992 –Date of publication of application).
English–language Abstract of Japanese Patent Publication No. 04–135271, from *http://www1.ipdl.jpo.go.jp*, 2 Pages (May 8, 1992 –Date of publication of application).
English–language Abstract of Japanese Patent Publication No. 04–353970, from *http://www1.ipdl.jpo.go.jp*, 2 Pages (Dec. 8, 1992 –Date of publication of application).
English–language Abstract of Japanese Patent Publication No. 05–189406, from *http://www1.ipdl.jpo.go.jp*, 2 Pages (Jul. 30, 1993 –Date of publication of application).
English–language Abstract of Japanese Patent Publication No. 06–076161, from *http://www1.ipdl.jpo.go.jp*, 2 Pages (Mar. 18, 1994 –Date of publication of application).
English–language Abstract of Japanese Patent Publication No. 06–149833, from *http://www1.ipdl.jpo.go.jp*, 2 Pages (May 31, 1994 –Date of publication of application).
Best, D.L. and Pryor, S.P., *Air Weather Service Model Output Statistics System Project Report*, United States Air Force, Entire Report submitted (Oct. 1983).
Cave, T., "Weather Service Is A Boon To System Dispatchers," *Transmission & Distribution*, Intertec, pp. 165–166 and 168–169 (Aug. 1991).
*Deman Modeling & Forecasting System Product Description*, Printed from DIALOG File No. 256, 1 page (Aug. 1984 – Product Release Date).
*Down to Earth Sales Analysis 3.1 Product Description*, Printed from DIALOG File No. 256, 1 page (Apr. 1989 – Product Release Date).
Hurrell, M., "The Weather Business," *Intercity*, pp. 29, 31 and 32 (Feb. 1991).
*IMREX Demand Forecasing System Product Description*, Printed from DIALOG File No. 256, 1 page (1984 –Product Release Date).
*The Weather Initiative*, (Brochure), The Met Office, 23 pages (1990).
*Microsoft Excel User's Guide*, Microsoft Corporation, pp. 280–281, 596–601 and 706–709 (1992).
*Microsoft Access User's Guide*, Microsoft Corporation, pp. 22–27, 36–39, 326–335, 370–372 and 395–447 (1992).

* cited by examiner

SALES HISTORY 304

| YEAR | PRODUCT | STORE | DATA TYPE | P1 | P2 | P3 | P4 | P5 | P6 |
|------|---------|-----------|-------------|----|----|----|----|----|----|
| 1994 | HATS | STORE 001 | NET DOLLARS | 0 | 0 | 60 | 20 | 40 | 30 |
| 1995 | HATS | STORE 001 | NET DOLLARS | 0 | 0 | 30 | 40 | 70 | 70 |
| 1994 | HATS | STORE 001 | ITEMS SOLD | 0 | 0 | 6 | 2 | 4 | 3 |
| 1995 | HATS | STORE 001 | ITEMS SOLD | 0 | 0 | 3 | 4 | 7 | 7 |

WEATHER HISTORY 306

| YEAR | MA | DATA TYPE | P1 | P2 | P3 | P4 | P5 | P6 |
|---|---|---|---|---|---|---|---|---|
| 1994 | MSA 100 | TEMP.SEA | 46 | 47 | 50 | 51 | 54 | 55 |
| 1995 | MSA 100 | TEMP.SEA | 46 | 47 | 49 | 51 | 53 | 55 |
| 1994 | MSA 100 | SNOW.SEA | 0.7 | 0.2 | 0.2 | 0.1 | 0 | 0.1 |
| 1995 | MSA 100 | SNOW.SEA | 0.8 | 0.2 | 0.2 | 0.1 | 0 | 0 |
| 1994 | MSA 100 | PREC.SEA | 1.01 | 1.03 | 1.08 | 1.1 | 1.12 | 1.1 |
| 1995 | MSA 100 | PREC.SEA | 1.01 | 1.03 | 1.07 | 1.1 | 1.12 | 1.1 |
| 1994 | MSA 100 | SNOW | 0 | 0 | 0 | 0 | 0 | 0 |
| 1995 | MSA 100 | SNOW | 0 | 0.4 | 0.9 | 1.3 | 1.2 | 0.3 |
| 1994 | MSA 100 | PREC | 1.5 | 0.01 | 2.68 | 1.78 | 1.7 | 0.01 |
| 1995 | MSA 100 | PREC | 1.1 | | | | 0.48 | |
| 1994 | MSA 100 | TEMP | 49 | 43 | 45 | 47 | 50 | 42 |
| 1995 | MSA 100 | TEMP | 53 | 51 | 56 | 50 | 58 | 54 |
| 1994 | MSA 100 | TEMP.CAT | -1 | -1 | -1 | -1 | -1 | -1 |
| 1995 | MSA 100 | TEMP.CAT | -1 | -1 | -1 | 0 | -1 | -1 |
| 1994 | MSA 100 | PREC.CAT | -1 | -1 | -1 | -1 | -1 | -1 |
| 1995 | MSA 100 | PREC.CAT | 1 | -1 | 1 | 1 | -1 | -1 |

- TEMPERATURE/PRECIPITATION
    - SEASONAL/SEASONAL
    - SEASONAL/ABOVE SEASONAL
    - SEASONAL/BELOW SEASONAL
    - ABOVE SEASONAL/SEASONAL
    - ABOVE SEASONAL/ABOVE SEASONAL
    - ABOVE SEASONAL/BELOW SEASONAL
    - BELOW SEASONAL/SEASONAL
    - BELOW SEASONAL/ABOVE SEASONAL
    - BELOW SEASONAL/BELOW SEASONAL
- TEMPERATURE/SNOW
    - SEASONAL/SEASONAL
    - SEASONAL/ABOVE SEASONAL
    - SEASONAL/BELOW SEASONAL
    - ABOVE SEASONAL/SEASONAL
    - ABOVE SEASONAL/ABOVE SEASONAL
    - ABOVE SEASONAL/BELOW SEASONAL
    - BELOW SEASONAL/SEASONAL
    - BELOW SEASONAL/ABOVE SEASONAL
    - BELOW SEASONAL/BELOW SEASONAL
- SUSTAINED WEATHER
    - TEMPERATURE SUSTAINED 2 PERIODS
    - TEMPERATURE SUSTAINED 3 PERIODS
    - PRECIPITATION SUSTAINED 2 PERIODS
    - PRECIPITATION SUSTAINED 3 PERIODS
    - SNOW SUSTAINED 2 PERIODS
    - SNOW SUSTAINED 3 PERIODS
- TEMPERATURE/PRECIPITATION LAG 1 PERIOD
    - SEASONAL/SEASONAL
    - SEASONAL/ABOVE SEASONAL
    - SEASONAL/BELOW SEASONAL
    - ABOVE SEASONAL/SEASONAL
    - ABOVE SEASONAL/ABOVE SEASONAL
    - ABOVE SEASONAL/BELOW SEASONAL
    - BELOW SEASONAL/SEASONAL
    - BELOW SEASONAL/ABOVE SEASONAL
    - BELOW SEASONAL/BELOW SEASONAL
- TEMPERATURE/SNOW LAG 1 PERIOD
    - SEASONAL/SEASONAL
    - SEASONAL/ABOVE SEASONAL
    - SEASONAL/BELOW SEASONAL
    - ABOVE SEASONAL/SEASONAL
    - ABOVE SEASONAL/ABOVE SEASONAL
    - ABOVE SEASONAL/BELOW SEASONAL
    - BELOW SEASONAL/SEASONAL
    - BELOW SEASONAL/ABOVE SEASONAL
    - BELOW SEASONAL/BELOW SEASONAL

WEATHER PATTERNS 902

FIG.9

STORE/MA TABLE 1002

| STORE | MA |
|---|---|
| STORE 001 | MSA100 |

FIG.10

| BELOW SEASONAL | -1 |
|---|---|
| SEASONAL | 0 |
| ABOVE SEASONAL | 1 |

WEATHER PATTERN LEGEND 1102

FIG.11

ANALYZER OUTPUT DATA 310

| WEATHER PATTERN | STORE | PRODUCT | POSITIVE COUNT | NEGATIVE COUNT | NO CHANGE COUNT |
|---|---|---|---|---|---|
| t1P1 | STORE 001 | HATS | 1 | 0 | 0 |
| t1S1 | STORE 001 | HATS | 3 | 1 | 0 |
| t1S-1 | STORE 002 | HATS | 2 | 3 | 1 |
| t0S1 | STORE 001 | BOOTS | 0 | 2 | 2 |

FIG.12

CONFIGURATOR OUTPUT DATA 1390

| STORE | PRODUCT | PERIOD 1 COUNTS | PERIOD 1 SCORE | ... | PERIOD N COUNTS | PERIOD N SCORE |
|---|---|---|---|---|---|---|
| STORE 003 | SHOES | $P_1, NEG_1, N_1$ | $SCORE_1$ | ... | $P_N, NEG_N, N_N$ | $SCORE_N$ |

FIG.13C

| YEAR | MA | DATA TYPE | P1 | P2 | P3 | P4 | P5 | P6 | ... |
|---|---|---|---|---|---|---|---|---|---|
| N+1 | MSA 100 | SNOW | 0.9 | 0.4 | 0.3 | 0.2 | 0 | 0 | |
| N+1 | MSA 100 | PREC | 1.1 | 1.05 | 1.05 | 1.00 | 1.15 | 1.2 | |
| N+1 | MSA 100 | TEMP | 48 | 49 | 50 | 53 | 55 | 57 | |
| N+1 | MSA 100 | TEMP.CAT | 1 | 1 | 1 | 1 | 1 | 1 | |
| N+1 | MSA 100 | PREC.CAT | 1 | 1 | -1 | -1 | -1 | -1 | |
| N+1 | MSA 100 | SNOW.CAT | 1 | 0 | 0 | 1 | 0 | 0 | |
| N+1 | MSA 100 | SNOW.SEA | 0.8 | 0.4 | 0.3 | 0.1 | 0 | 0 | |
| N+1 | MSA 100 | PREC.SEA | 1.00 | 1.03 | 1.06 | 1.05 | 1.10 | 1.1 | |
| N+1 | MSA 100 | TEMP.SEA | 47 | 47 | 49 | 52 | 54 | 55 | |

↖ 2202  ↖ 2204    ⟵ WEATHER FORECAST DATA 312

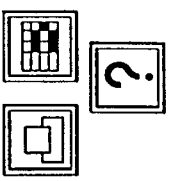

LEWIS REPORT FOR

WASHINGTON, DC

LEWIS WEATHER

|  |  | 11/25/95 | 12/02/95 | 12/09/95 | 12/16/95 | 12/23/95 | 12/30/95 | 1/06/96 |
|---|---|---|---|---|---|---|---|---|
| TEMP | SEAS LY | 45-48<br>47<br>SEAS | 43-45<br>45<br>SEAS | 41-44<br>51<br>WARM | 38-42<br>40<br>SEAS | 36-41<br>44<br>WARM | 34-39<br>41<br>WARM | 33-39<br>32<br>COLD |
|  | FCST | 45-48<br>SEAS | 43-45<br>SEAS | 41-44<br>SEAS | >=43<br>WARM | 36-41<br>SEAS | <=33<br>COLD | 33-39<br>SEAS |
| PRECIP | SEAS LY | 0.4-1.0<br>.5<br>SEAS | 0.4-1.0<br>.4<br>SEAS | 0.4-1.0<br>1.6<br>WET | 0.5-1.0<br>.2<br>DRY | 0.4-1.0<br>.1<br>DRY | 0.4-0.9<br>.4<br>SEAS | 0.4-0.9<br>1.1<br>WET |
|  | FCST | 0.4-1.0<br>SEAS | >=1.1<br>WET | 0.4-1.0<br>SEAS | <=0.4<br>DRY | 0.4-1.0<br>SEAS | 0.4-0.9<br>SEAS | 0.4-0.9<br>SEAS |
| SNOW | SEAS LY | 0.3-0.7<br>0<br>Lt/Nn | 0.3-0.9<br>0<br>Lt/Nn | 0.3-1.1<br>0<br>Lt/Nn | 0.3-1.3<br>0<br>Lt/Nn | 0.3-1.5<br>0<br>Lt/Nn | 0.3-1.8<br>0<br>Lt/Nn | 0.3-2.2<br>0<br>Lt/Nn |
|  | FCST | <=0.2<br>Lt/Nn | <=0.2<br>Lt/Nn | <=0.2<br>Lt/Nn | <=0.2<br>Lt/Nn | <=0.2<br>Lt/Nn | 0.3-1.8<br>SEAS | <=0.2<br>Lt/Nn |

FIG. 34

FOR: BUFFALO, NY — 3504

INTERVAL REPORT 3502

| BUFFALO | 1 | 2 | 3 | 4 | 5 | 6 | 7 | 8 | 9 |
|---|---|---|---|---|---|---|---|---|---|
| TEMP SEASONAL | 78 | 79 | 80 | 80 | 80 | 81 | 81 | 81 | 82 |
| TEMP LY | 68 COLD | 69 COLD | 67 COLD | 75 SEAS | 86 WARM | 87 WARM | 93 WARM | 92 SEAS | 92 SEAS |
| TEMP FORECAST | MID 70S COLD 75 { 3506 | | MID 80S WARM ≥84 { 3508 | | UPPER 70'S– LOW 80'S SEASONAL 75-83 { 3510 | | LOW 90S VERY WARM ≥91 { 3512 | | |
| PRECIP SEASONAL | | | | | | | | | |
| PRECIP LY | | | | | | | | | |
| PRECIP FORECAST | | | | | | | | | |
| SNOW SEASONAL | | | | | | | | | |
| SNOW LY | | | | | | | | | |
| SNOW FORECAST | | | | | | | | | |

DAYS

3514

NARRATIVE—JUNE WX HIGHLIGHTS

FIG.35

| 21 | 22 ⚭ | 23 | 24 ⚭ | 25 | 26 | 27 |
|---|---|---|---|---|---|---|
| 28 | 29 | 30 | 31 | | | |

● NEW MOON 26TH
○ FULL MOON 10TH

|   |   |
|---|---|
| JULY<br>M T W T F S S<br>            1 2<br>3 4 5 6 7 8 9<br>10 11 12 13 14 15 16<br>17 18 19 20 21 22 23<br>24 25 26 27 28 29 30<br>31 | SEPTEMBER<br>S M T W T F S<br>           1 2 3<br>4 5 6 7 8 9 10<br>11 12 13 14 15 16 17<br>18 19 20 21 22 23 24<br>25 26 27 28 29 30 |

AUGUST 1995:
TEMPERATURE: AUGUST 1994 COULD BE SUMMARIZED AS WARM IN THE WEST AND COOL IN THE EAST. FOR 1995, MOST OF THE NORTHCENTRAL AND EASTERN STATES WILL BE WARMER THAN LAST YEAR, PARTICULARLY AROUND THE DAKOTAS, MINNESOTA, IOWA AND WISCONSIN. MOST LOCATIONS IN THE WEST WILL BE SIMILAR TO LAST YEAR OR COOLER, ESPECIALLY ALONG THE ROCKIES. IT LOOKS TO BE COOLEST WHEN COMPARED TO 1994 FROM WEST TEXAS ACROSS NEW MEXICO INTO ARIZONA. AUGUST SHOULD SEE MOSTLY ABOVE NORMAL TEMPERATURES FOR THE MONTH ACROSS THE NORTHERN HALF OF THE COUNTRY, BUT ESPECIALLY THE NORTHCENTRAL STATES SUCH AS MONTANA.

```
CRITERA
Location:
Milwaukee, Wisconsin
which is a part of the Milwaukee, Wisconsin region forecast area
Time:
Start Date: 6/17/1998
End Date: 6/21/1998
```

4502 { Milwaukee, Wisconsin
(which is a part of the Milwaukee,Wisconsin region forecast area)
6/17/98 to 6/21/98

High Temperatures

- Seasonal with Highs in the upper 60's to low 80's from 6/15/98 through 6/16/98.
- Generally cool with Highs in the mid 60's to mid 70's from 6/17/98 through 6/19/98.
- A mild period with Highs in the low 80's to low 90's from 6/20/98 through 6/22/98.
- Generally seasonal with Highs in the low 70's to low 80's from 6/23/98 through 6/25/98.

Low Temperatures

4504 {
- A cool night or two with Lows in the 50's from 6/16/98 through 6/15/98.
- A couple of mild nights with Lows in the 60's from 6/16/98 through 6/17/98.
- Seasonal to cool with Lows in the 50's from 6/18/98 through 6/19/98.
- A mild period with Lows in the 60's from 6/20/98 through 6/21/98.
- A mostly seasonal period with Lows in the mid 50's to low 60's from 6/22/98 through 6/27/98.

Precipitation

- A mostly dry period from 6/16/98 through 6/16/98.
- Showers possible on or about 6/17/98.
- A relatively dry period from 6/18/98 through 6/21/98.
- Showers possible on a day or two from 6/22/98 through 6/23/98.

Friday 6/17/98 to Tuesday 6/21/98.

|     | | | | | |
| --- | --- | --- | --- | --- | --- |
| MAX | | | | | |
| PRECIP | ◊ | | | ◊ | ◊ |
| MIN | | | | | |

Temperature
Warm  Seasonal  Cold                    Variable

Precipitation
Non-Significant Rain | Significant Rain | Non-Significant Snow | Significant Snow | Generally Dry

FIG. 47B

Albany, New York
(which is a part of the Albany,New York region forecast area)
4/27/98 to 5/1/98

High Temperatures

- A couple of cool days with Highs in the upper 50's to mid 60's from 4/24/98 through 4/25/98.
- A seasonal day or two with Highs in the mid 60's to mid 70's from 4/26/98 through 4/27/98.
- Briefly warmer with Highs in the upper 60's to upper 70's from 4/28/98 through 4/29/98.
- Cooler with Highs in the 50's from 4/30/98 through 5/1/98.

Low Temperatures

- Seasonal to cold nights with Lows in the low 40's to low 50's from 4/24/98 through 4/27/98.
- Briefly warmer with Lows in the mid 50's to low 60's from 4/28/98 through 4/29/98.
- Cooler with Lows in the low to mid 50's from 4/30/98 through 5/1/98.

Precipitation

- A relatively dry period from 4/25/98 through 4/28/98.
- Light to moderate rain from 4/29/98 through 5/1/98.

Monday 4/27/98 to Friday 5/1/98

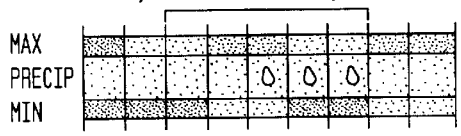

FIG. 50A

First, let us know where you're going to be.

State/Province [Select A State/Province ▽]
City/Town [                    ]
or Zip Code [     ]

Note: Zip Code or Destination choices will override State and City Selections

Or, choose a destination

[Select a Ski Area ▽]
[Select a Caribbean Location ▽]
[Select a National Park ▽]

FIG. 50B

First, tell us the time period you want.

Starting Date
Month   Day   Year
[Month ▽] [Day ▽] [Year ▽]

Ending Date
Month   Day   Year
[Month ▽] [Day ▽] [Year ▽]

Or, Select a holiday from this list.

Holiday [Choose a Holiday ▽]
Year [Choose a Year ▽]

FIG. 50C

I want the weather to be:
○ Warm  ⊙ Seasonal  ○ Cold

OR ○

A Daytime High of [75] °F and a Nighttime Low of [65] °F

And I want: [No Precipitation ▽]
| No Precipitation |
| Significant Rain |
| Non Significant Rain |
| Significant Snow |
| Non Significant Snow |
| Non Significant Rain or Snow |
| Any Precipitation |

FIG. 50D

Finally, give us a range, of dates to look at.

Month Range  [Select Range ▽]
Starting in  [Select Month ▽]
Starting On  [Select Weekday ▽]   Consecutive Days  [Select Number ▽]

Select Number
2
3
4
5
6
7
8
9
10

METHOD AND COMPUTER PROGRAM PRODUCT FOR WEATHER ADAPTED, CONSUMER EVENT PLANNING

CROSS-REFERENCE TO OTHER APPLICATIONS

This application is a continuation-in-part application of and claims priority to U.S. patent application Ser. No. 09/907,714, filed Jun. 16, 1998, which is a continuation of U.S. patent application Ser. No. 08/588,248, filed Jan. 18, 1996, now U.S. Pat. No. 5,832,456.

The following applications of common assignee are related to the present application:

"System and Method for the Advanced Prediction of Weather Impact on Managerial Planning Applications," Ser. No. 08/002,847, filed Jan. 15, 1993, now U.S. Pat. No. 5,521,813, incorporated herein by reference in its entirety.

"A User Interface For Graphically Displaying the Impact of Weather on Managerial Planning," Ser. No. 08/504,952, filed Jul. 20, 1995, now U.S. Pat. No. 5,796,932, incorporated herein by reference in its entirety.

"System and Method for Determining the Impact of Weather and Other Factors on Managerial Planning Applications," Ser. No. 08/205,494, filed Mar. 4, 1994, now U.S. Pat. No. 5,491,629, incorporated herein by reference in its entirety.

BACKGROUND OF THE INVENTION

1. Field of the Invention

The present invention relates generally to business performance forecasting, and more particularly to weather adapted, business performance forecasting.

2. Related Art

A. Historical Perspective of Retailing

The retail industry has historically been influenced by the shape of the times. For example, the retail industry is impacted by war and peace, lifestyle changes, demographic shifts, attitude progressions, economic expansion and contraction, tax policies, and currency fluctuations.

The period from 1965 to 1975 was marked by growth and segmentation in the retail industry. New types of stores such as department stores, specialty stores, and discount stores appeared, increasing competition in the retail industry. One result of this growth was a decrease in gross margin (sales price—cost of goods sold). Another result was a shifting of supply sources. Originally, merchandise was supplied exclusively by vendors. However, segmentation and growth resulted in specialty chains and discounters manufacturing merchandise in-house (commonly known as vertical integration).

The period from 1975 to 1980 was marked by disillusionment and complexity in the retail industry. Inflation and women entering the work force in significant numbers resulted in a more sophisticated consumer. Many retailers began to rethink the basics of merchandising in terms of merchandise assortments, store presentations, customer service, and store locations. Other less sophisticated retailers continued on an undisciplined and unstructured policy of store growth.

The period from 1980 to 1990 was marked by recovery and opportunity in the retail industry. An economic boom stimulated consumer confidence and demand. This, coupled with the expansion of the previous period, paved the way for the retail industry to overborrow and overbuild. With their increased size, retailers became increasingly unable to manage and analyze the information flowing into their organizations.

B. Retailing Problems and Opportunities of Today

The problems and opportunities facing the retailer fall into two categories of factors: (1) external factors; and (2) internal (or industry) factors. External factors impacting the retail industry include, for example, adverse or favorable weather, rising labor costs, increasing property costs, increased competition, economics, increasing cost of capital, increasing consumer awareness, increasing distribution costs, changing demographics and zero population growth, decreasing labor pool, and flat to diminishing per capita income.

Internal (or industry) factors affecting the retail industry include, for example, large number of stores (decentralization), homogeneity among retailers, continuous price promotion (equates to decreased gross margin), decreasing customer loyalty, minimal customer service, physical growth limitations, and large quantities of specific retailer store information.

Growth and profitability can only be achieved by maximizing the productivity and profitability of the primary assets of the retail business: merchandise (inventory), people, and retail space. The above external and industry factors have added to a retailer's burdens of maintaining the productivity of these assets.

Of the three primary assets, merchandise productivity is particularly important due to the limiting effect of external and internal factors on people and space productivity (e.g., physical growth limitations and high labor costs). Merchandise productivity can be best achieved by maintaining effective mix of product in a store by product characteristic (merchandise assortments).

To achieve more effective merchandise assortments, a retailer must have a merchandise plan that provides the retailer with the ability to (1) define, source, acquire, and achieve specific target merchandise assortments for each individual store location; (2) achieve an efficient, non-disruptive flow from supply source to store; (3) maintain store assortments which achieve anticipated financial objectives; and (4) communicate effectively across all areas of the business to facilitate coordinated action and reaction.

Such an effective merchandise plan must consider all possible external and industry factors. To obtain this knowledge, a retailer must have responsive and easy access to the data associated with these factors, referred to as external and industry data, respectively. To assimilate and analyze this data, which comes from many sources and in many formats, retailers began utilizing management information systems (MIS). The primary function of the MIS department in the retail industry has been the electronic collection, storage, retrieval, and manipulation of store information. Mainframe-based systems were primarily utilized due to the large amount of store information generated. Store information includes any recordable event, such as purchasing, receiving, allocation, distribution, customer returns, merchandise transfers, merchandise markdowns, promotional markdowns, inventory, store traffic, and labor data. In contrast to the extensive collection and storage of internal data, these systems, did not typically process external data. Rather, this non-industry data was simply gathered and provided to the retailer for personal interpretation.

Since understanding of local and region level dynamics is a requisite for increased retailing productivity, retailers would essentially feed store information at the store level into massive mainframe databases for subsequent analysis to identify basic trends. However, the use of mainframes typically requires the expense of a large MIS department to process data requests. There is also an inherent delay from the time of a data request to the time of the actual execution. This structure prevented MIS systems from becoming cost effective for use by executives in making daily decisions, who are typically not computer specialists and thus rely on data requests to MIS specialists.

FIG. 37 illustrates a block diagram of a conventional MIS system architecture used in the retail industry. Referring to FIG. 37, an MIS architecture 3701 captures store information (one form of internal data) and electronically flows this information (data) throughout the organization for managerial planning and control purposes.

At point of sale 3704, scanners 3708 and electronic registers 3710 record transactions to create POS data 3706. These transactions include data related to customer purchases, customer returns, merchandise transfers, merchandise markdowns, promotional markdowns, etc. POS data 3706 is one form of store information 3716. Store information 3716 also includes other store data 3712. Other store data 3712 includes data related to receiving, allocation, distribution, inventory, store traffic, labor, etc. Other store data 3712 is generally generated by other in-store systems.

Store information 3716 is polled (electronically transferred) from point of sale 3704 by headquarters, typically by modem or leased-line means 3717. POS 3704 represents one typical location (retail store). However, MIS architecture 3701 can support multiple POS locations 3704.

A data storage and retrieval facility 3720 receives store information 3716 using computer hardware 3722 and software 3724. Data storage and retrieval facility 3720 stores store information 3716. Store information 3716 is retrieved into data analyzer 3727. Data analyzer 3727 shapes and analyzes store information 3716 under the command of a user to produce data, in the form of reports, for use in the preparation of a managerial plan 3730.

In the 1970's and 1980's, retrieval of store information 3716 into data analyzer 3727 and the subsequent report generation were manually or electronically generated through a custom request to MIS department personnel. More recently, in response to the need for a rapid executive interface to data for managerial plan preparation, a large industry developed in Executive Information Systems (EIS). Referring to FIG. 37, an EIS 3729, which typically operates on a personal computer workstation platform, interfaces with the MIS mainframe or mid-range database in data storage and retrieval facility 3720. An EIS system is a computer-based system by which information and analysis can be accessed, created, packaged and/or delivered for use on demand by users who are non-technical in background. Also, EIS systems perform specific managerial applications without extensive interaction with the user, which reduces or eliminates the need for computer software training and documentation.

In contrast to store information 3716, external information 3736 consists of manual reports covering such topics as economic forecasts, demographic changes, and competitive analysis. In conventional systems, external information 3716 is separately made available to the user for consideration in developing managerial plan 3730.

Technical improvements in speed and storage capability of personal computers (PCS) have allowed this trend towards EIS systems to take place, while most firms still maintain a mainframe or minicomputer architecture for basic POS data storage and processing. The advent of powerful mini computers, local area networks (LANs), and PC systems has resulted in many of the traditional mainframe retailing applications migrating to these new platforms.

C. The Nature of Weather Anomalies

Weather anomalies are more of a regional and local event rather than a national phenomenon in countries as geographically large as the United States. This is not to say that very anomalous weather cannot affect an entire country or continent, creating, for example, abnormally hot or cold seasons. However, these events are less frequent than regional or local aberrations. Significant precipitation and temperature deviations from normal events occur continually at time intervals in specific regions and locations throughout the United States.

Because actual daily occurrences fluctuate around the long term "normal" or "average" trend line (in meteorology, normal is typically based on a 30 year average), past historical averages can be a very poor predictor of future weather on a given day and time at any specific location. Implicitly, weather effects are already embedded in an MIS POS database, so the retailer is consciously or unconsciously using some type of historical weather as a factor in any planning approach that uses trendline forecasts based on historical POS data for a given location and time period.

D. Weather Relative to National Planning Applications

At a national level, weather is only one of several important variables driving consumer demand for a retailer's products. Several other factors are, for example, price, competition, quality, advertising exposure, and the structure of the retailer's operations (number of stores, square footage, locations, etc). Relative to the national and regional implementation of planning, the impact of all of these variables dominates trendline projections.

As described above, POS databases track sales trends of specific categories at specific locations which are then aggregated and manipulated into regional and national executive information reports. Since the impact of local weather anomalies can be diluted when aggregated to the national levels (sharp local sales fluctuations due to weather tend to average out when aggregated into national numbers), the impact of weather has not received much scrutiny relative to national planning and forecasting.

E. Weather Relative to Regional and Local Planning Applications

The impact of weather on a regional and local level is direct and dramatic. At the store level, weather is often a key driver of sales of specific product categories. Weather also influences store traffic which, in turn, often impacts sales of all goods. Weather can influence the timing and intensity of markdowns, and can create stockout situations which replenishment cycles can not address due to the inherent time lag of many replenishment approaches.

The combination of lost sales due to stockouts and markdowns required to move slow inventory are enormous hidden costs, both in terms of lost income and opportunity costs. Aggregate these costs on a national level, and weather is one of the last major areas of retailing where costs can be carved out (eliminate overstocks) and stores can improve productivity (less markdown allows for more margin within the same square footage).

In short, weather can create windows of opportunity or potential pitfalls that are completely independent events relative to economics, demographics, consumer income, and competitive issues (price, quality). The cash and opportunity costs in the aggregate are enormous.

F. Conventional Approaches Addressing Weather Impact

Though the majority of retailers acknowledge the effects of weather, many do not consider weather as a problem per se, considering it as a completely uncontrollable part of the external environment.

However, the underlying problem is essentially one of prediction of the future; i.e., developing a predictive model. All retailers must forecast (informally or formally) how much inventory to buy and distribute based on expected demand and appropriate inventory buffers. Hence, many conventional predictive modeling processes have been developed, none of which adequately address the impact of weather.

One conventional solution is to purposely not consider the impact of weather on retail sales. In such instances, the retailer will maintain high inventory levels and rapidly replenish the inventory as it is sold. This approach creates large working capital needs to support such a large inventory.

Another conventional solution is for the retailer to qualitatively use weather information to anticipate future demands. This procedure, if used by decision makers, is very subjective and does not evaluate weather in a predictive sense. Nor does it quantify the effect of past and future weather on consumer demands.

Another conventional approach is the utilization of climatology. Climatology is the study of the climates found on the earth. Climatology synthesizes weather elements (temperature, precipitation, wind, etc.) over a long period of time (years), resulting in characteristic weather patterns for a given area for a given time frame (weekly, monthly, seasonably, etc.). This approach does not utilize forecasted weather as a parameter, which can vary considerably from any given time period from year to year for a given area. Climatology yields only the average weather condition, and is not indicative of the weather for any specific future time frame.

Manufacturers and retailers have been known to rely on broad projections developed by the National Weather Service (the governmental entity in the USA charged with disseminating weather data to the public) and other private forecasting firms. With reference to long range projections, these may be vague, broad, and lack regional or local specificity. It is of limited use since they are issued to cover anticipated weather averaged for 30, 60, or 90 day periods covering large geographic areas. This information cannot be quantified or easily integrated into an MIS-based planning system which is geared toward a daily or weekly time increment for specific location and time.

In summary, the above conventional solutions to weather planning problems in retail all suffer from one or several deficiencies which severely limit their commercial value, by not providing: (1) regional and/or local specificity in measuring past weather impact and projecting future weather impact, (2) the daily, weekly, and monthly increment of planning and forecasting required in the retail industry, (3) ample forecast leadtime required by such planning applications as buying, advertising, promotion, distribution, financial budgeting, labor scheduling, and store traffic analysis, (4) the quantification of weather impact required for precise planning applications such as unit buying and unit distribution, financial budget forecasting, and labor scheduling, (5) reliability beyond a 3 to 5 day leadtime, (6) a predictive weather impact model, which links quantitative weather impact measurement through historical correlation, with quantitative forecasts, (7) the ability to remove historical weather effects from past retail sales for use as a baseline in sales forecasting, (8) an entirely electronic, computerized, EIS implementation for ease of data retrieval/analysis with specific functions that solve specific managerial planning applications, and (9) a graphical user interface representing a predictive model in graphs, formats, and charts immediately useful to the specific managerial applications.

G. Scope of the Problem

The above discussion focused on the retail industry, i.e., the impact of weather on the retail industry. Naturally, the effects of weather are not confined to the retail industry. Instead, weather impacts all aspects of human endeavor. Accordingly, the discussion above applies equally well to many other applications, including but not limited to retail products and services, manufacturing/production (i.e., construction, utilities, movie production companies, advertising agencies, forestry, mining), transportation, the entertainment industry, the restaurant industry, etc. Furthermore, like retail companies, activities of individual consumers are affected by the weather. Based on the forecasted weather, a consumer's planned special event (e.g., golfing, skiing, fishing, boating, vacations, family reunions, weddings, honeymoons, and the like) will be affected.

SUMMARY OF THE INVENTION

The present invention is directed to a system and method for forecasting future retail performance. The system includes a storage device that stores a sales history database, a weather history database, and a weather forecast database. An analyzer determines the extent to which past retail performance of a plurality of products at a plurality of locations was affected by weather using the sales history database and the weather history database. A configurator, coupled to the analyzer, estimates expected future retail performance of the products at the stores for a plurality of future time periods using the weather forecast database and results produced by the analyzer. A graphical user interface, coupled to the analyzer and the configurator, enables users to view and manipulate results produced by the analyzer and the configurator to thereby forecast future retail performance of the products at the locations.

The system also includes a consumer weather planner system which allows consumers, like retail companies, to perform weather-based planning of special events (e.g., golfing, vacations, weddings, and the like) much like retailers as described above.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein:

FIGS. 7, 8, 9, 10, 11, 12, 13C, and 22 depict preferred databases used by the present invention;

FIGS. 23, 24, 25, 26, 27, 28, 29, 30, 31, 32, 33, 34 35, 36A, 36B, 38, 39, 40, 41, and 42 are windows or screen shots generated by the graphical user interface of the present invention;

FIGS. 45, 47, 49A and 49B are screen shots depicting the output report formats of the consumer forecast system of the present invention; and FIGS. 50A, 50B, 50C and 50D are screen shots depicting exemplary graphical user interface input screens for the consumer forecast system of the present invention.

DETAILED DESCRIPTION OF THE PREFERRED EMBODIMENTS

Overview of the Invention

The present invention is directed to a system and method for retail performance forecasting. As used herein, the term "retail performance" refers to all statistical metrics related to retail sales performance, such as gross revenue, net revenue, unit sales, customer traffic, etc. For convenience, the present invention is described herein in the context of a retail environment. However, it should be understood that the invention is adapted and envisioned for use at any commercial level, such as manufacturing, distribution, value added reselling, etc., in addition to retail. Moreover, the present invention is well suited and adapted for use with any endeavor and/or industry and/or market that is potentially or actually impacted by weather. This includes, but is not limited to, retail products and services, manufacturing/production (i.e., construction, utilities, movie production companies, advertising agencies, forestry, mining), transportation, the entertainment industry, the restaurant industry, etc.

The present invention is "weather adapted." In other words, the present invention when forecasting retail performance takes the affect of weather into consideration. For example, suppose the invention is used to forecast the opportunity of the snow sled market for next January. In performing this forecasting function, the present invention will take into consideration the weather predictions for next January (whether snow will be below seasonal, seasonal, or above seasonal, for example). Because it takes weather into consideration, the present invention is generally more accurate than similar systems and methods that do not take the affect of weather into consideration.

Figure 1:
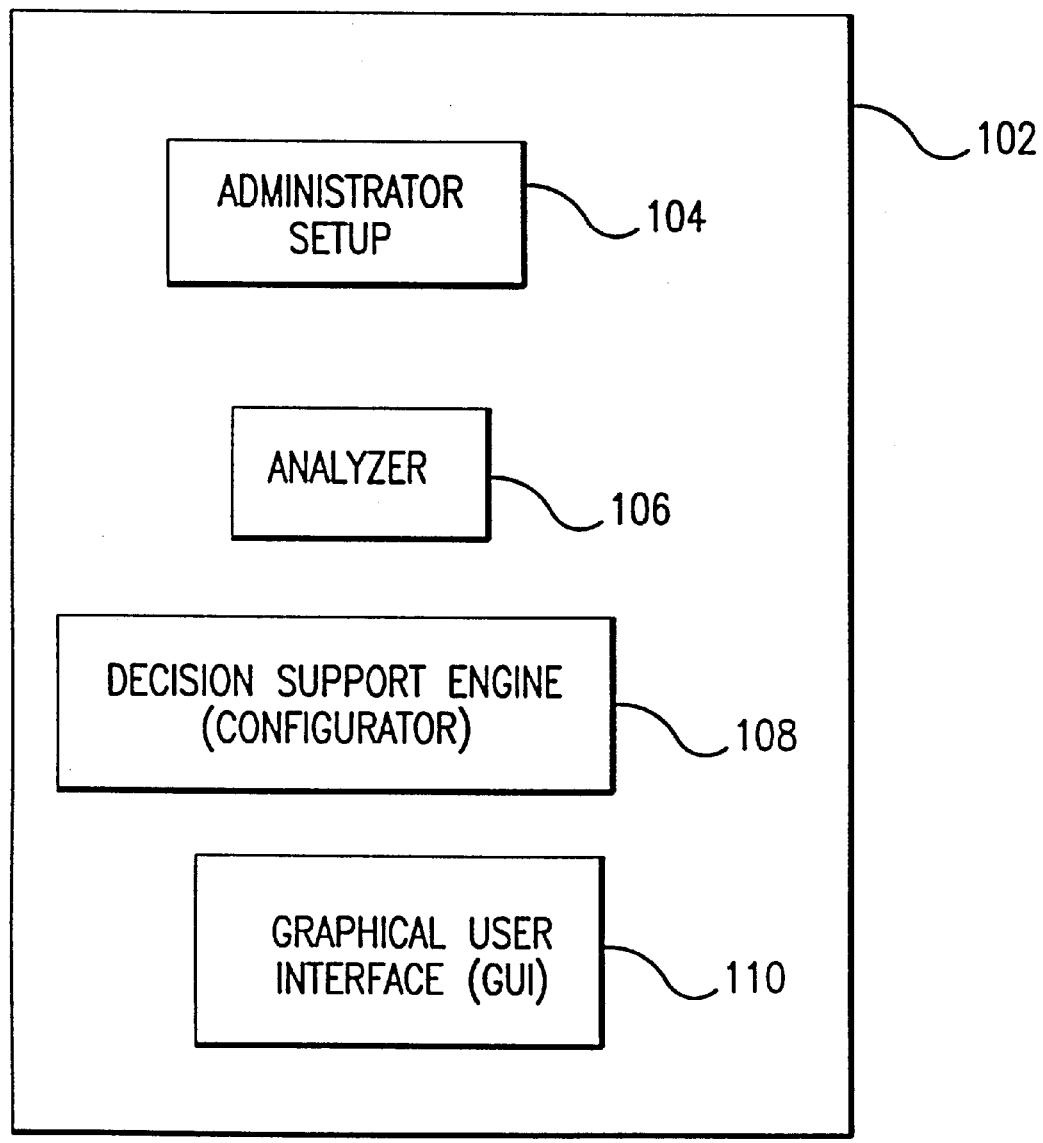
FIG. 1 is a block diagram of a weather adapted, retail performance forecasting system according to a preferred embodiment of the present invention.

FIG. 1 is a block diagram of a weather adapted, retail performance forecasting system 102 (also called system herein) according to a preferred embodiment of the present invention. The system 102 includes a Administrator Setup 104, an analyzer 106, a decision support engine 108 (also called configurator herein), and a graphical user interface (GUI) 110.

Figure 4:
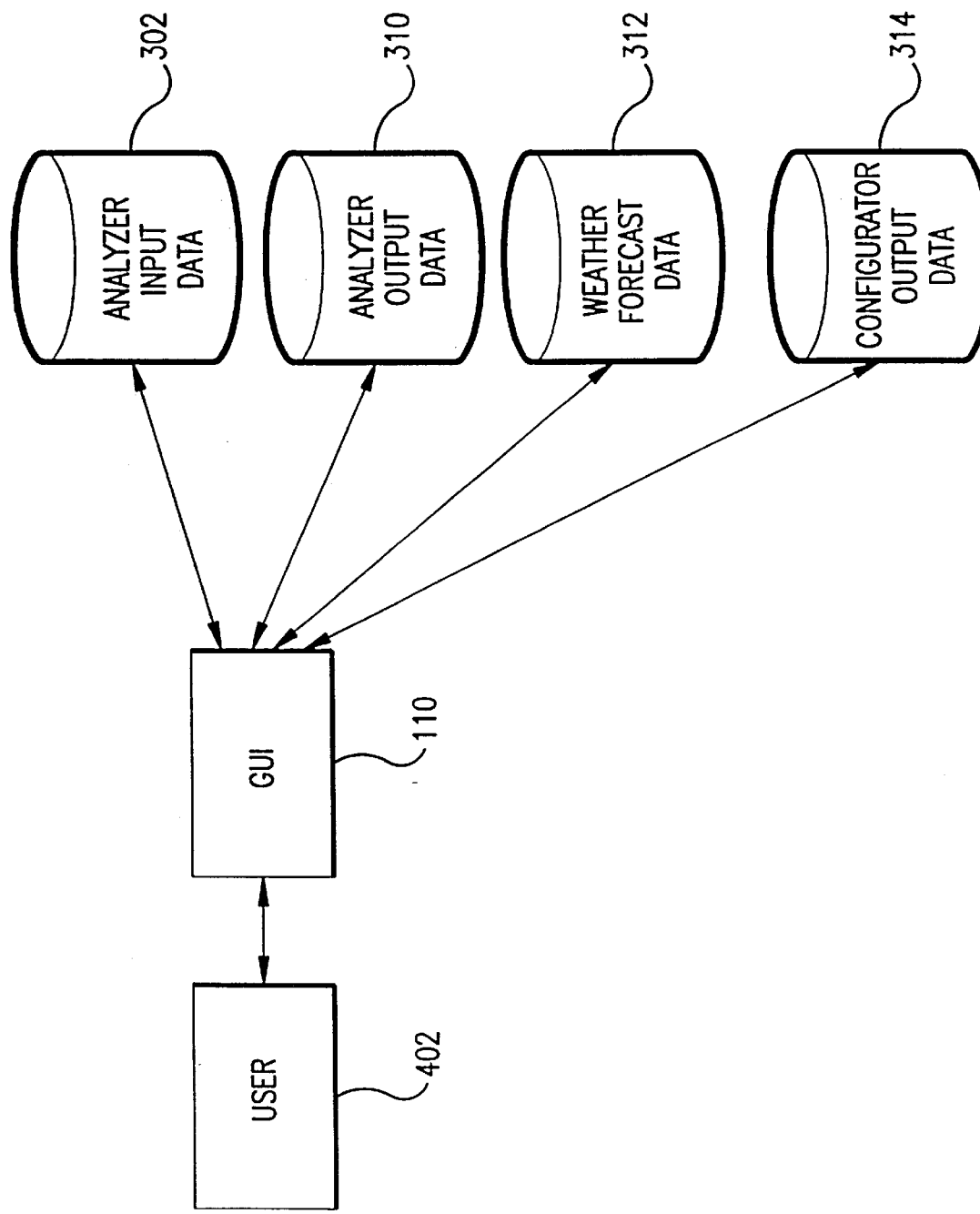
FIG. 4 is a dataflow diagram of a graphical user interface of the forecasting system.
Figure 5:
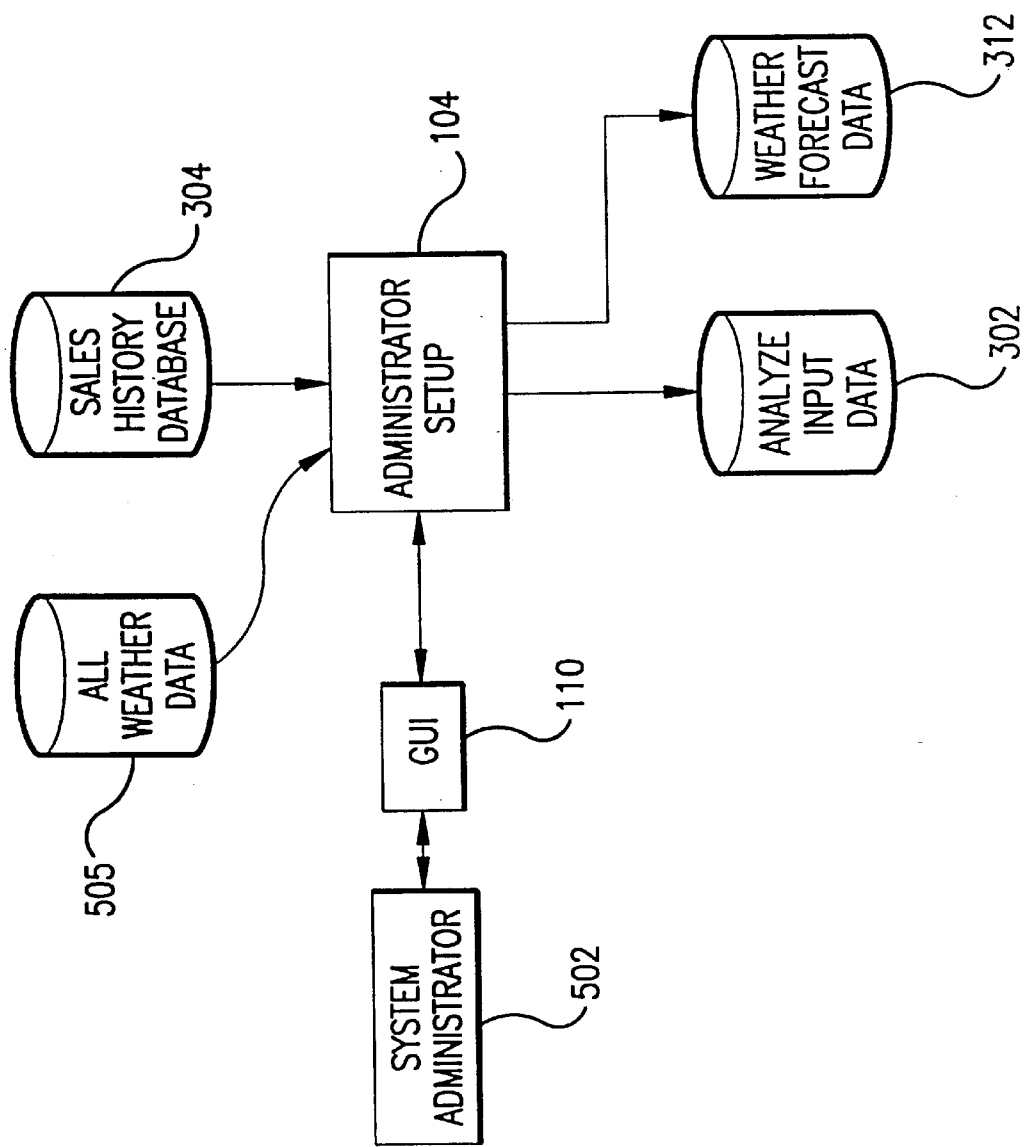
FIG. 5 is a dataflow diagram of administration setup of the forecasting system.
Figure 21:
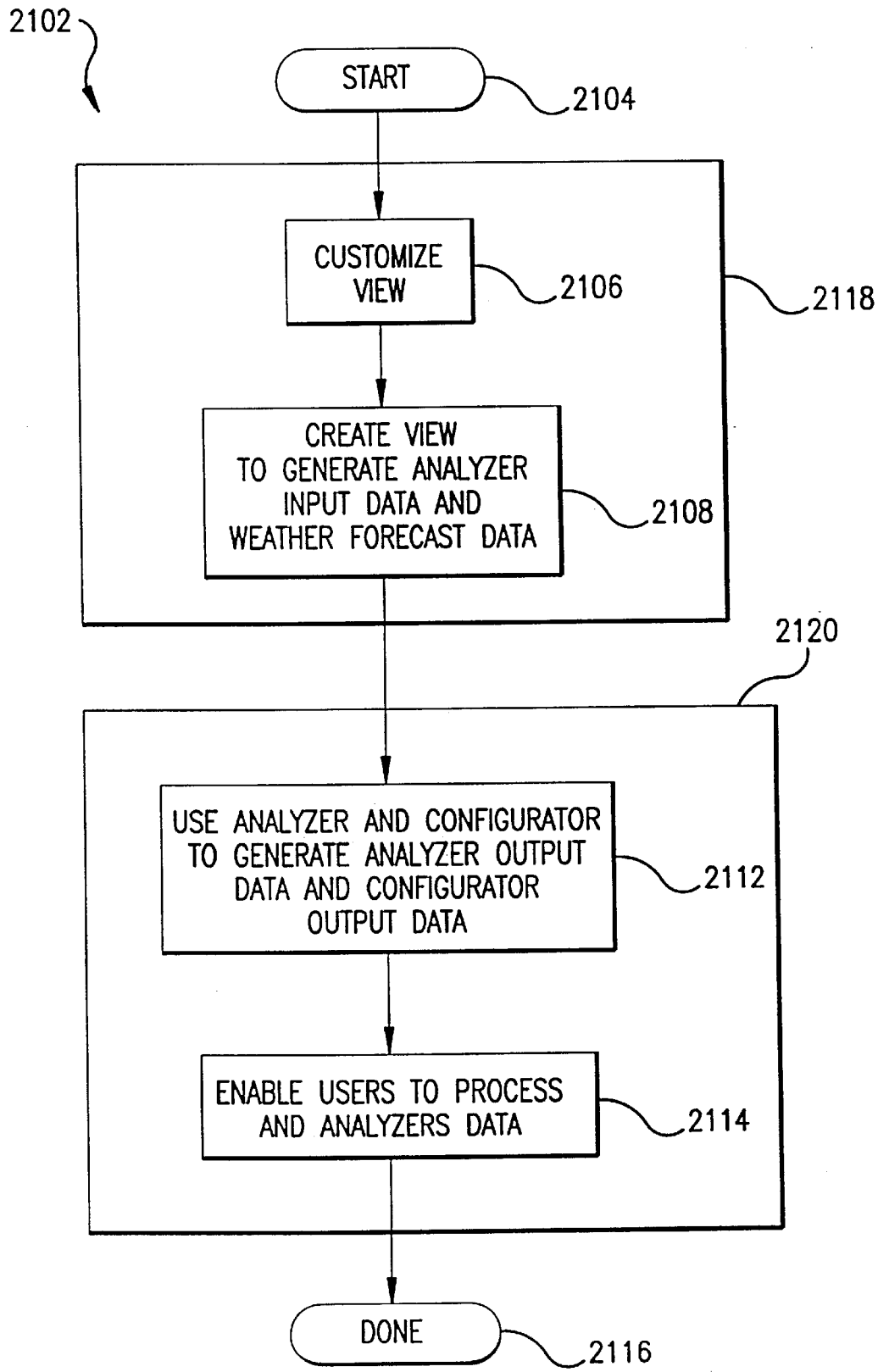

FIG. 21 presents a flowchart 2102 depicting the high-level operation of these components. In flowchart 2102, steps 2118 are performed by the Administrator Setup 104 in accordance with commands from a system administrator 502 (FIG. 5). Steps 2120 are performed by the analyzer 106, configurator 108, and GUI 110 in accordance with commands from an user 402 (FIG. 4). The system administrator 502 and user 402 may or may not be the same person. Flowchart 2102 shall now be described, with reference to FIG. 5 (a data flow diagram of the Administrator Setup 104), FIG. 3 (a data flow diagram of the analyzer 106 and configurator 108), and FIG. 4 (a data flow diagram of the GUI 110). Flowchart 2102 begins with step 2104, where control immediately passes to step 2106.

In step 2106, the Administrator Setup 104 and the GUI 110 enable the system administrator 502 to define a customized view per a party's specifications. Step 2106 shall now be described in detail with reference to FIG. 5.

The present invention makes use of weather and sales data 304, 505. The weather data includes seasonal weather data (for example, the average temperature in June), historical weather data (for example, the temperature last June), and forecast weather data (for example, a prediction as to what the temperature will be next June). The seasonal weather data, for example, seasonal temperature, represents a narrow range of temperatures, which is implementation dependent, for a specific location and period. It is based upon the 40% of occurrences centered around the mean temperature during a 30 year period. The historical weather data preferably represents a library of historical weather data covering two to five years, although other time spans are alternatively possible and envisioned by the present invention. The forecast weather data represents weather predictions for preferably fifteen months although other time spans are alternatively possible and envisioned by the present invention. Databases of seasonal weather data and historical weather data are available from many publicly and/or commercially available publications and services. The forecast weather data is commercially available from Strategic Weather Services of Wayne, Pa. Other forms of forecast weather data are available from other commercial sources, but these other forms cannot be used directly with the present invention. Instead, they must be modified so as to be consistent with the form and substance discussed herein.

The Weather Database 505 comprises Weather History 306, Weather Patterns 308 and Weather Forecasts 312. The Sales Database 304 represents a party's historical sales data. The party is an entity (such as a chain of retail stores) who wishes to use the forecasting system 102 to predict future retail performance. (The user 402 mentioned above is preferably an employee of the party.) The sales history database 304 preferably includes historical sales data pertaining to all products offered for sale at all of the party's commercial outlets. Typically, the sales data includes the past year's historical sales data, but may include other time spans.

As one will appreciated, Weather Database 505 and Sales history database 304 are potentially very large. Also, much of the information contained in the weather database 505 and sales database 304 may not be pertinent to needs of the party. For example, the party may be only interested in the past two years' historical weather data. Also, the party may only be interested in analyzing the performance of a subset of its commercial outlets, and/or a subset of the products that it offers. Accordingly, the present invention allows the party to filter the data from both the weather database 505 and the sales history database 304, and supply only the data desired to the Analyzer 106 from both databases by the System Administrator 502. The data filtering process is performed by the Administrator Setup 104.

Accordingly, in step 2106 the system administrator 502 interacts with the Administrator Setup 104 via the GUI 110 to customize a view (i.e., to establish the parameters of the impending view). The system administrator 502 customizes the view in accordance with specifications previously provided to the party. For example, the party may have specified to include only Stores A, B, and E in the view, and/or to include only performance data relating to shoes and shirts in the view, and/or to include only forecast weather data for January through May of next year. Step 2106 is described in greater detail below.

In step 2108, the Administrator Setup 104 creates a view in accordance with the party's specifications. In essence, the Administrator Setup 104 in step 2108 extracts from the weather database 505 and sales history database 304 the weather and sales information needed to satisfy the party's specifications as defined in step 2106 (for example, if the party specified shoes in step 2106, then retail performance data relating to shoes is extracted from the sales database 506 in step 2108). The Administrator Setup 104 stores the extracted data in an analyzer input database 302 and a weather forecast database 312.

The analyzer input database 302 is used in the Analyzer 106, the weather forecast database 312 is used in conjunction with the analyzer output database 310 in the configurator 108. The analyzer output database 310 and the weather forecast database 312 are utilized by the party to forecast future retail performance.

Figure 3:
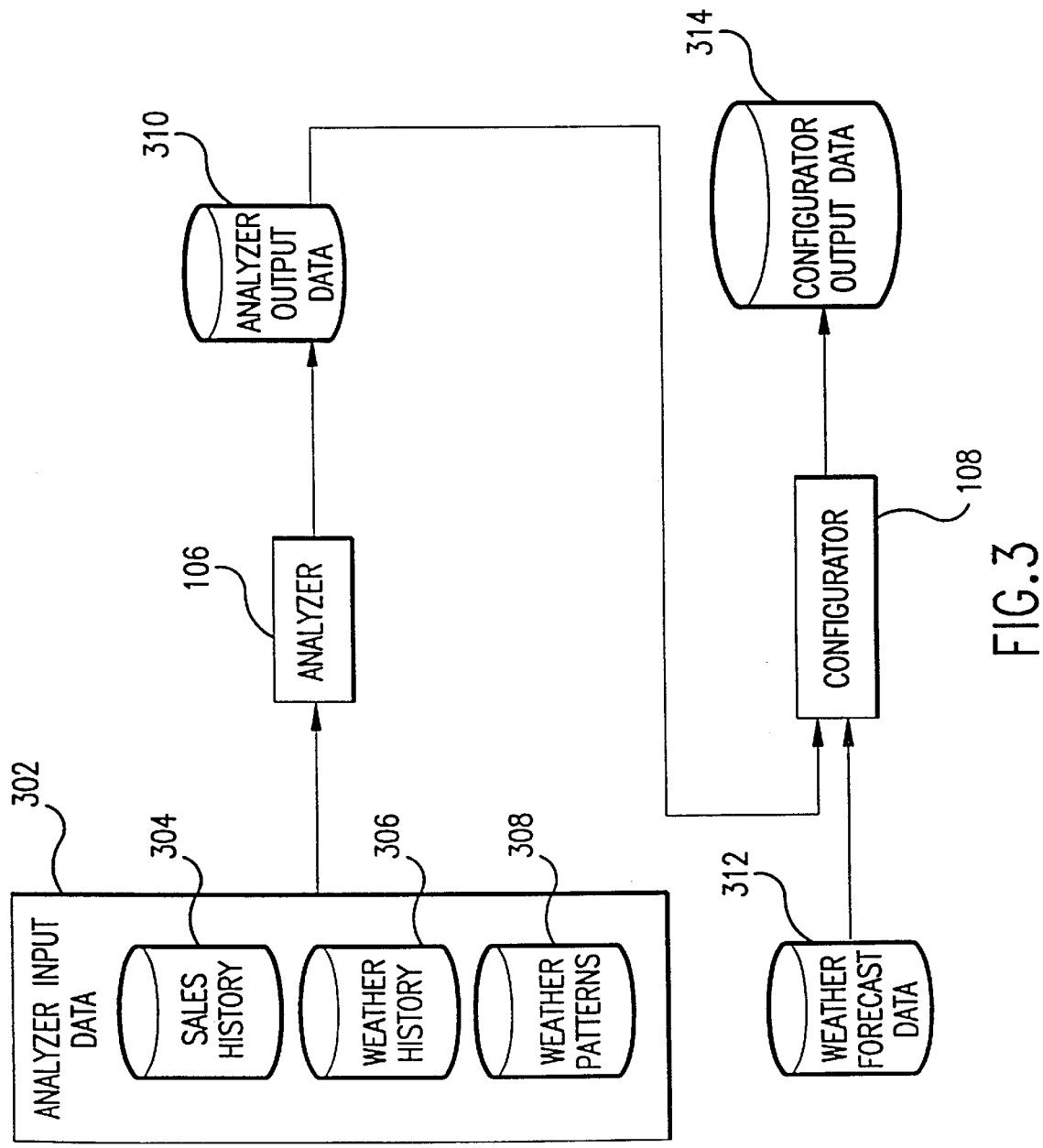
FIG. 3 is a dataflow diagram of an analyzer and a configurator of the forecasting system.

In step 2112, the analyzer 106 at each client site receives the analyzer input database 302 (see FIG. 3). The analyzer input database 302 includes a sales history database 304, a weather history database 306, and a weather patterns database 308. These databases 304, 306, and 308 are described below. The analyzer 106 analyzes the analyzer input database 302, and produces an analyzer output database 310. Generally speaking, the analyzer output database 310 includes data that indicates the manner in which the retail performance of each product at each store was affected by weather. The operation of the analyzer 106 is discussed in greater detail below.

Also in step 2112, the configurator 108 analyzes the analyzer output database 310 and the weather forecast database 312 and produces a configurator output database 314. Generally speaking, the configurator output database 314 includes data that indicates the expected future retail performance of each product at each store. In generating the configurator output database 314, the configurator 108 takes into consideration the affects of predicted future weather. The operation of the configurator 108 is discussed in greater detail below.

In step 2114, the GUI 110 enables users 402 at each client site (who are typically employed by the party) to extract and analyze in meaningful ways information from the analyzer output database 310, the weather forecast database 312, and the configurator output database 314. The operation of the GUI 110 is discussed in greater detail below.

Flowchart 2102 is complete after step 2114 has been performed, as indicated by step 2116.

Preferred Implementation of the Present Invention

Figure 2:
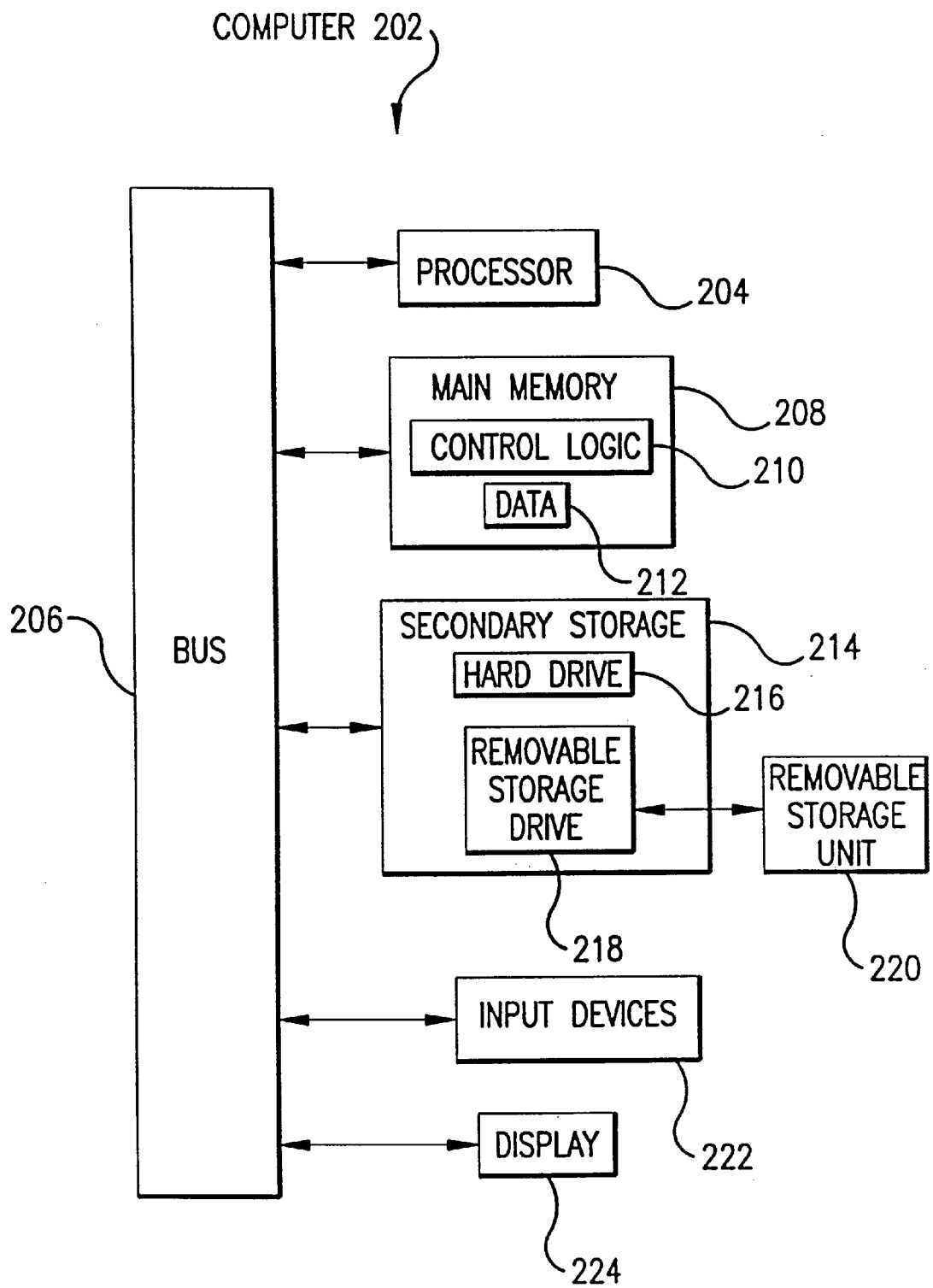
FIG. 2 is a block diagram of a computer system preferably used to implement the present invention.

In one embodiment, the invention is directed to a computer system operating as discussed herein. Specifically, the forecasting system 102 could be implemented using a computer system 202 as shown in FIG. 2. Typically, a computer system 202 implementing the forecasting system 102 of the present invention would be located at the view site and at each of the client sites.

The computer system 202 includes one or more processors, such as processor 204. The processor 204 is connected to a communication bus 206.

The computer system 202 also includes a main memory 208, preferably random access memory (RAM). Control logic 210 (i.e., software) and data 212 (such as the analyzer input database 302, the analyzer output database 310, the weather forecast database 312, and the configurator output database 314) are stored in the main memory 208, and may also be stored in secondary storage 214.

The computer system 202 also includes secondary storage 214. The secondary storage 214 includes, for example, a hard disk drive 216 and/or a removable storage drive 218, representing a floppy disk drive, a magnetic tape drive, a compact disk drive, etc. The removable storage drive 218 reads from and/or writes to a removable storage unit 220 in a well known manner.

Removable storage unit 220, also called a program storage device or a computer program product, represents a floppy disk, magnetic tape, compact disk, etc. As will be appreciated, the removable storage unit 220 includes a computer usable storage medium having stored therein computer software and/or data.

Computer programs (also called computer control logic) are stored in main memory 208 and/or the secondary storage 220. Such computer programs, when executed, enable the computer system 202 to perform the features of the present invention as discussed herein. In particular, the computer programs, when executed, enable the processor 204 to perform the features of the present invention. Accordingly, such computer programs represent controllers of the computer system 202.

In another embodiment, the invention is directed to a computer program product comprising a computer readable medium having control logic (computer software) stored therein. The control logic, when executed by the processor 204, causes the processor 204 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant art(s).

The computer system 202 also includes input devices 222, such as a keyboard and/or a mouse, and display devices 224, such as a computer monitor.

Analyzer Input Database

The analyzer input database 302 includes a sales history database 304, a weather history database 306, and a weather patterns database 308. These are described below.

Sales History Database

An example sales history database 304 (alternatively called the product history database) is shown in FIG. 7. The sales history database 304 includes, for each year in the view, one or more records (or rows) for each product sold in each store. For any given product/store combination, there is a record for each of several data types. The data types represent performance metrics that are being tracked, such as gross revenue, net revenue, number of items sold, etc.

It should be understood that the invention accommodates and supports any business and/or product related data. In addition to that mentioned above, such product data (that is stored in the sales history database 304) includes retail POS data, shipment data (manufacturing plant, wholesales, etc.), inventory data, store traffic data, economic data, demographic data, order data, etc.

Each record also includes historical performance information for the product/store combination on a per period basis.

For example, the records shown in the example sales history database 304 in FIG. 7 pertain to HATS (i.e., the product) sold in Store001 (i.e., the store or location). Records 702 and 706 pertain to historical information for 1994, and records 704 and 708 pertain to historical information for 1995. The data type for record 702 is "Net Dollars," which represents net sales revenue. Record 702 includes net sales revenue information for HATS sold in Store001 in 1994. This net sales revenue information is provided on a per period basis. A period may be any increment of time, such as a day, a month, a quarter, etc. For convenience purposes, only six periods P1–P6 are shown in FIG. 7. There may be more or less periods, depending on the actual implementation.

The information contained in the sales history database 304 depends on the party's specifications that were provided to the Administrator Setup 104 during the view process. For example, the party may have indicated that it only wanted data on hats and shoes. In this case, no data would be contained in the sales history database 304 about any other product but hats and shoes (for clarity, the sales history database 304 in the example of FIG. 7 only has entries on hats). Alternatively, the party may have indicated that it was only interested in the net sales revenue and the number of items sold (as shown in FIG. 7). Alternatively, the party may have indicated that it wanted to analyze data on a bi-weekly basis (in which case the periods would each correspond to a two week period).

Weather History Database

An example weather history database 306 is shown in FIG. 8. The weather history database 306 includes, for each year in the view, one or more records for each metropolitan area (MA). (The term MA closely resembles the well known name Metropolitan Statistical Area (MSA). However MA encompasses a larger surrounding geographical area/region than the strict MSA definition.) (However, since MA and MSA are similar, they are used interchangeably herein.) The Weather History database contains but is not limited to data on 309 metropolitan areas. These records contain information specifying the weather that occurred in the subject MA in the time span represented in the view. Specifically, for each MA, there is a record for each of several weather data types.

The are three classes of weather data types as it relates to the weather history database: seasonal, actual, and category (also called weather pattern). A seasonal data type is the seasonal (or average) value of a weather parameter. Accordingly, the data type "temp.sea" is the average temperature. The data type "snow.sea" is the average snowfall. The data type "prec.sea" is the average precipitation.

An actual data type is the actual value of a weather parameter. Accordingly, the data type "temp" is the actual temperature. The data type "snow" is the actual snowfall. The data type "prec" is the actual precipitation.

A category data type reflects a weather parameter's actual versus seasonal values. Accordingly, the data type "temp.cat" reflects actual temperature versus seasonal temperature. The data type "prec.cat" reflects actual precipitation versus seasonal precipitation. If a category data type is equal to 1, then the actual value was greater than the seasonal value. If a category data type is equal to 0, then the actual value was equal to (or substantially corresponded to) the seasonal value. If a category data type is equal to –1, then the actual value was less than the seasonal value. These relationships are summarized in the weather pattern legend 1102 presented in FIG. 11. Of course, values other than 1, 0, and –1 could be alternatively used to indicate these relationships.

The historical weather information in the weather history database 306 is provided on a per period basis. As indicated above, the period may be any increment of time, such as daily, weekly, bi-weekly, monthly, bi-monthly, quarterly, etc. Preferably, the increment of time represented by a period is the same in all of the databases.

The Administrator Setup 104 process determines the information that is stored in the analyzer input database 302. For example, the length of the period is specified during the Administrator Setup 104 process. Also, the years and the locations (i.e., MAs) to be represented in the weather history database 306 are specified in the Administrator Setup process. As noted above, the Administrator Setup process is customized by the system administrator 502 in accordance with the party's specifications. Additional information on the Administrator Setup 104 can be found below.

Note that the weather history database 306 is on a per MA basis, whereas the sales history database 304 is on a per store basis. Typically, a plurality of stores are located in each MA. The forecasting system 102 maintains a store/MA table 1002 (FIG. 10) that provides a mapping between stores and MAs. The information contained in the store/MA table 1002 is preferably provided by the party (i.e., the entity that owns and/or manages the stores).

Weather Patterns Database

The present invention makes use of a number of different weather patterns to characterize the weather that occurred during any given past period, or that is predicted to occur during any given future period. Preferred weather patterns are presented in FIG. 9. As indicated in FIG. 9, exemplary weather patterns employed by the present invention include temperature/precipitation, temperature/snow, sustained weather, temperature/precipitation lag 1 period, and temperature/snow lag 1 period. The present invention is not limited to these weather patterns, for example patterns also include temperature/precipitation/snow combinations.

The temperature/precipitation and temperature/snow weather patterns are self-explanatory.

The sustained weather pattern represents contiguous weeks (or other periods) of similar weather, for example having "temperature sustained two weeks" as a pattern.

The "temperature seasonal /precipitation seasonal lag 1 period" pattern represents the occurrence of "temperature seasonal /precipitation seasonal" in the previous week.

The temperature seasonal/snow seasonal lag 1 period is similar to the above.

As indicated by the above list, each weather pattern includes one or more weather parameters. For example, the temperature/precipitation weather pattern includes the temperature parameter and the precipitation parameter. For any given period, each parameter can be either seasonal, below seasonal, or above seasonal (except the sustained weather pattern, described above). For any given period, the values of these weather patterns are represented by the entries in the weather history database 306 having the category data type. For example, in 1994, the weather pattern in MSA100 during period P1 was temperature above seasonal/ precipitation above seasonal (see records 802 and 804 in FIG. 8). This weather pattern is abbreviated by T1P1 (see FIG. 11). The weather patterns 308 is a file containing but not limited to all patterns depicted in FIG. 9. This file is used as the "look up" to allow the system to determine which patterns it will use.

Weather Forecast Database

An example weather forecast database 312 is shown in FIG. 22. The weather forecast database 312 includes, for each future year in the view, one or more records for each metropolitan area (MA). These records contain information specifying the weather that is predicted to occur in the subject MA in the future time span represented in the view. Specifically, for each MA, there is a record for each of several weather data types.

There are also three classes of weather data types as in the weather history database: seasonal, actual, and category (also called weather pattern). These are the same as those described above with respect to the weather history database 306. Accordingly, the description above of the weather history database 306 also applies to the weather forecast database 312.

Relationship Between Past and Future Databases

As evident by the description above, the sales history database 304, weather history database 306, and weather patterns database 308 are past databases because they contain historical information. The weather forecast database 312 is a future database because it contains information pertaining to predicted weather in the future.

All of these databases contain information on a per period basis. The increment of time represented by a period is the same in all of the databases. Suppose that the increment of time is set equal to a month in the Administrator setup process. In this example, period P1 represents January. Specifically, in the sales history database 304, weather history database 306, and weather patterns database 308, period P1 represents January of a past year. In the weather forecast database 312, period P1 represents January of a future year.

Time Periods

As discussed above, data may be stored in the analyzer input database 302 and the weather forecast database 312 using any time increment or period, including but not limited to daily, weekly, monthly, quarterly, etc. For example, the revenue sales for each location may be stored in the sales history database 304 on a daily basis, a weekly basis, a monthly basis, or a quarterly basis. Similarly, weather forecast information for each location may be stored in the weather forecast database 312 on a daily basis, a weekly basis, a monthly basis, or a quarterly basis. Preferably, the time increment/period is the same in both the analyzer input database 302 and the weather forecast database 312. The time increment/period is preferably user selectable. In practice, the system administrator selects the time increment/period during the administrator setup 104 process (described below).

Operation of the Analyzer

Figure 6:
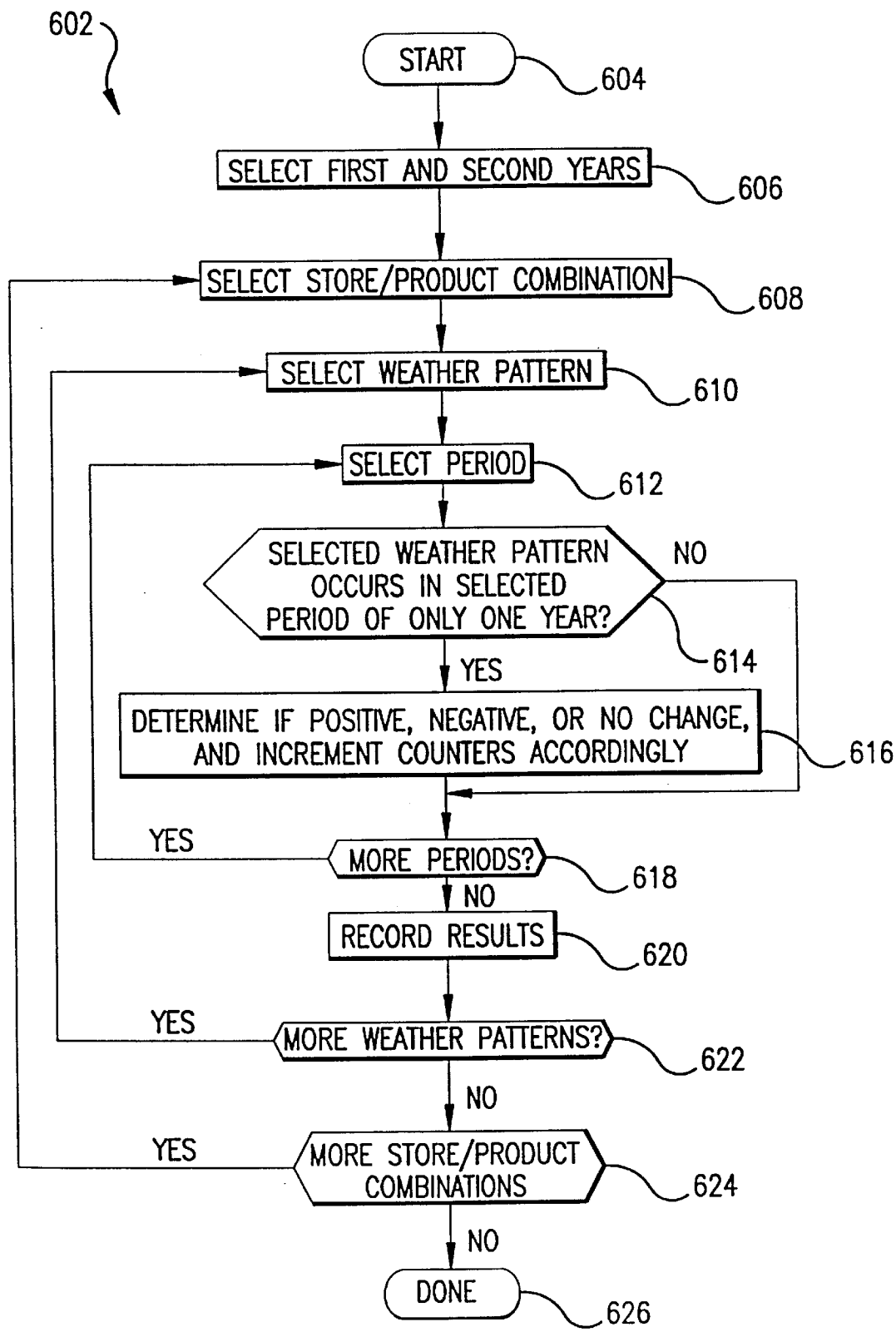
FIGS. 6, 13A, 13B, 14, 15, 16, 17, 18, 19, 20, and 21 are flowcharts depicting the preferred operation and control flow of the present invention.

As noted above, analyzer 106 determines the manner in which the retail performance of each product at each store was affected by weather. Such operation of the analyzer 106 shall now be described. Reference shall be made to a flowchart 602 in FIG. 6, which represents the steps performed by the analyzer 106 while performing step 2112 in FIG. 21 (described above). Flowchart 602 begins with step 604, where control immediately flows to step 606.

In step 606, the analyzer 106 selects two prior years for evaluation. Preferably, the analyzer 106 in step 606 selects the immediately two prior years for evaluation (in which case these years are referred to as Year N–1, and Year N–2, where N is the current year), but the analyzer 106 could alternatively select any two or more past years for analysis. Assume, for purposes of illustration, that the analyzer 106 selected 1994 and 1995.

In step 608, the analyzer 106 selects a store/product combination. That is, the analyzer 106 selects a store and a product for evaluation. For purposes of illustration, assume that the analyzer 106 selects Store001, and the product HATS.

In step 610, the analyzer 106 uses the weather patterns database 308 and selects a weather pattern for evaluation. For illustrative purposes, assume that the analyzer 106 asserts the T1P1 weather pattern for evaluation (temperature above seasonal/precipitation above seasonal).

At this point, the analyzer 106 has selected a store, a product, and a weather pattern for evaluation. The analyzer 106 has also selected two years on which to base the evaluation. In the following steps, the analyzer 106 determines the extent to which the selected weather pattern (in this case, T1P1) affected the retail performance of the selected product (HATS) in the selected store (Store001) over the selected two years (1994 and 1995).

In step 612, the analyzer 106 selects a period for evaluation. Suppose that the analyzer 106 selects period P1.

In step 614, the analyzer 106 determines whether the selected weather pattern occurs in the selected period of only one of the two selected years. Consider, for example, records 802–805 in the weather history database 306 shown in FIG. 8. In period P1, the weather pattern T1P1 occurred in both 1994 and 1995.

If the analyzer 106 in step 614 determined that the selected weather pattern did not occur in the selected period of only one of the two selected years (as was the case in period P1; this is also the case in periods P2, P4, P5, and P6), then step 618 is performed. In step 618, the analyzer 106 selects another period for evaluation.

If, instead, the analyzer 106 in step 614 determined that the selected weather pattern did occur in the selected period of only one of the two selected years (as is the case in period P3; note that the weather pattern T1P1 occurs only in 1995), then step 616 is performed.

In step 616, the analyzer 106 determines whether the selected weather pattern had a positive impact, a negative impact, or no impact on retail performance in the selected period from Year N–2 to Year N–1. The selected weather pattern had a positive impact if performance improved in the selected period from Year N–2 to Year N–1. The selected weather pattern had a negative impact if performance worsened in the selected period from Year N–2 to Year N–1. The selected weather pattern had no impact if performance was the same in the selected period from Year N–2 to Year N–1. Referring to the sales history database 304 in FIG. 7, note that net revenue for HATS in Store001 in Period 3 was $60 for 1994, and $30 for 1995. Thus, the selected weather pattern T1P1 had a negative impact on the sales of HATS in Store001 during period P3 from 1994 to 1995.

Also in step 616, the analyzer 106 increments the positive counter, negative counter, or the no change counter. The positive counter is incremented if it is determined that the selected weather pattern had a positive impact on retail performance in the selected period from Year N–2 to Year N–1. The negative counter is incremented if it is determined that the selected weather pattern had a negative impact on retail performance in the selected period from Year N–2 to Year N–1. The no change counter is incremented if it is determined that the selected weather pattern had no impact on retail performance in the selected period from Year N–2 to Year N–1.

In step 618, the analyzer 106 determines if there are other periods to process. The number of periods in any given year were previously determined during the view process, as discussed above. If there are additional periods to process, then control returns to step 612. The analyzer 106 processes steps 612, 614, 616, and 618 for each period in the years selected in step 606.

If there are no more periods to process, then step 620 is performed. In step 620, the analyzer 106 stores the results for the selected weather pattern. This data is stored in the analyzer output database 310. An example analyzer output database 310 is shown in FIG. 12. The analyzer output database 310 includes a record for each weather pattern/store/product combination. Each record stores the positive count, the negative count, and the no change count for the weather pattern/store/product combination. These counts indicate the manner in which the selected weather pattern impacted the retail performance of the selected product in the selected store.

In step 622, the analyzer 106 determines whether there are additional weather patterns to process. Preferably, the analyzer 106 processes all possible weather patterns (see FIG. 9)for each product/location combination. In step 623, the analyzer 106 calculates a score for each pattern for each product/location combination and stores these scores in the file "AEOUTPUT.DAT".

If there are additional weather patterns to process, then control returns to step 610. Otherwise, control flows to step 624.

In step 624, the analyzer 106 determines whether there are additional store/product combinations to process. Preferably, all store/combinations are processed. If there are additional store/product combinations to process, then control flows to step 609. Otherwise, flowchart 602 is complete, as indicated by step 626.

Operation of the Configurator

Figure 13A:
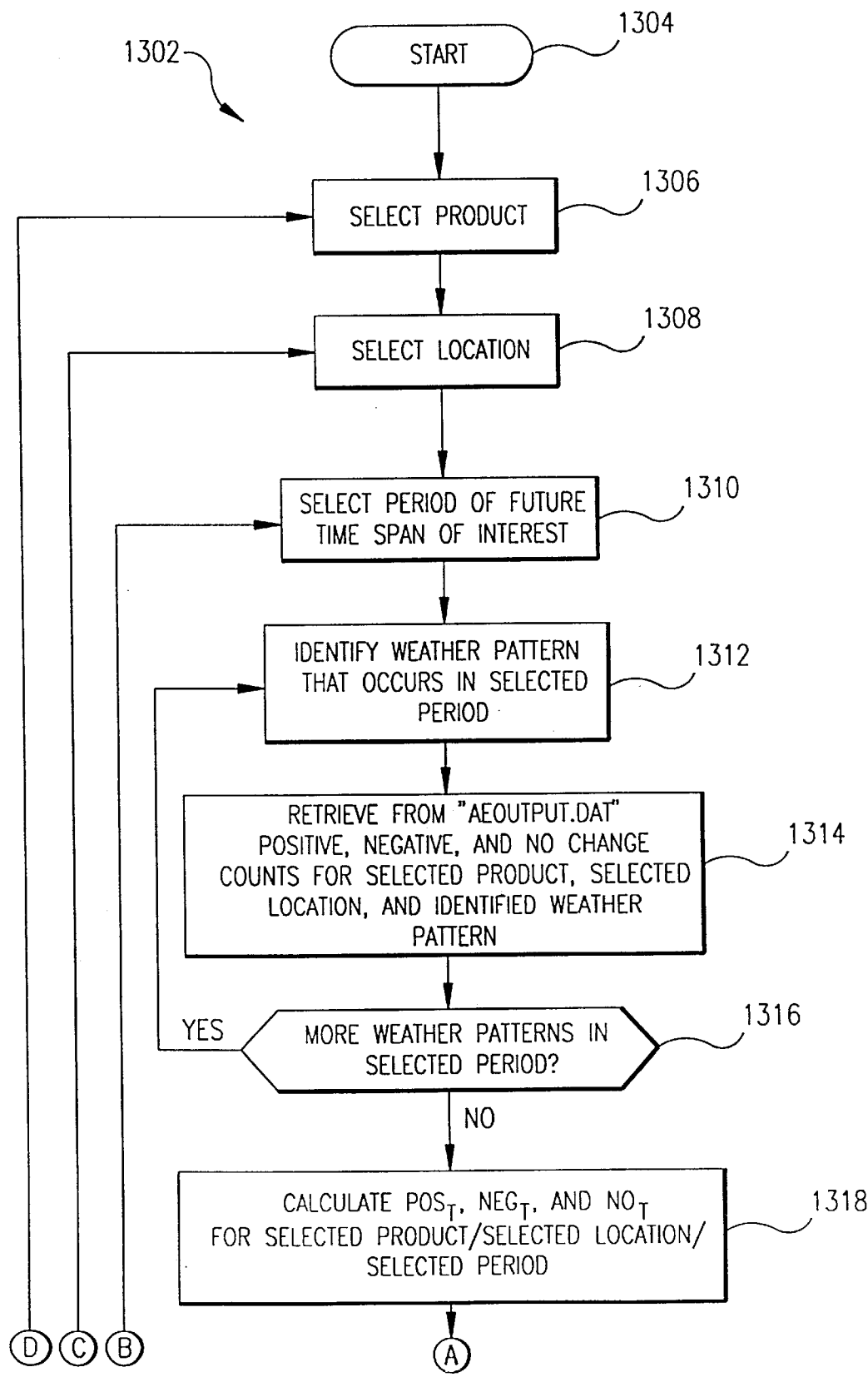

As discussed above, the configurator 108 determines the expected future retail performance of each product at each store. When performing this task, the configurator 108 takes into consideration the affects of predicted future weather. Such operation of the configurator 108 shall now be described in detail with reference to a flowchart 1302 presented in FIGS. 13A and 13B. Flowchart 1302 represents the operation of the configurator 108 while performing step 2112 in FIG. 21. Flowchart 1302 begins with step 1304, where control immediately passes to step 1306.

In step 1306, the configurator 108 selects a product to evaluate. For illustrative purposes, assume that the configurator 108 selects HATS.

In step 1308, the configurator 108 selects a location or store to evaluate. Assume that the configurator 108 selects Store001.

In step 1310, the configurator 108 selects a period in a future time span to evaluate. Assume that the configurator 108 selects period P1 in the future time span.

At this point, the configurator 108 has selected a product, a store, and a future period. In the following steps, the configurator 108 estimates the retail performance of the selected product in the selected store during the selected future time period. In doing this, the configurator 108 takes into account the affect of the weather that is predicted to occur in the future time span.

In step 1312, the configurator 108 identifies the weather pattern that occurs in the predicted future time period. Consider, for example, weather forecast database 312 in FIG. 22. As indicated by records 2202 and 2204, the predicted weather pattern in MSA100 (where Store001 is located; see FIG. 10) in future period P1 is T1P1. Accordingly, in this example, the configurator 108 in step 1312 identifies weather pattern T1P1 as occurring in the selected future time period P1.

Many weather patterns potentially occur in any given period. For example, the weather pattern T1S1 (temperature above seasonal/snowfall above seasonal) also occurs in future time period P1. In step 1312, the configurator identifies all weather patterns that occur in the selected future time period.

In step 1314, the configurator 108 determines the manner in which these identified weather patterns have, in the past, impacted the sale of the selected product in the selected store. In particular, in step 1314 the configurator 108 retrieves from the analyzer output database 310 (also called "aeoutput. dat") the positive, negative, and no change counts for the selected product/selected store combinations. The configurator 108 does this for each identified weather pattern. The configurator 108 stores these counts in a temporary memory location.

Consider the example analyzer output database 310 shown in FIG. 12. In step 1314, the configurator 108 retrieves the positive, negative, and no change counts from record 1202. This record corresponds to Store001 (the selected store), HATS (the selected product), and T1P1 (one of the weather patterns identified in the selected period P1). Also in step 1314, the configurator 108 retrieves the positive, negative, and no change counts from record 1204. This record corresponds to Store001 (the selected store), HATS (the selected product), and T1S1 (the other weather pattern identified in the selected period P1).

As indicated above, the configurator 108 performs steps 1312 and 1314 for every predicted weather pattern identified in the selected period. This is indicated by step 1316. After all weather patterns in the selected period have been identified (in step 1312) and processed (in step 1314), control flows to step 1318.

In step 1318, the configurator 108 totals all positive counts to obtain a total positive count for the selected period. Also, the configurator 108 totals all negative counts to obtain a total negative count for the selected period. Also, the configurator 108 totals all no change counts to obtain a total no change count for the selected period. In the example of FIG. 12, the total positive count is 4, the total negative count is 1, and the total no change count is 0.

In step 1320, the configurator 108 uses the total positive count, the total negative count, and the total no change count to obtain a score for the selected future period. This score represents an indication of the predicted strength of the market for the selected product in the selected store for the selected future time period in view of the predicted weather. The manner in which this score is generated is discussed below.

In step 1322, the configurator 108 determines whether there are additional periods in the future time span to process for the selected product/selected store combination. The user 402 preferably specifies the periods in the future time span to process. If there are more periods to process, then control returns to step 1310. Otherwise, control flows to step 1324.

In step 1324, the configurator 108 stores information pertaining to the selected product/selected store combination in the configurator output database 1390 (also called "confout.dat"). The configurator output database 1390 includes a record for each store/product combination. Each record stores the total positive count, total negative count, total no change count, and score for each period for the store/product combination.

In step 1326, the configurator 108 determines whether there are any additional locations (i.e., stores) to analyze. Preferably, the user 402 selects the locations to analyze. If there are more stores to analyze, then control returns to step 1308. Otherwise, control flows to step 1328.

In step 1328, the configurator 108 determines whether there are any other products to analyze. If there are more products to analyze, then control returns to step 1306. Otherwise, flowchart 1302 is complete, as indicated by step 1330.

Calculating Scores

Figure 13B:
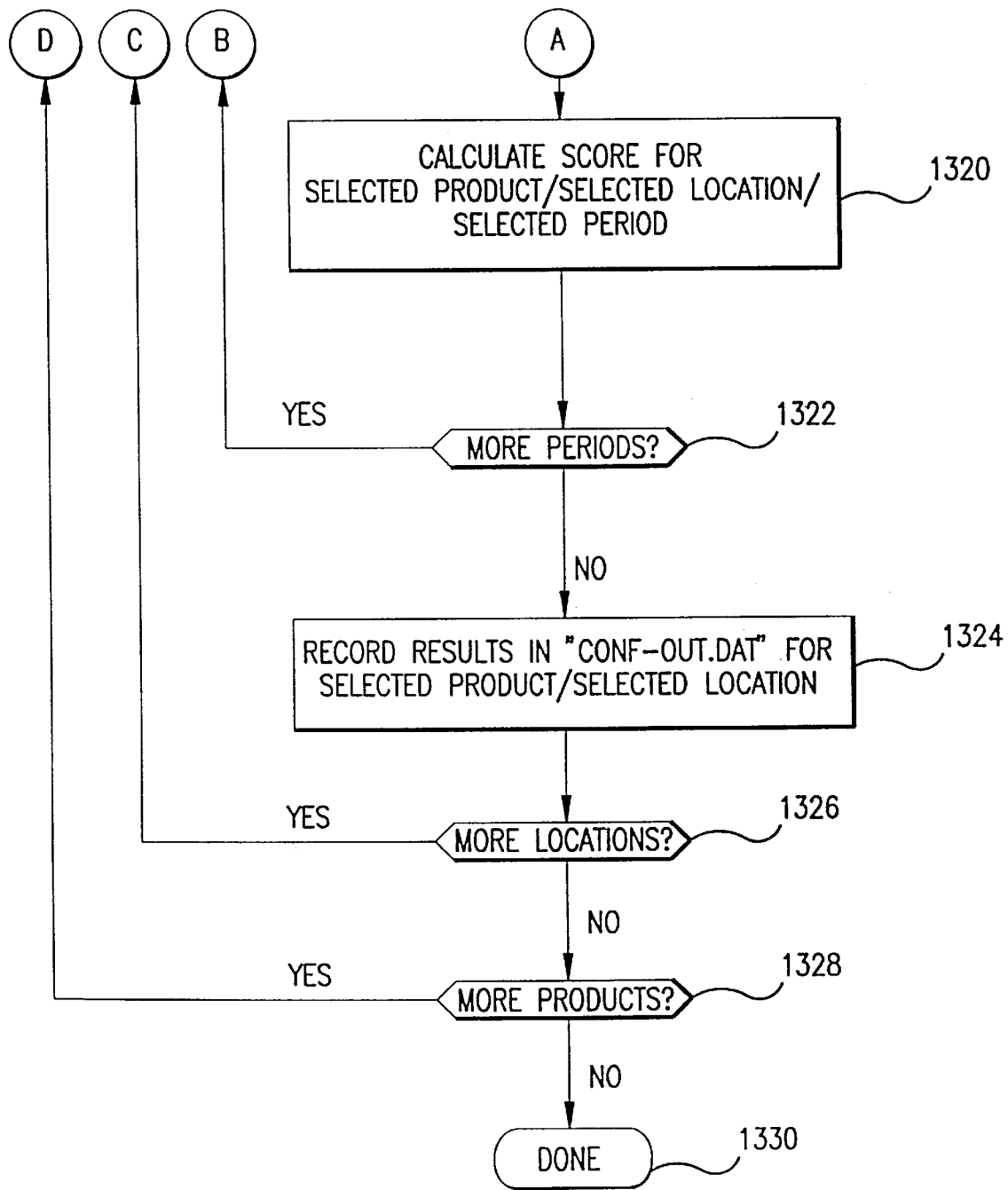

As discuss above, the configurator 108 in step 1320 of FIG. 13B uses the total positive count, the total negative count, and the total no change count to obtain a score for the selected future period. This score represents an indication of the predicted strength of the market for the selected product in the selected store for the selected future time period in view of the predicted weather. Also discussed above, the analyzer 106 in step 623 of FIG. 6 uses the total positive count, the total negative count, and the total no change count to obtain a score for each weather pattern for each store/product combination across all historical periods processed. The manner in which these scores is are generated shall now be discussed.

Figure 16:
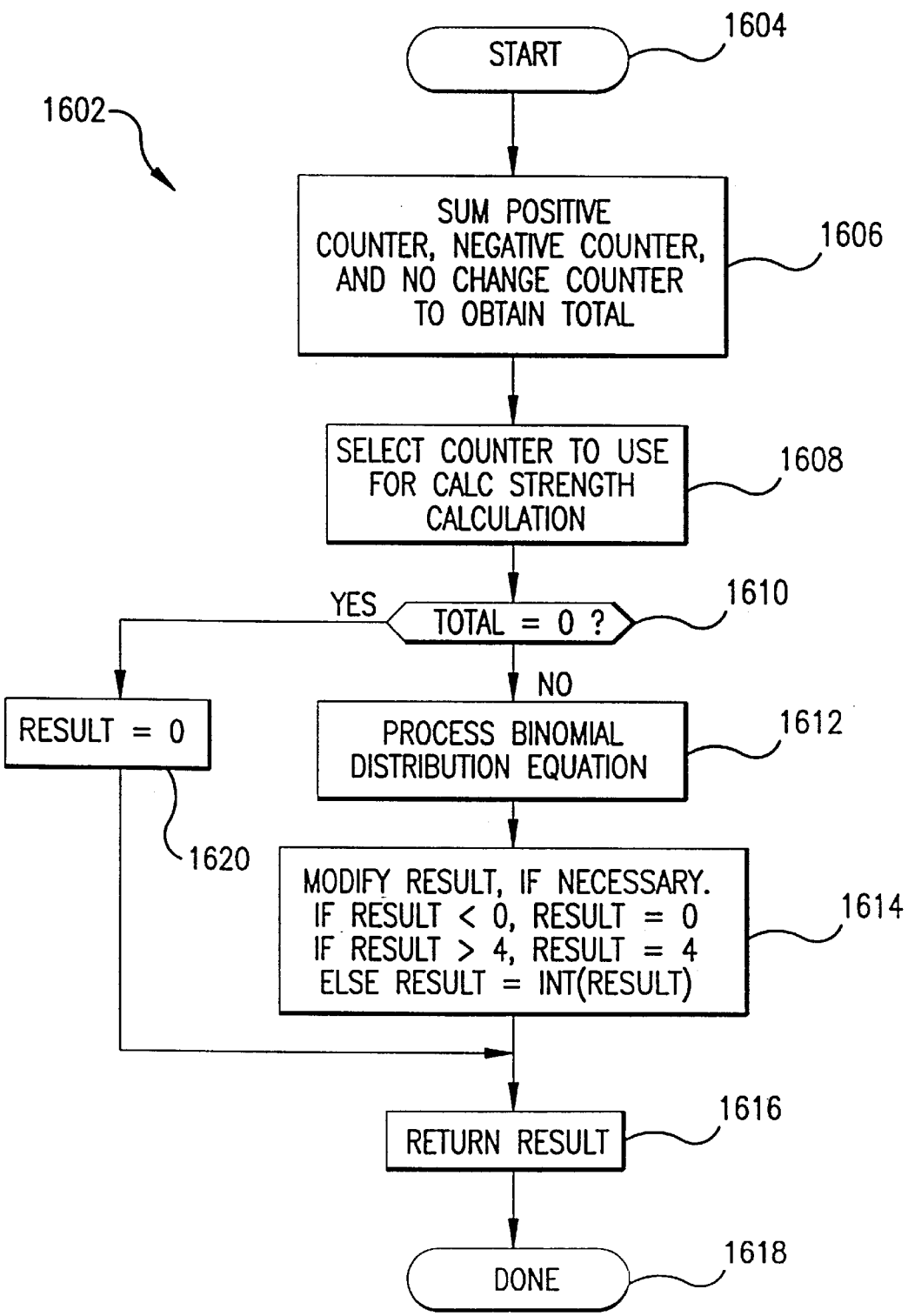

The invention uses a "calc strength" algorithm/calculation to calculate scores for both the analyzer 106 and configurator 108. The calc strength algorithm itself uses a well known binomial distribution algorithm. For example, The steps that make up the calc strength algorithm are depicted in a flowchart 1602 shown in FIG. 16 which displays the use of the calc strength algorithm in the configurator 108. Flowchart 1602 begins with step 1604, where control immediately passes to step 1606.

In step 1606, the configurator 108 sums the positive count, the negative count, and the no change count to obtain a total count for each future period. In the example of FIG. 12, described above, the total positive count is 4, the total negative count is 1, and the total no change count is 0. Accordingly, in step 1606 the configurator 108 obtains a total count of 5.

In step 1608, the configurator 108 selects either the positive count, the negative count, or the no change count in the calc strength calculation. The configurator 108 preferably selects the greater of either the positive count, the negative count, and the no change count. In the example of FIG. 12, the total positive count is greater than either the total negative count or the total no change count. Accordingly, the configurator 108 in step 1608 selects the positive count to use.

In step 1610, the configurator 108 determines whether the total count is equal to zero. If it is equal to zero, then in step 1620 the configurator 108 sets the results of the calc strength calculation to zero. If the total count is not equal to zero, then step 1612 is performed.

In step 1612, the configurator 108 processes the binomial distribution equation that is part of the calc strength calculation. The preferred binomial distribution equal is as follows:

$$\frac{\frac{selectedcount}{totalcount} - 0.5}{\sqrt{ABS\frac{(0.5*(1-0.5))}{totalcount}}} \qquad \text{Equation 1}$$

In step 1614, the configuration 108 modifies (or limits) the result of Equation 1. In particular, if the result of Equation 1 is less than 0, then the result is set equal to 0. If the result is greater than 4, then the result is set equal to 4. If the result is within the range of 0 to 4 (inclusive), then the result is set equal to the integer component of the result (this integer function may alternatively be performed by code outside of the configurator 108). It is noted that this range is implementation dependent, and can be other values.

In step 1616, the result is returned. This result represents the score. Flowchart 1602 is complete after step 1616 is performed, as indicated by step 1618.

Operation of the GUI

The GUI 110 enables users to perform the Administrator Setup 104 which prepares and processes the analyzer input database 302. Also, As discussed above, the GUI 110 enables users 402 to extract and analyze in meaningful ways information from the analyzer output database 310, the weather forecast database 312, and the configurator output database 314. The operation of the GUI 110 shall now be discussed in detail.

Figure 20:
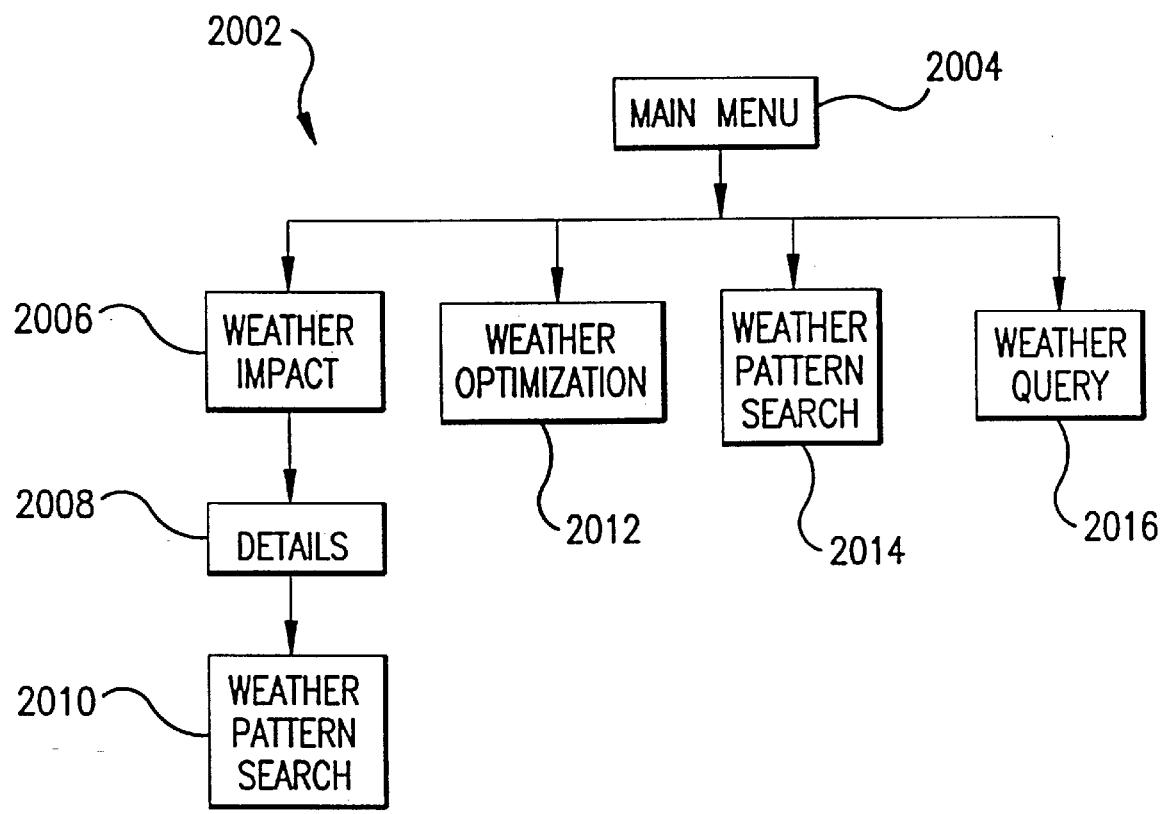

FIG. 20 depicts the manner in which users 402 may navigate through functions and services provided by the forecasting system 102. Users 402 navigate through the system 102 as shown in FIG. 20 via interaction with the GUI 110. It should be understood that the control flows shown in FIG. 20 are presented for example purposes only. The GUI 110 of the present invention is sufficiently flexible and configurable such that users 402 may navigate through the system 102 in ways other than that shown in FIG. 20.

Upon initiation of the forecasting system 2004, the user 402 is presented with a main menu 2004. The main menu 2004 is preferably displayed on the computer monitor 224 (this is true of all screens described herein). The main menu 2004 provides to the user 402 various menu selections, such as administrator setup 104, weather impact 2006, weather optimization 2012, weather pattern search 2014, and location report 2018. The user 402 must first navigate through the administrator setup 104 before proceeding to other menu selections.

Administrator Setup

Figure 37:
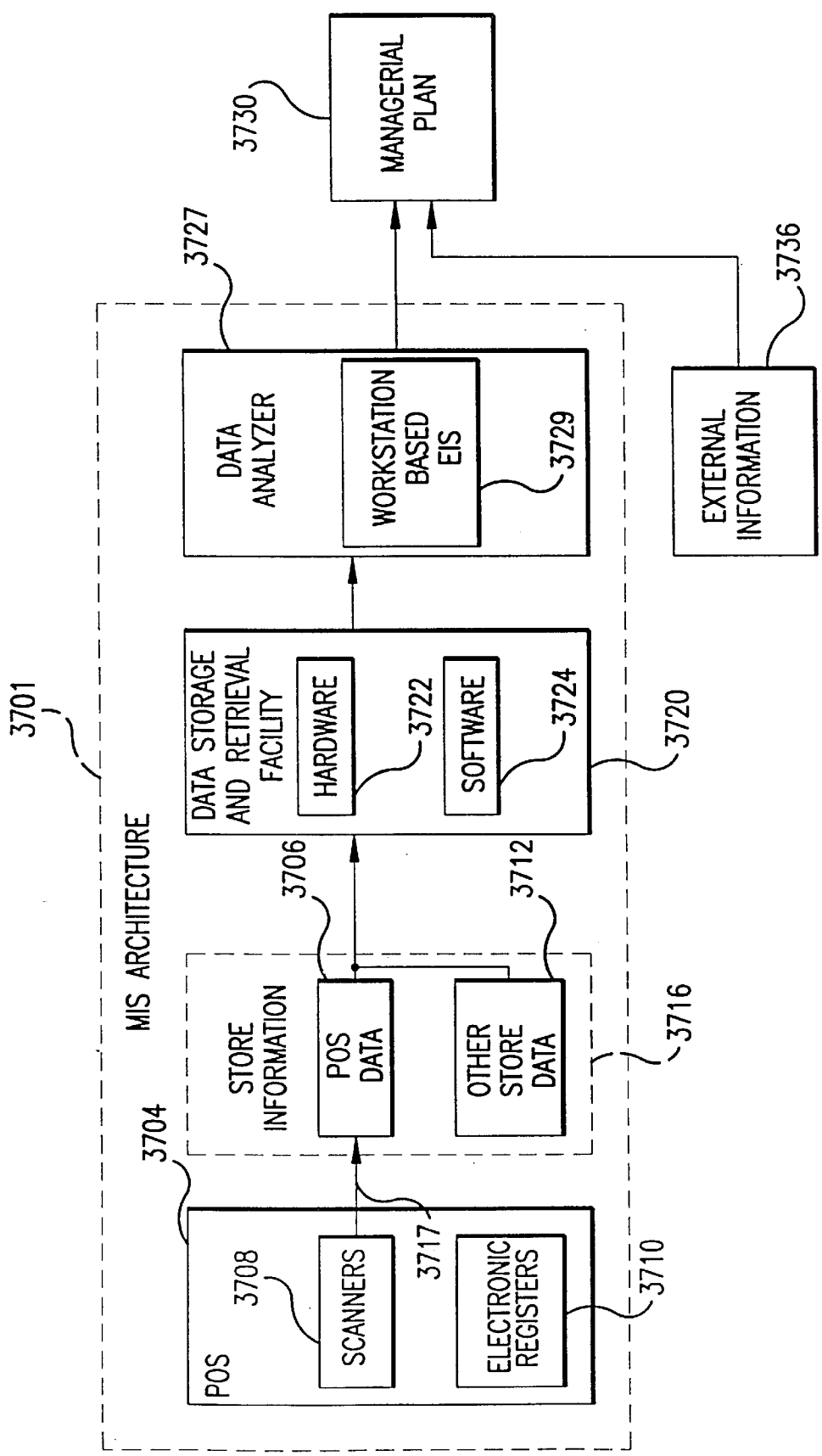
FIG. 37 is a block diagram of a conventional MIS system architecture used in the retail industry.

FIG. 37 presents a screen from GUI 110 that represents the operation of the present invention when performing the administrator setup 104. The system administrator 502 uses the administrator setup 104 to prepare the analyzer input database 302 for use with the analyzer 106. In particular, the administrator setup 104 is used to filter the all weather database 505 and the sales history database according to the client's specifications so as to generate the analyzer input database 302 and the weather forecast database 312, as discussed above.

Figure 38:
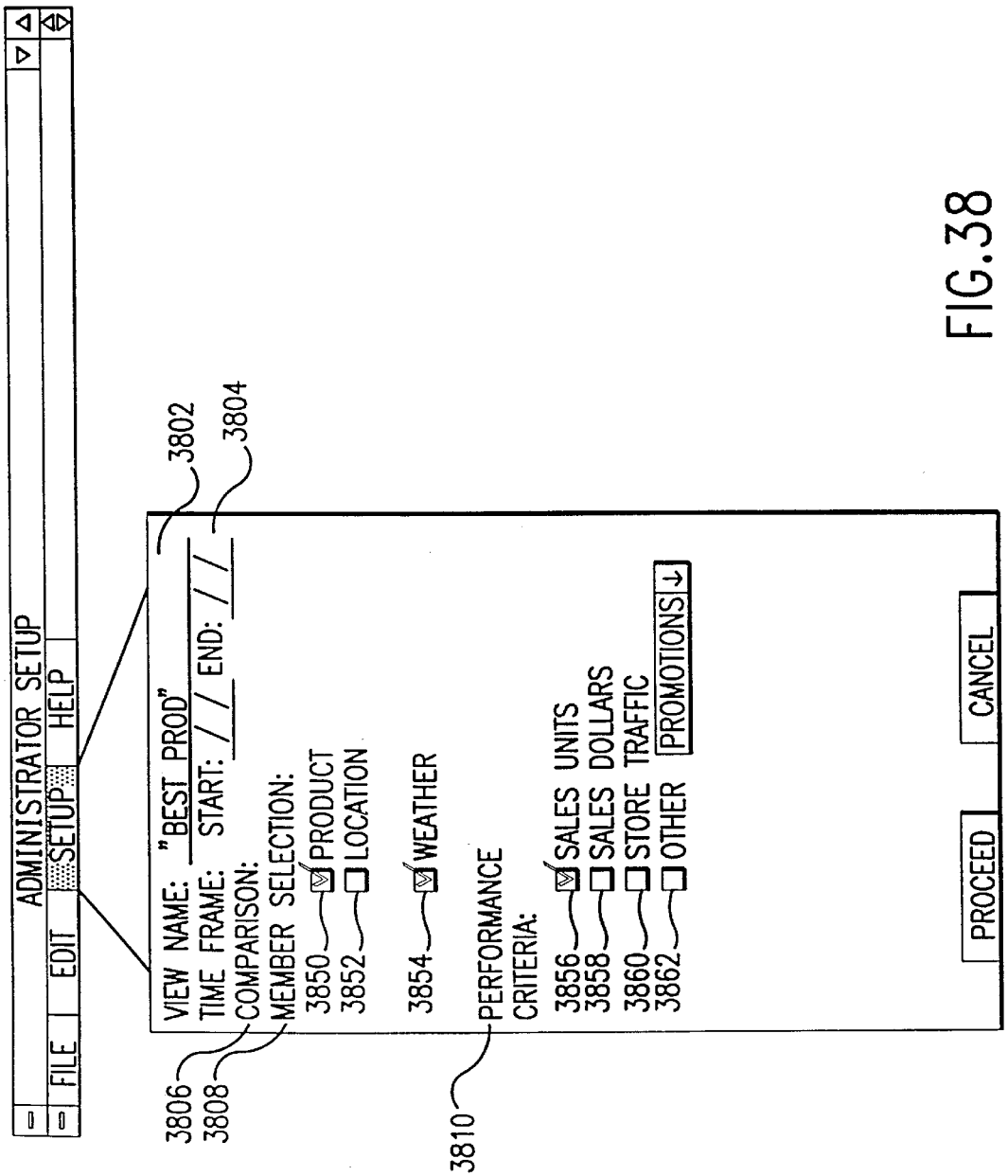

Referring to FIG. 38, the first step in the administrator setup 104 is to define a view name 3802. The view name 3802 is typed by the system administrator 502. The view name 3802 is any file name supported by the underlying operating system. The view name is simply the name of the view that is being created.

Figure 39:
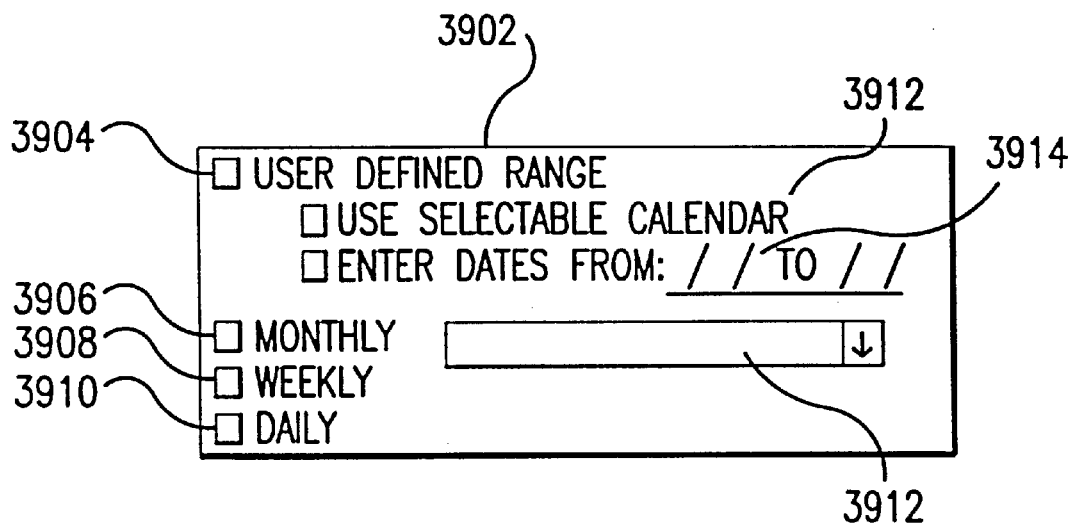
Figure 40:
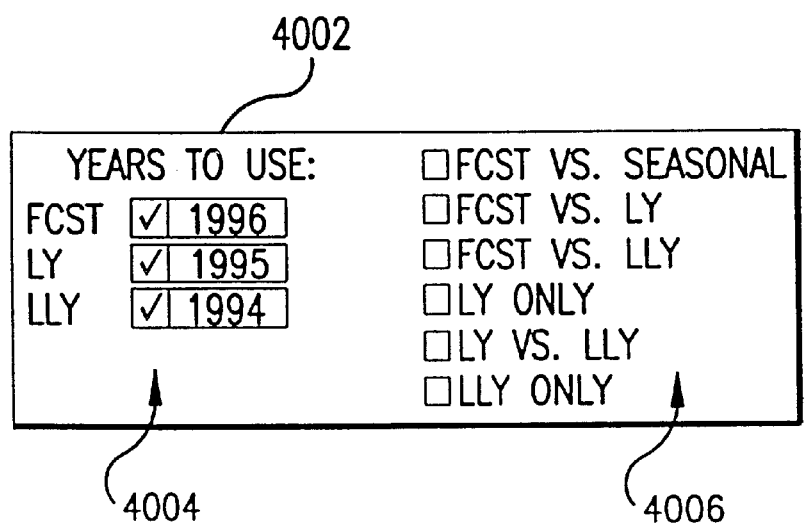

The system administrator 502 then enters a time frame in field 3804. The time frame represents the time span of the view. Preferably, the system administrator 502 double clicks on "Time Frame," which results in the display of a time frame entry window 3902 in FIG. 39. In FIG. 39, the system administrator 502 can either select and enter a user defined range (see checkbox 3904), a monthly range (see checkbox 3906), a weekly range (see checkbox 3908, or a daily range (see checkbox 3910). For either the monthly range, the weekly range, or the daily range, the user enters the month, week, or day, respectively, in field 3912. If user defined range is selected, then the system administrator 502 can manually enter the ranges (see 3914), or can use a calendar (see 3912). If the system administrator 502 elects the calendar option, then a calendar window 4202 is displayed. In this calendar window 4202, the system administrator 502 can select the days to be included in the view.

Referring again to FIG. 38, the system administrator 502 then selects a comparison option. Preferably, the system administrator 502 double clicks on a comparison button 3806, which results in the display of a comparison option window 4002. The comparison option window 4002 includes field 4004 where the system administration 502 can enter the years that will be represented in the view (FCST stands for forecast, LY stands for last year, and LLY stands for two years ago). Recall that the analyzer 106 utilized two prior years in its calculations. LY and LLY preferably represents those two years.

The comparison option window 4002 also includes checkboxes 4006 where the system administrator 502 can select which type of comparison will be used for the current view. The comparison defines how the category values are to be determined. For example, if the comparison selected is forecast versus last year, then the category values are determined based on a comparison of forecast values and last year's values.

Figure 24:
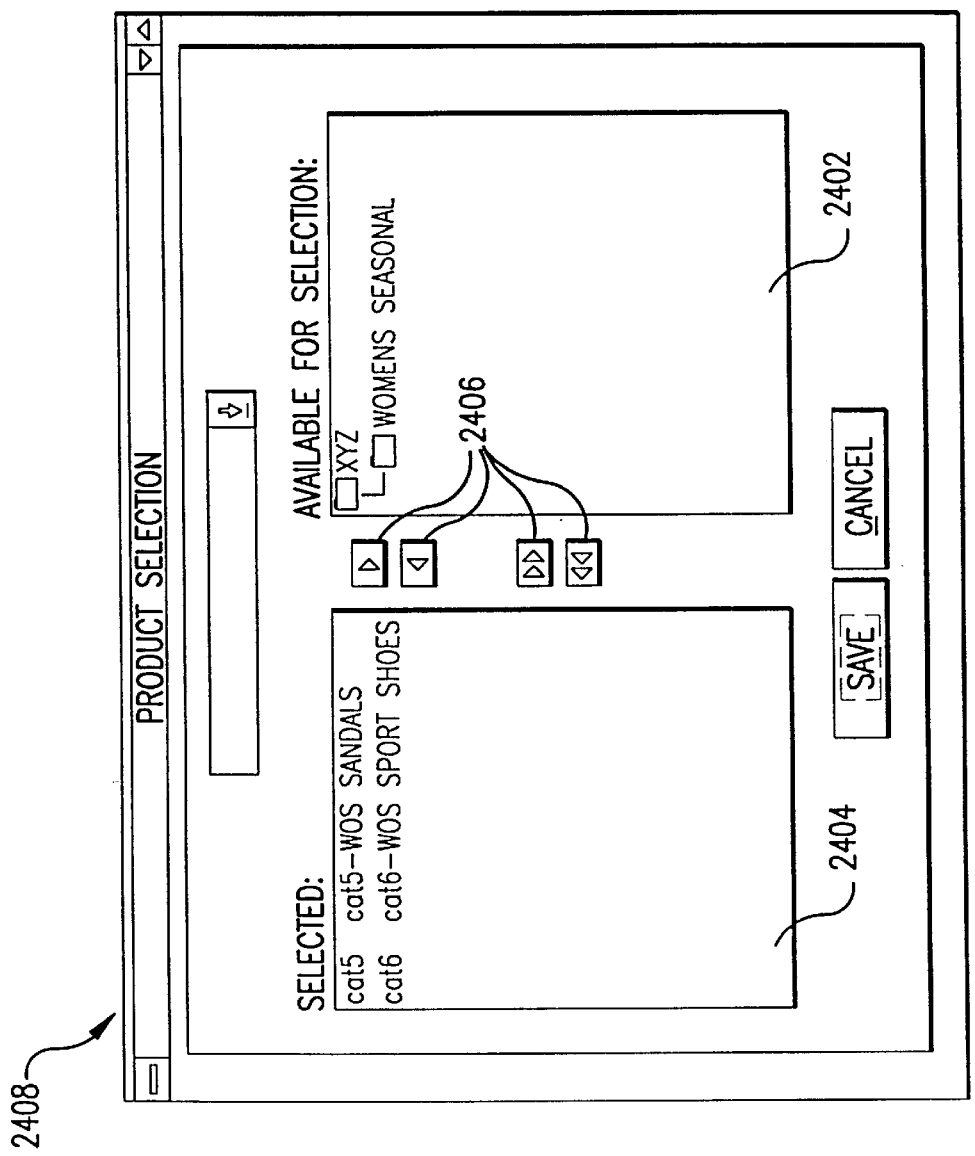
Figure 25:
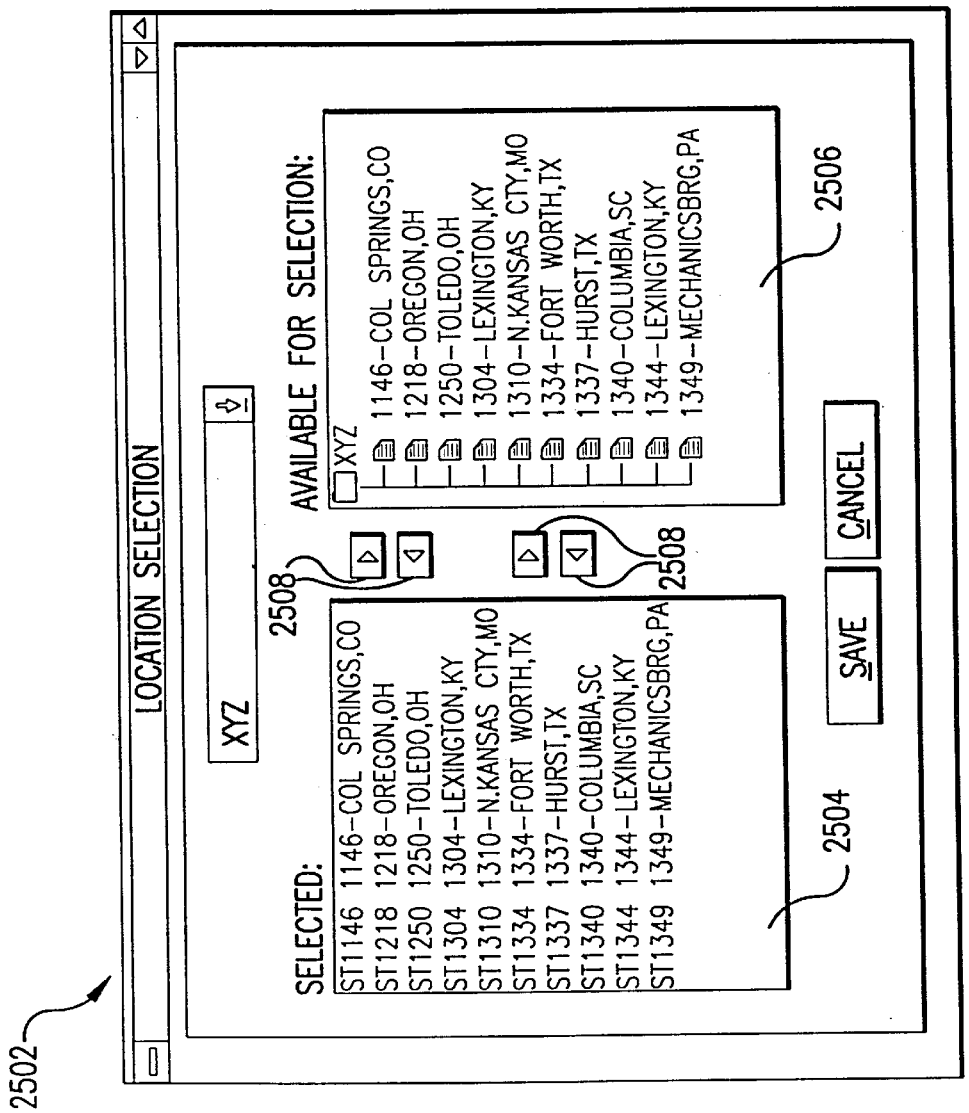
Figure 41:
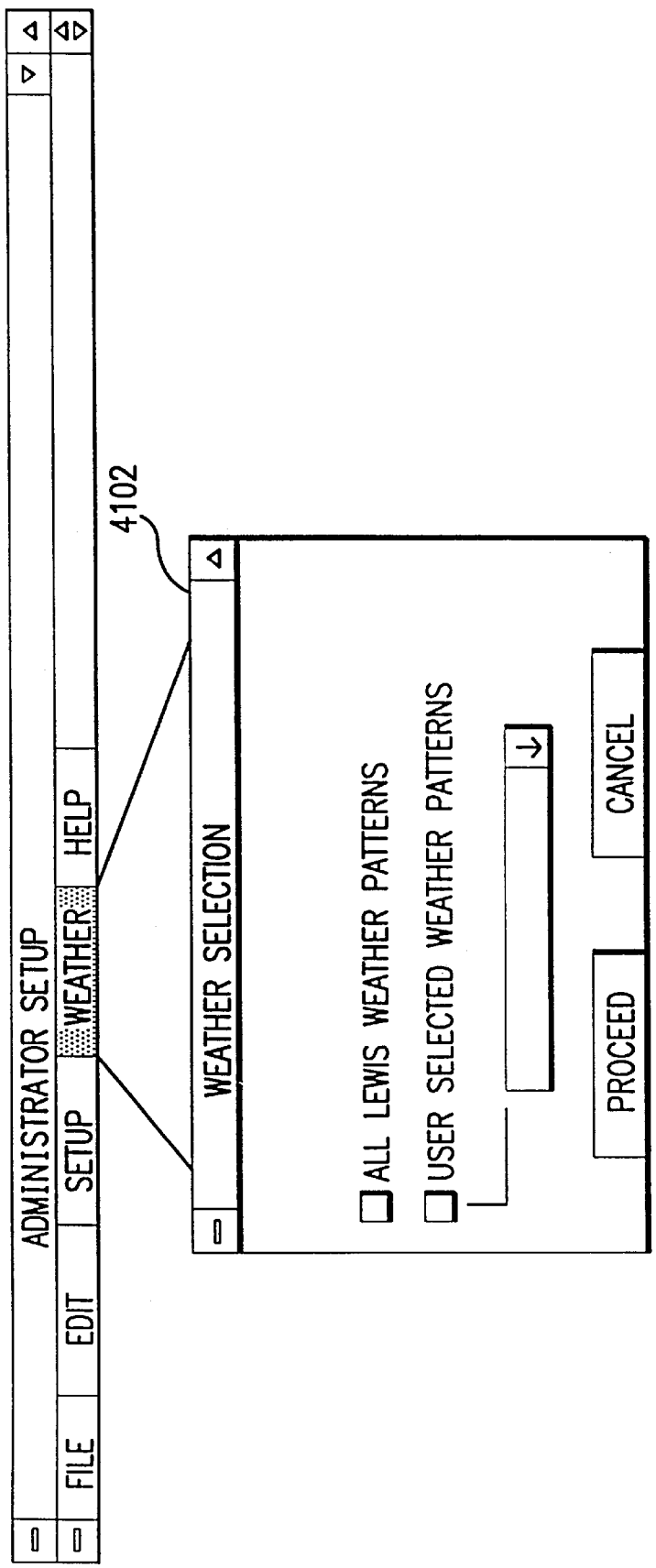
Figure 42:
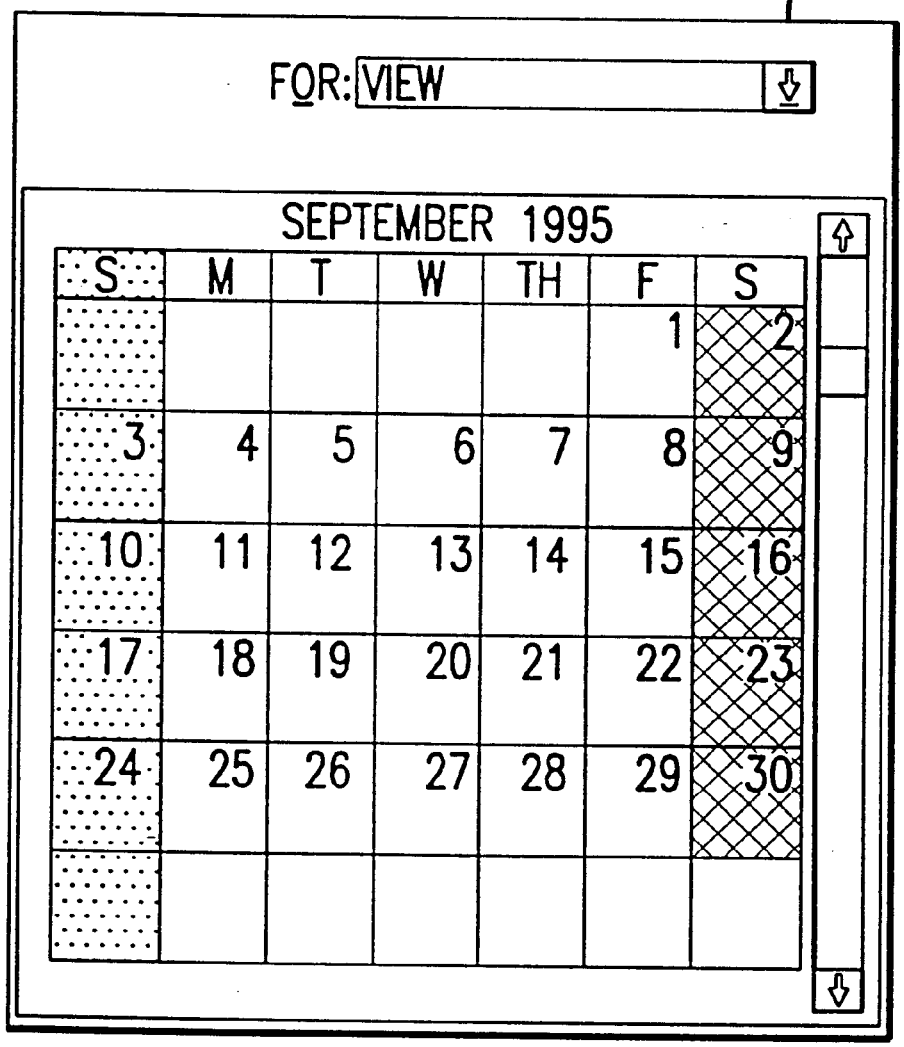

Referring again to FIG. 38, the system administrator 502 can then select which members he wishes to limit. This is done in the member selection field 3808. If the system administrator 502 wishes to limit the products that are to be in the view, then the system administrator 502 checks the product checkbox 3850. In this case, the product selection window 2408 in FIG. 24 is displayed. If the system administrator 502 wishes to limit the locations that are to be in the view, then the system administrator 502 checks the locations checkbox 3850. In this case the location selection window 2502 in FIG. 25 is displayed. If the system administrator 502 wishes to limit the weather patterns that are to be in the view, then the system administrator 502 checks the weather checkbox 3854. In this case, the weather selection window 4102 in FIG. 41 is displayed. All products, locations, and/or weather patterns are included in the view if the corresponding checkbox 3850, 3852, and/or 3854, respectively, is not checked.

Referring back to FIG. 38, the system administrator 502 can select which retail performance metric to include in the view. This is done via the performance criteria fields 3810. Suppose that the sales history database 304 multiple metrics, such as sales units, sales dollars, etc. The system administrator 502 can select which of these to include in the view by checking the appropriate checkboxes 3856, 3858, 3860, 3862 in the performance criteria field 3810.

It is noted that the above has been described in the context of the system administrator 502 performing the steps. Alternatively, the user 402 may perform the administrator setup function 104.

After the view has been configured, the other menu options shown in FIG. 20 can be accessed (alternatively, the user can load in a previously configured and saved view). These menu options are described below.

Weather Impact

Figure 14:
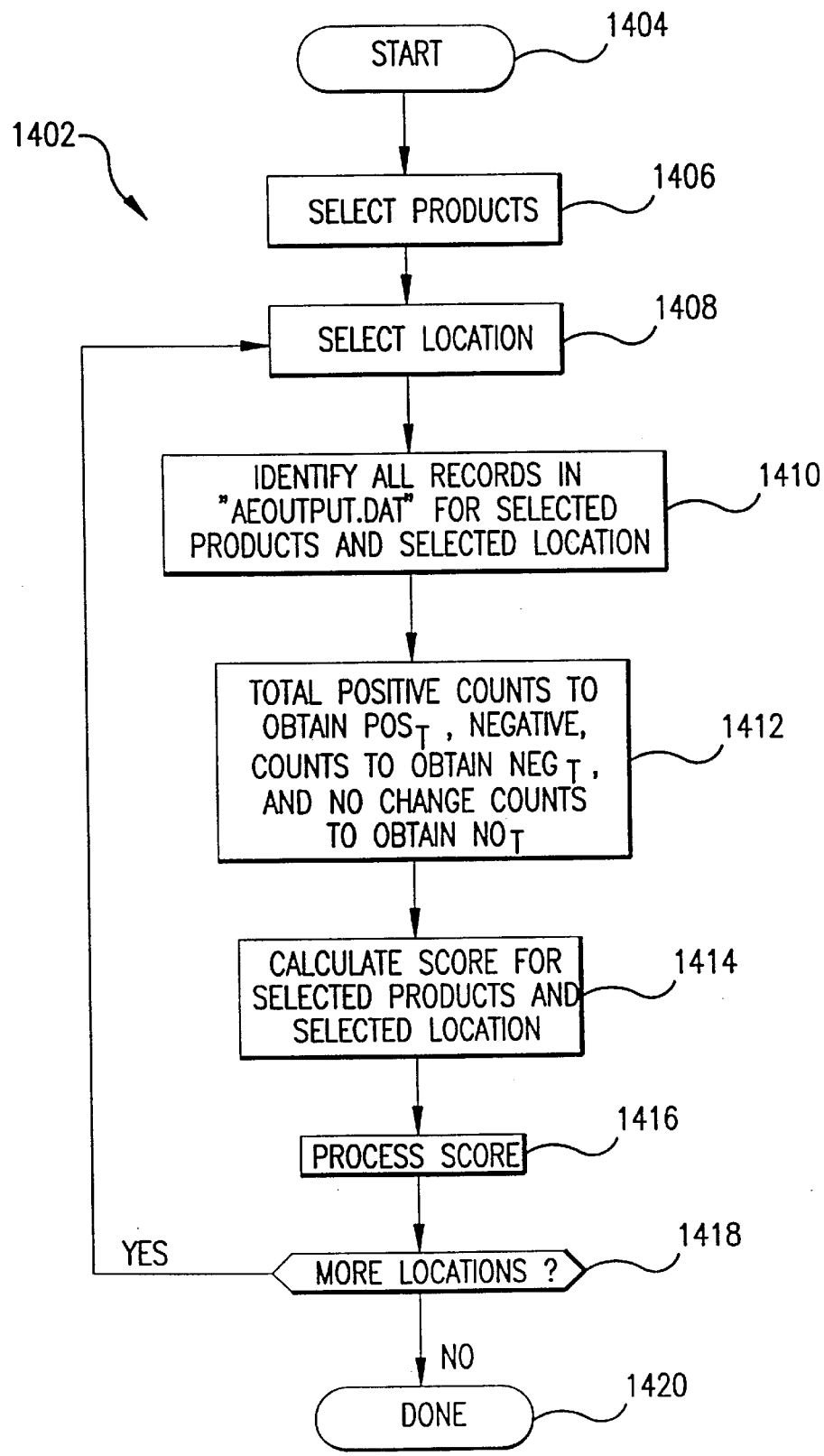

FIG. 14 presents a flowchart 1402 that represents the operation of the present invention when performing the weather impact function 2006.

In step 1406, the GUI 110 enables the user 402 to select one or more products for analysis. The GUI 110 performs step 1406 by displaying a product selection window 2408 as shown in FIG. 24. Products that are available for selection are displayed in an Available for Selection box 2402. Products that have been selected by the user 402 are displayed in a Selected box 2404. The user 402 moves products between these two boxes 2402, 2404 using arrows 2406 in a well known manner.

In step 1408, the GUI 110 enables the user 402 to select one or more locations for analysis. The GUI 110 performs step 1408 by displaying a location selection window 2502. Locations that are available for selection are displayed in an Available for Selection box 2506. Locations that have been selected by the user 402 are displayed in a Selected box 2504. The user 402 moves locations between these two boxes 2504, 2506 using arrows 2508 in a well known manner.

It is noted that steps 1406, 1408 are not necessarily performed when the user selects the weather impact option 2006 from the main menu 2004. Steps 1406, 1408 could have been performed prior to the user 402's selection of the weather impact option 2006. For example, the main menu 2004 could include a Select Products option and a Select Location option.

In step 1410, the configurator 108 accesses the analyzer output database 310 (also called "aeoutput.dat") and retrieves all records for the selected products/selected locations combinations. For example, if the user 402 selected Store001, Store002, BOOTS, and HATS, then the configurator 108 in step 1410 would select records 1202, 1204, 1206, and 1208 in the example analyzer output database 310 shown in FIG. 12.

In step 1412, for each selected location, the configurator 108 sums the positive counts to obtain a total positive count. The configurator 108 also sums the negative counts to obtain a total negative total, and the no change counts to obtain a total no change total.

In step 1414, the configurator 108 calculates a score for each location. The manner in which scores are calculated is described above. These scores indicate the degree to which the sales of the selected products at each selected location are impacted by the affects of weather. The more positive the score, the greater the positive impact. The more negative the score, the greater the negative impact. If the score is zero, then weather does not have an overall impact.

Figure 23:
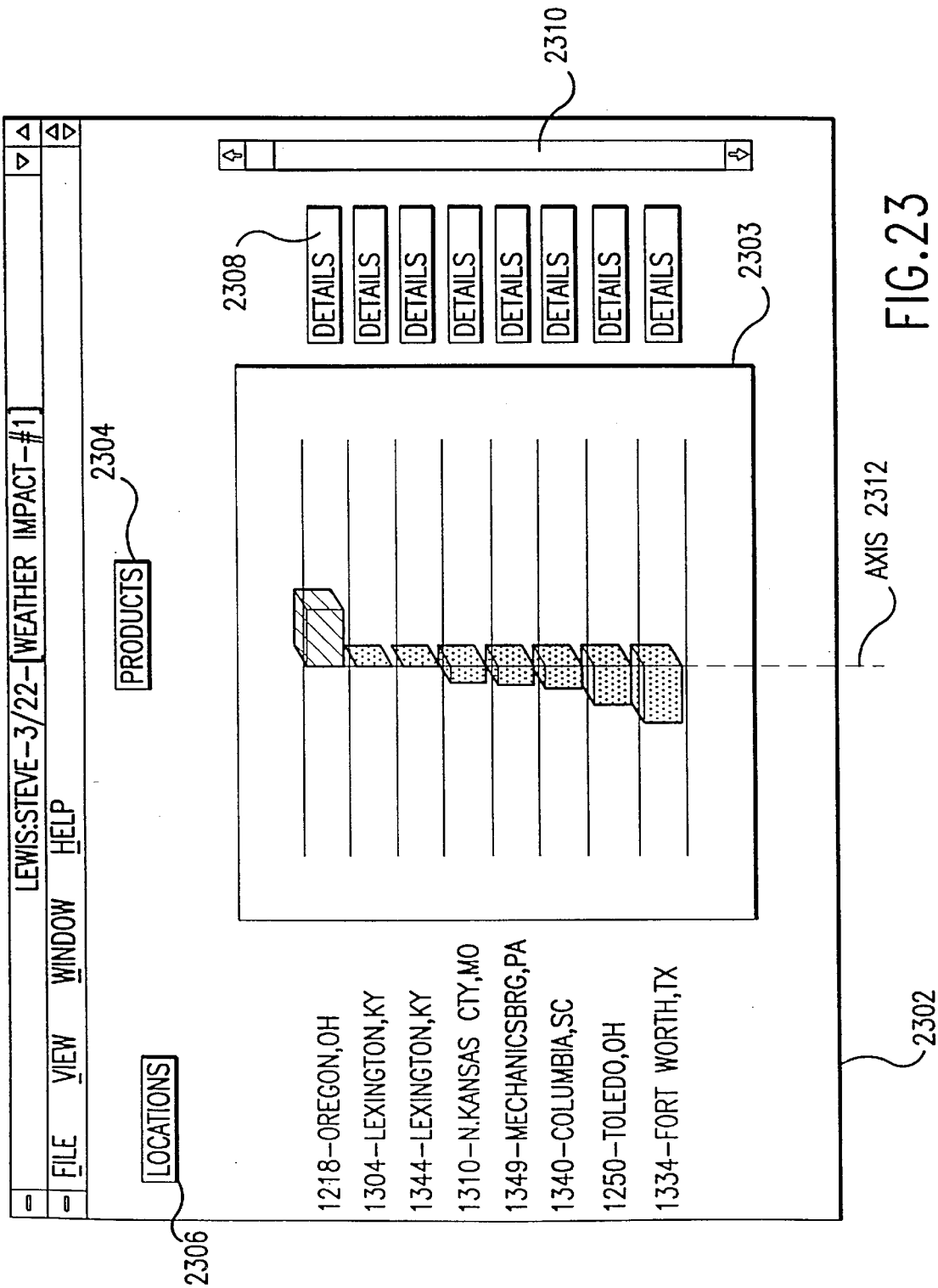

In step 1416, the configurator 108 processes these scores. Preferably, the configurator 108 processes the scores by displaying them to the user 402. The configurator 108 displays the scores to the user by displaying a weather impact window 2302 as shown in FIG. 23. The weather impact window 2302 includes a bar graph 2303. The scores for the selected locations are represented in this bar graph 2303. In particular, a positive score is represented by a bar that begins from an axis 2312 (this axis 2312 is for illustrative purposes only, and is not displayed in the weather impact window 2302) and moves to the right (see the bar for Oregon). A negative score is represented by a bar that begins at the axis 2312 and moves to the left (see the bar for Kansas City and locations displayed under Kansas City). A zero score is represented using a bar of essentially zero width that is even with the axis (see the bar for the Lexington sites). Preferably, bars for positive scores are shown in a first color (such as blue), and bars for zero and negative scores are shown in a second color (such as red).

The GUI 110 enables the user 402 to change the sets of locations and/or products. This is generally reflected by step 1418. The user 402 changes locations and/or products by selecting either a location button 2306 and/or a products button 2304. This results in displaying the product selection window 2408 or the location selection window 2502. Operation of the configurator 108 then proceeds as described above.

Figure 26:
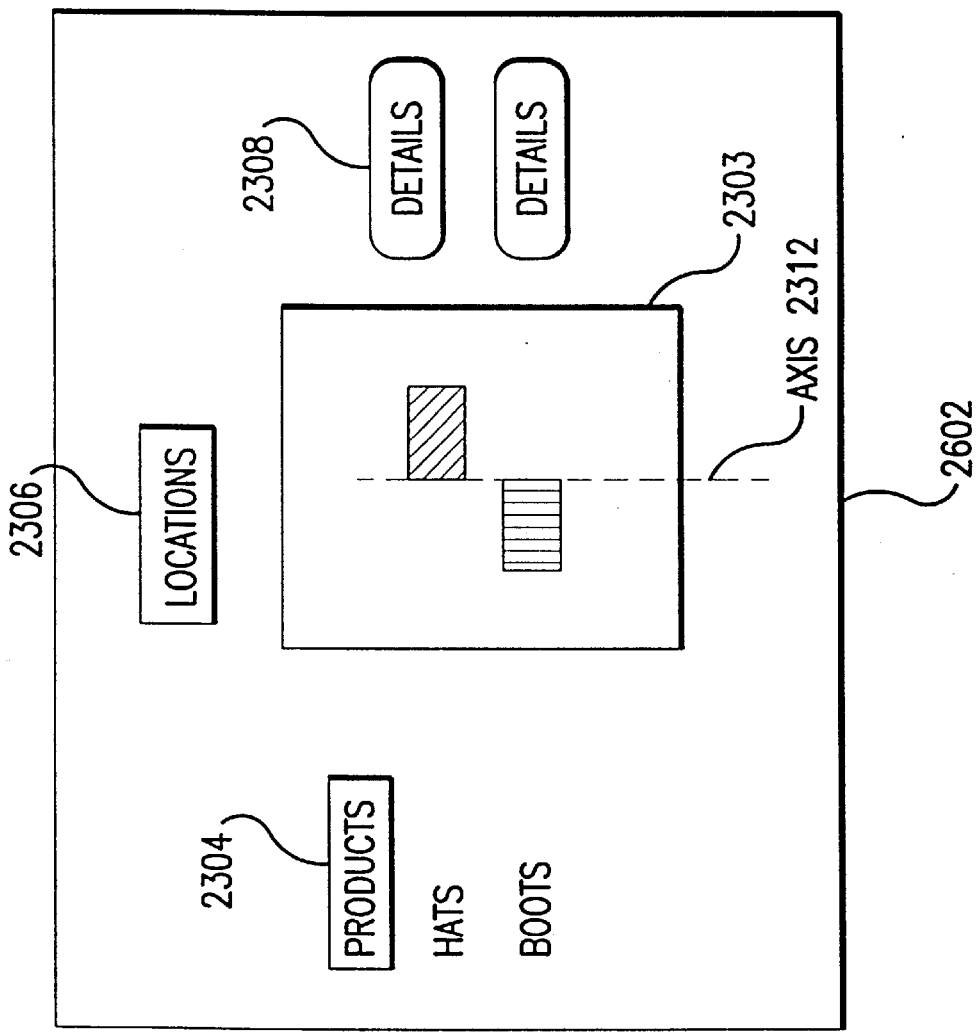
Figure 27:
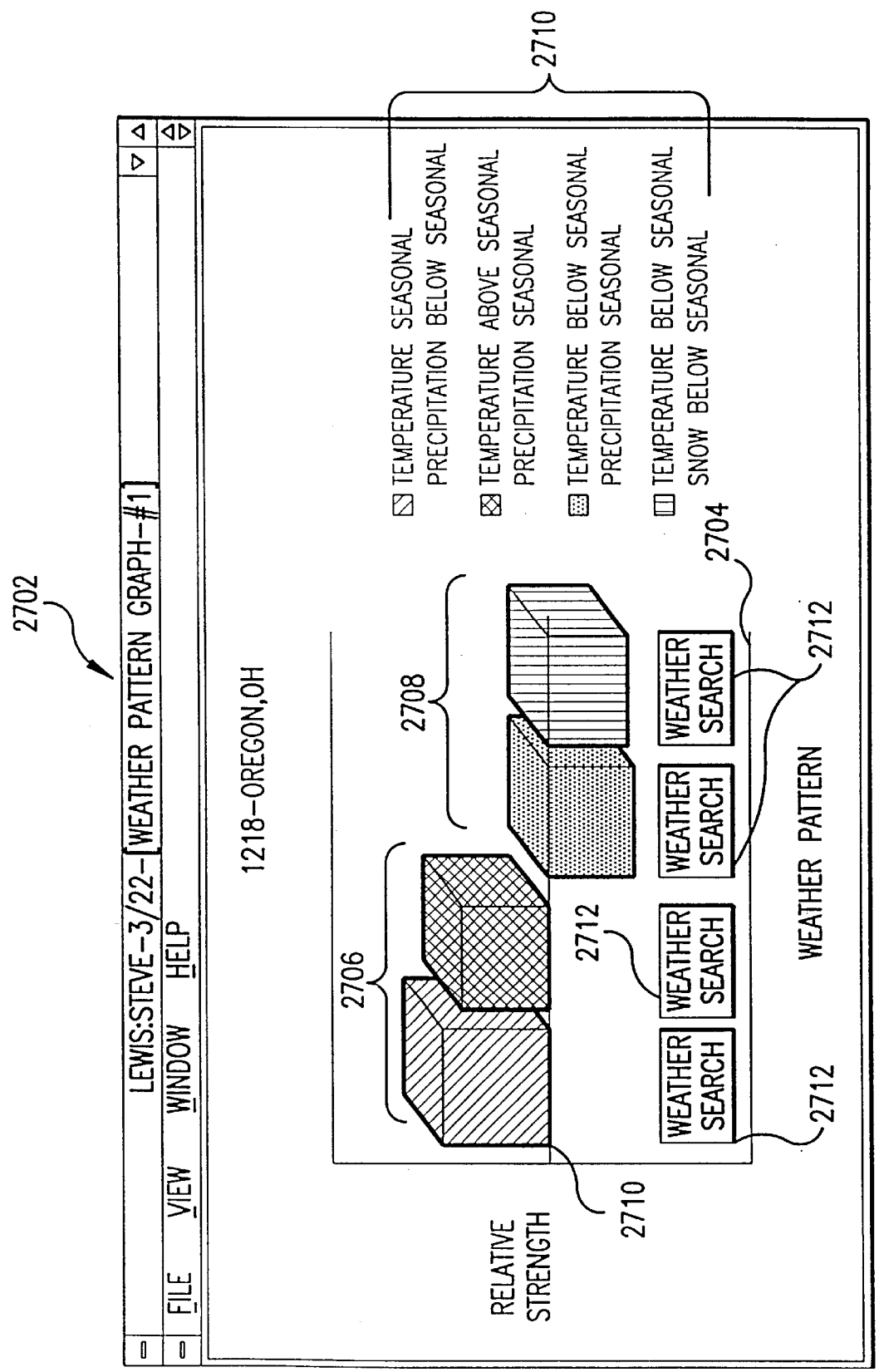

Note that the locations and products shown in the weather impact window 2302 represent two dimensions of a database. The GUI 110 enables the user 402 to interchange the position of these two dimensions in the weather impact window 2302. Preferably, the user 402 does this by selecting the products button 2304 and dragging it over top the locations button 2306, or visa versa. The GUI 110 then displays an alternate weather impact window 2602 as shown in FIG. 26. FIG. 26 is very similar to FIG. 23. In FIG. 23, however, the bars in the bar graph 2303 indicate the degree to which weather impacts sales of the selected products on a per selected location basis. In FIG. 26, the bars in the bar graph 2303 indicate the degree to which weather impacts sales in the selected locations on a per selected product basis.

In the embodiment shown in FIG. 26, the configurator 108 operates as discussed above with respect to FIG. 14. However, in step 1412, for each selected product (instead for each selected location), the configurator 108 sums the positive counts to obtain a total positive count. The configurator 108 also sums the negative counts to obtain a total negative total, and the no change counts to obtain a total no change total. Also, in step 1414, the configurator 108 calculates a score for each selected product (instead of for each selected location).

Figure 15:
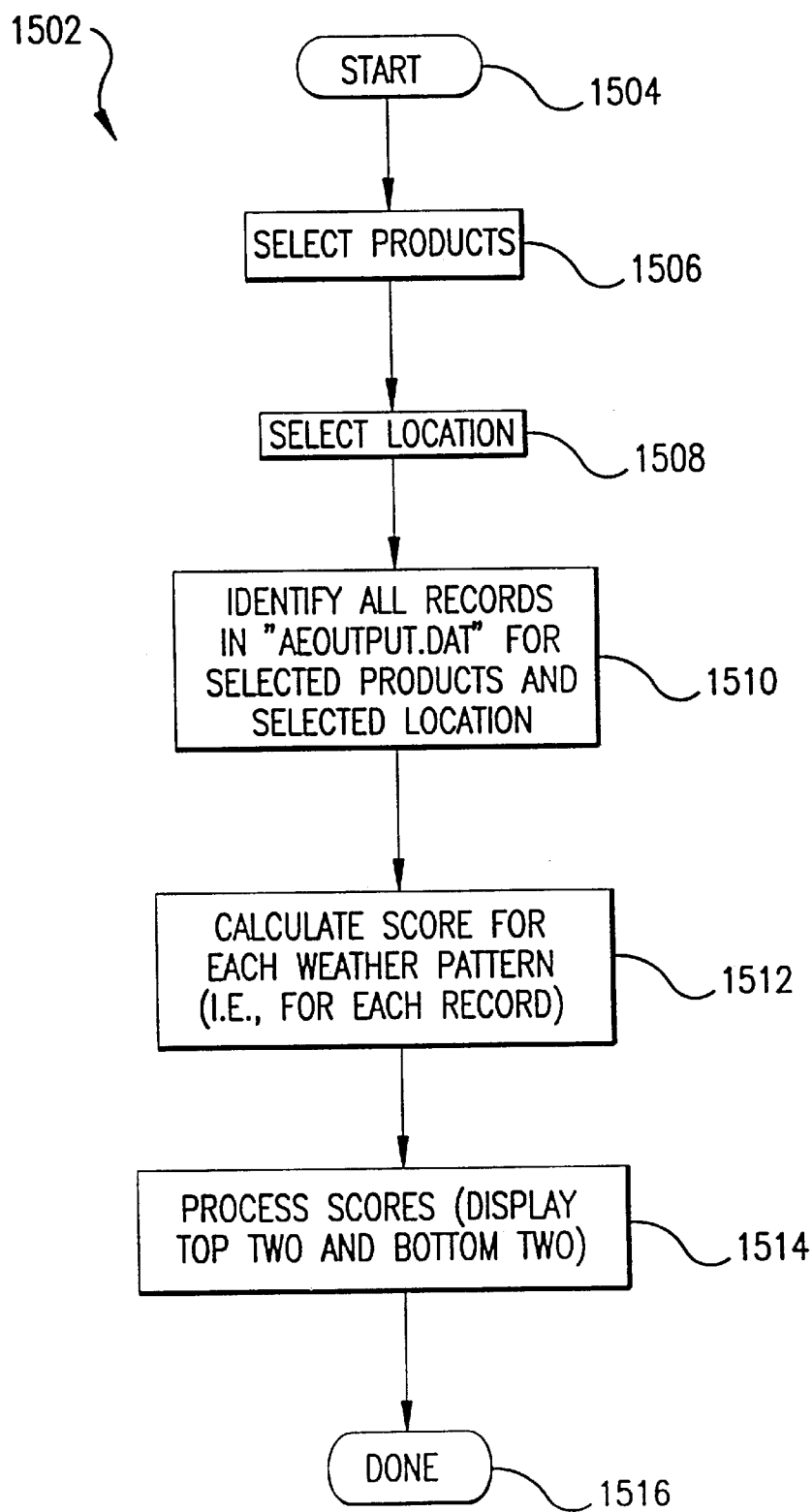

Referring again to FIG. 23, note that there is a Details button 2308 by each bar. The user 402 can click on the Details button 2308 by the bar for a location to obtain details as to that location. The operation of the present invention in this regard (i.e., to process the user 402's request for details) is represented by a flowchart 1502 in FIG. 15.

In steps 1506 and 1508, the products and location are selected for analysis. In practice, steps 1506 and 1508 are performed when the user 408 presses the detail button 2308, since the detail button 2308 that is pressed indicates the location and the products that the user 402 wishes to analyze (the products are always the same when working with the window 2302 shown in FIG. 23; the location is that which corresponds to the bar graph located next to the detail button 2308 that is pushed).

In step 1510, the configurator 108 accesses the analyzer output database 310 (also called "aeoutput.dat") and retrieves all records for the selected products/selected location combinations.

In step 1512, for each weather pattern represented in the records retrieved in step 1510, the configurator 108 generates a score (the manner in which scores are calculated is described above).

In step 1514, the GUI 110 processes these scores. Preferably, the GUI 110 processes these scores by displaying a weather pattern graph window 2702. The weather pattern graph window 2702 includes a bar graph 2704. The GUI 110 selects the two most positive weather pattern scores and the two most negative weather pattern scores and plots these scores in bar graph form in the bar graph 2704. The bars for the two most positive scores start from an axis 2710 and move upward. These scores are generally indicated by 2706. The bars for the two most negative scores start from the axis 2710 and move downward. These bars are generally indicated by 2708. These bars graphically indicate the two weather patterns that had the greatest positive impact on the sale of the selected products in the selected location, and the two weather patterns that had the greatest negative impact on the sale of the selected products in the selected location. These four weather patterns are described in area 2710. Preferably, these descriptions are color coded to match the bars, which are preferably different colors (alternatively, the positive bars 2706 are one color, such as blue, and the negative bars 2708 are another color, such as red).

The embodiment shown in FIG. 26 also has details buttons 2308. The operation of the invention when the details buttons 2308 in FIG. 26 are pushed is very similar to that described above with respect to FIG. 23. However, in the case of the embodiment in FIG. 26, the configurator 108 in step 1510 accesses the analyzer output database 310 (also called "aeoutput.dat") and retrieves all records for the selected locations/selected product combinations.

Referring again to FIG. 2704, note that there is a weather search button 2712 corresponding to each bar. By pressing a weather search button 2712 for a bar corresponding to a particular weather pattern, the user 402 is able to find periods in the future where the weather pattern is predicted to occur. This represents the weather pattern search option 2014 (FIG. 20), and is described below.

Weather Optimization

Figure 19:
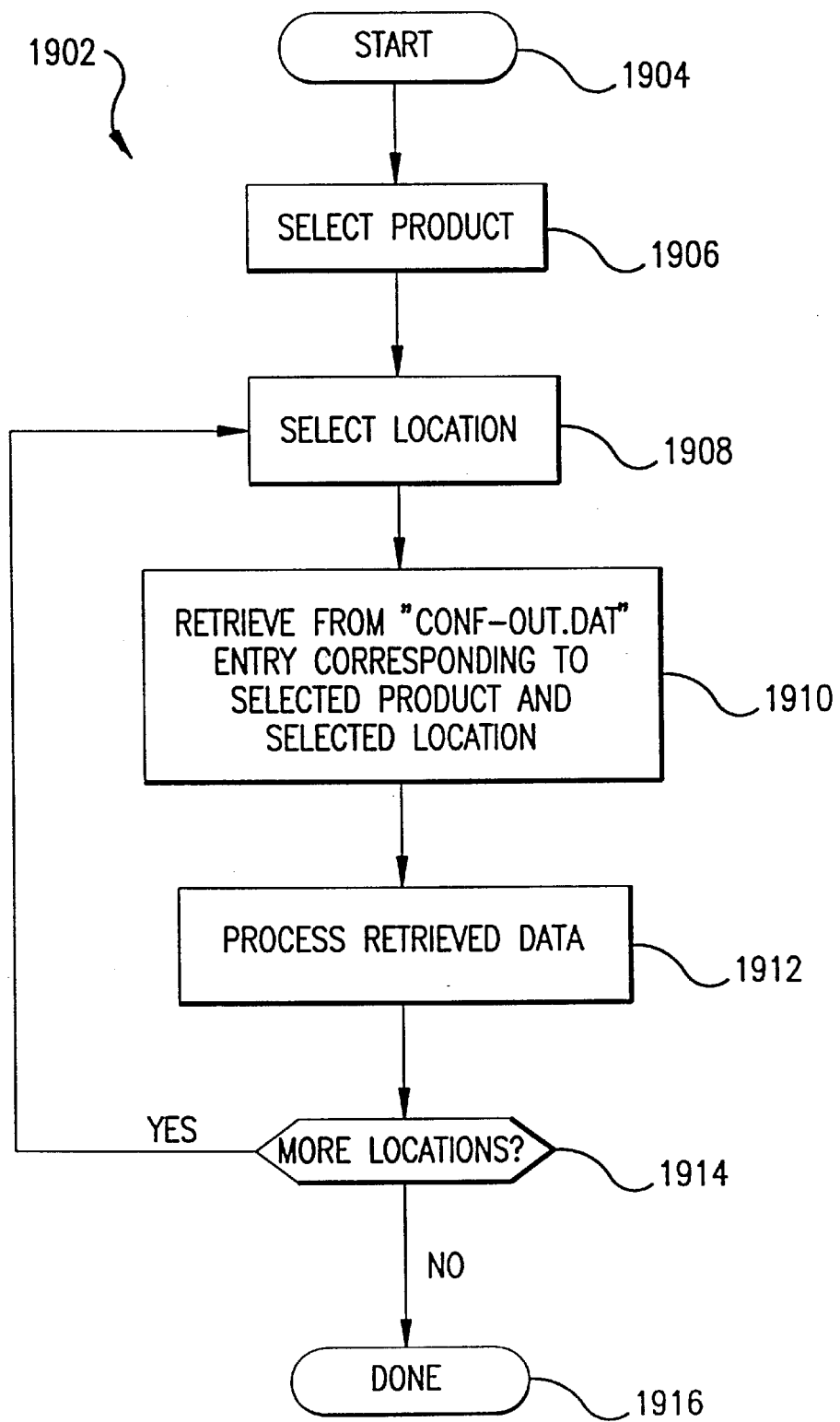

The weather optimization option enables users 402 to review predicted future retail performance of selected products at selected locations in view of the affect of predicted weather at these locations. The present invention performs the steps shown in flowchart 1902 of FIG. 19 when the user 402 selects the weather optimization option 2012.

In steps 1906 and 1908, products and locations are selected for evaluation. The manner in which products and locations are selected is described above.

In step 1910, the configurator 108 retrieves from the configurator output database 1390 all records relating to the selected products/selected stores combinations (i.e., any entry having stored therein one of the selected products and one of the selected stores is retrieved). Note that for any given store, there may be one or more records retrieved from the configurator output database 1390 (one record for each of the selected products that are sold in the store). In step 1912, the configurator 108 processes the retrieved records. Where multiple records were retrieved for a given store, the configurator 108 for each future period sums the positive, negative, and no change counts from the records and calculates an overall score for the store (taking into account all of the selected products that are sold in the store) for each future period. The manner in which the score is calculated is described above. Where there is only one record for a given store, the configurator 108 need not calculate a score for the score, since such a score was already calculated and in stored in the configurator output database 1390.

Figure 28:
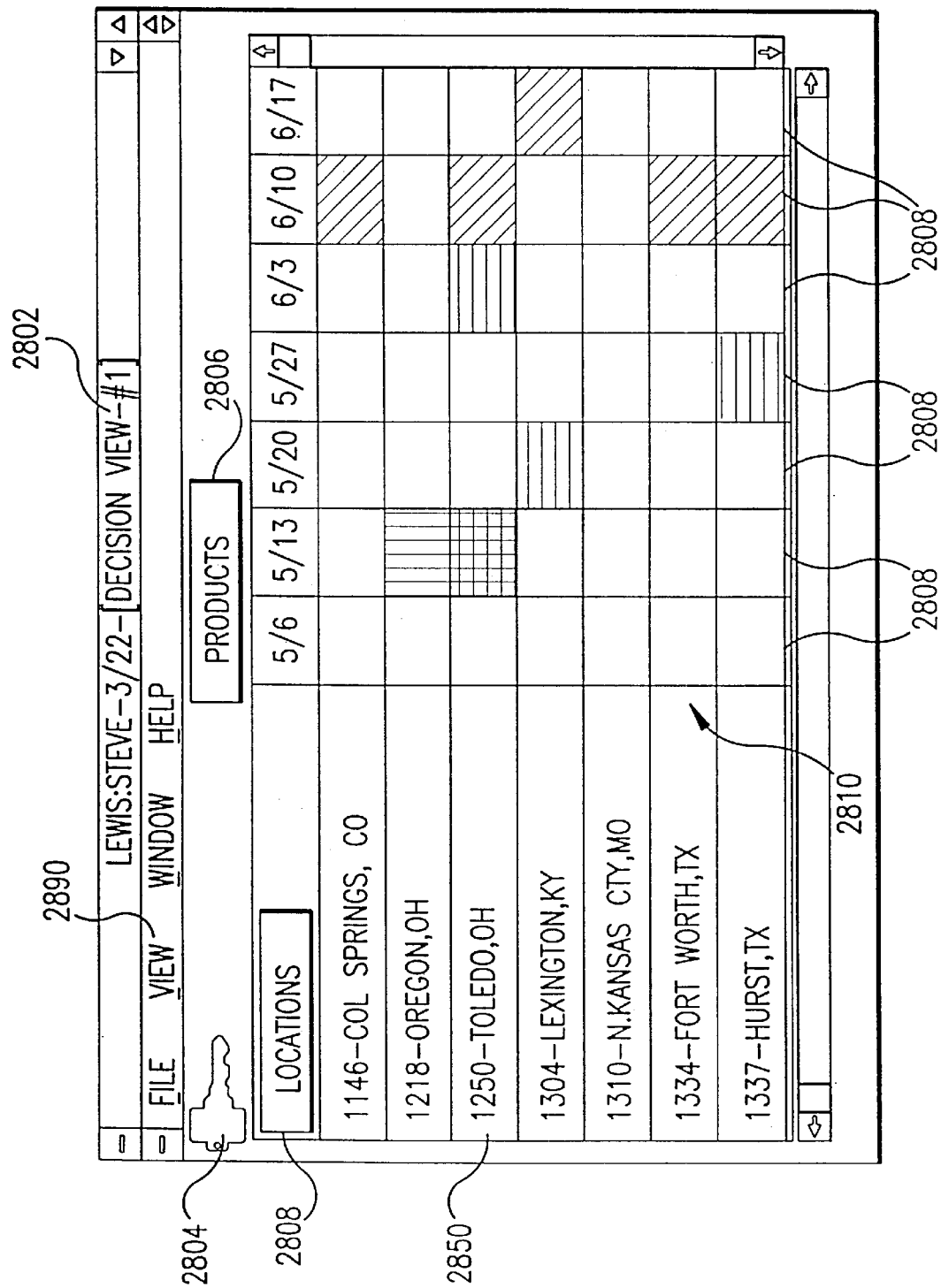

Then, the GUI 110 in step 1912 displays these scores on a per store (location) basis. In particular, the GUI 110 displays a decision view window 2802 as shown in FIG. 28. The decision view window 2802 includes a calendar graph 2810. The calendar graph 2810 includes columns 2808 that represent future periods. The score for each location is graphically represented in the calendar graph 2810 on a per period basis. Consider, for example, Toledo, Ohio. The row 2850 in the calendar graph 2810 for Toledo includes an icon for period 5/13. This row 2850 includes other icons in periods 6/3 and 6/10. These icons graphically represent the scores for these periods for the selected products and for Toledo. If the score is between −1.645 and +1.645, no icon is displayed as the score falls outside the confidence interval of 90%. Confidence intervals are well known to those skilled in the relevant statistical art(s).

Figure 29:
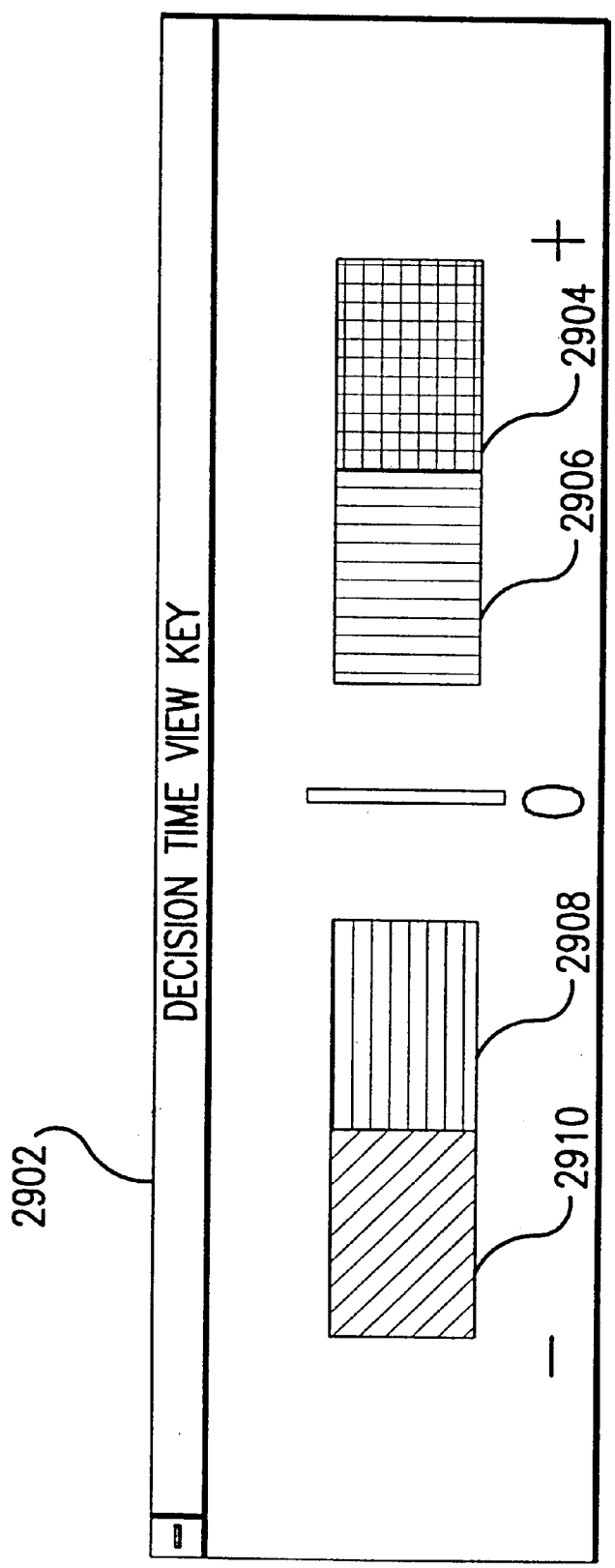

FIG. 29 presents a decision time view key 2902 used for interpreting the icons shown in the decision view window 2802. This key 2902 is displayed when the user 402 presses the key icon 2804 (FIG. 28). As shown in the decision time view key 2902, there are preferably four different icons. Icon 2904 represents strongest predicted future retail performance. Icon 2906 represents stronger predicted future retail performance. Icon 2908 represents weaker predicted future retail performance. Icon 2910 represents weakest predicted future retail performance. In practice, these icons are color coded. For example, icon 2906 is preferably green, icon 2906 is preferably light green, icon 2908 is preferably light red, and icon 2910 is preferably red.

The GUI 110 displays icon 2904 in a time period for a location if the corresponding score is between 2 and 4. Icon 2906 is displayed if the score is between 1.645 and 2. Icon 2908 is displayed if the score is between −2 and −1.645. Icon 2910 is displayed if the score is between −2 and −4. Icon 2912 represents null values, i.e., −1.645 to +1.645. Other values for assigning the icons could alternatively be used. Areas 2908, and 2906 represent a 90% confidence level. Areas 2910, and 2904 represent a 95%+ confidence level. Area 2912 falls below the minimum confidence level defined herein. Other confidence intervals can be used to provide a further breakdown of area 2912 if desired.

Figure 30:
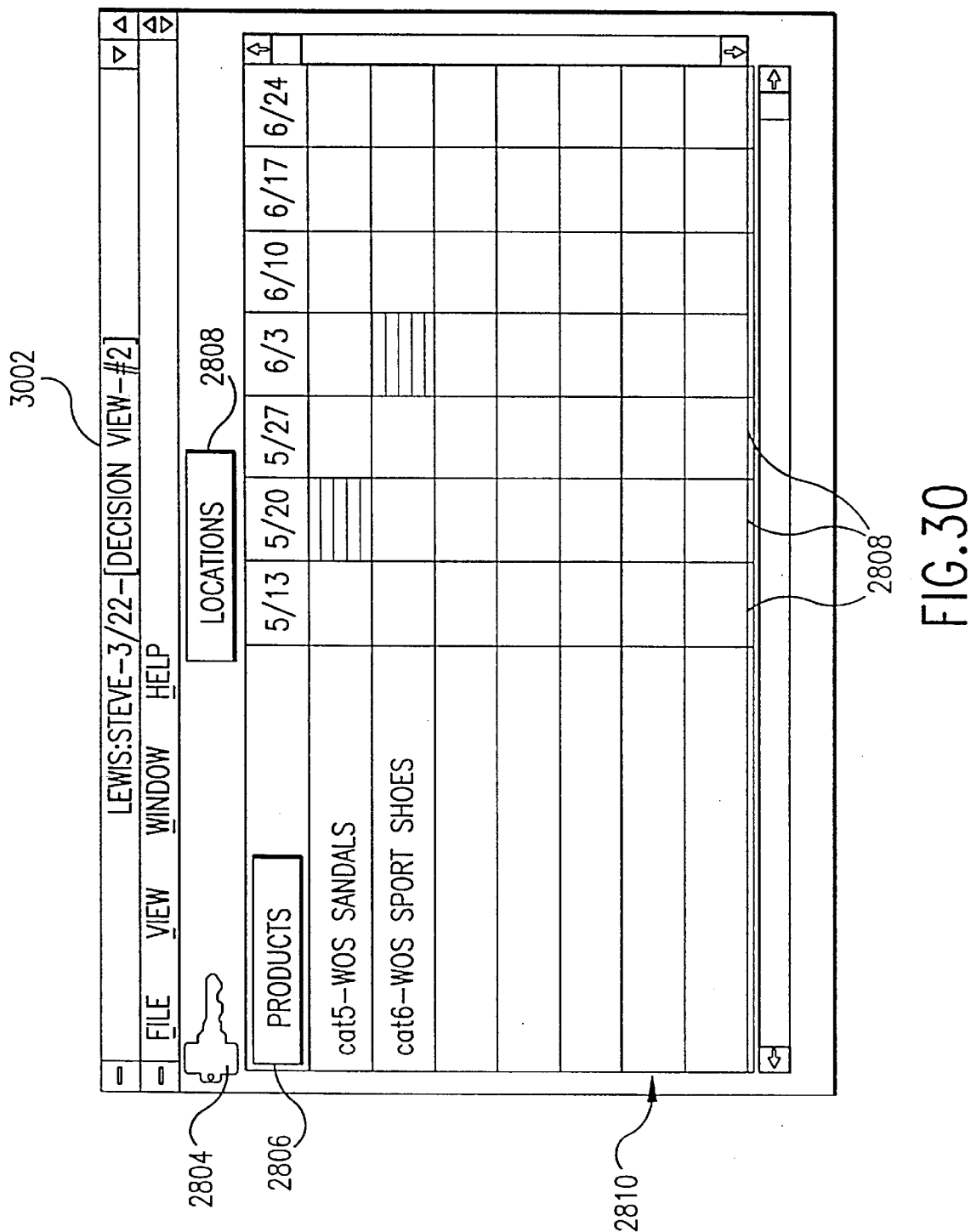

The GUI 110 enables the user 402 to interchange the location dimension and the products dimension by use of the location button 2808 and the products button 2806, as described above. In this case, the GUI 110 displays the decision view window 3002 as shown in FIG. 30. The operation of the invention in this embodiment of FIG. 30 is the same as described above with regard to the embodiment of FIG. 28, except that in step 1912 the configurator 108 groups together the retrieved records for each of the selected products, and then sums the positive, negative, and no change counts from these records and calculates an overall score for each of the selected products (that is, on a per product basis, instead of a per location basis).

Weather Pattern Search

Figure 17:
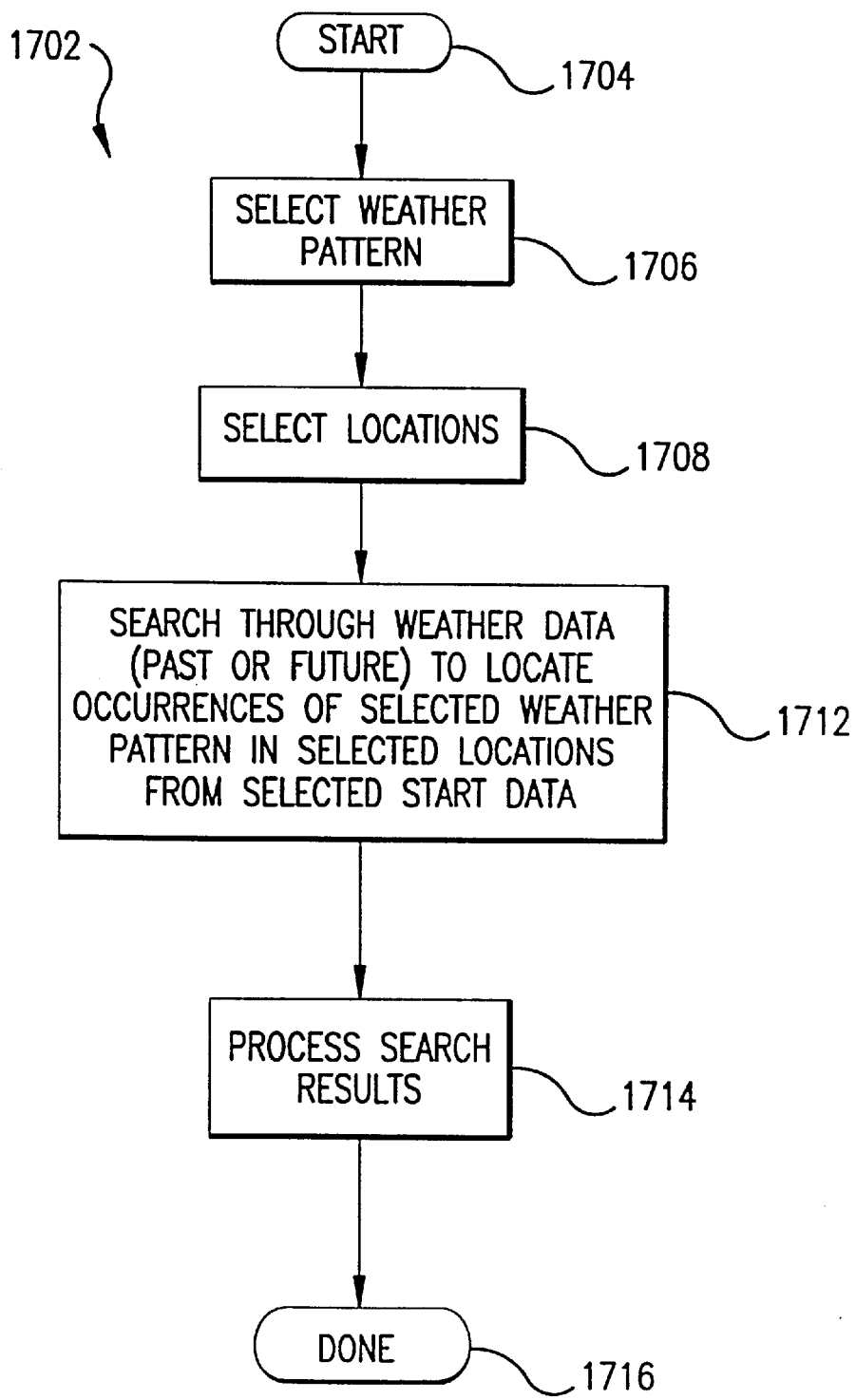

The weather pattern search option 2014 enables the user 402 to specify a particular weather pattern. The system 102 then locates any future periods in selected locations where the particular weather pattern is predicted to occur. The operation of the present invention when performing the weather pattern search option 2014 is represented by a flowchart 1702 in FIG. 17.

Figure 31:
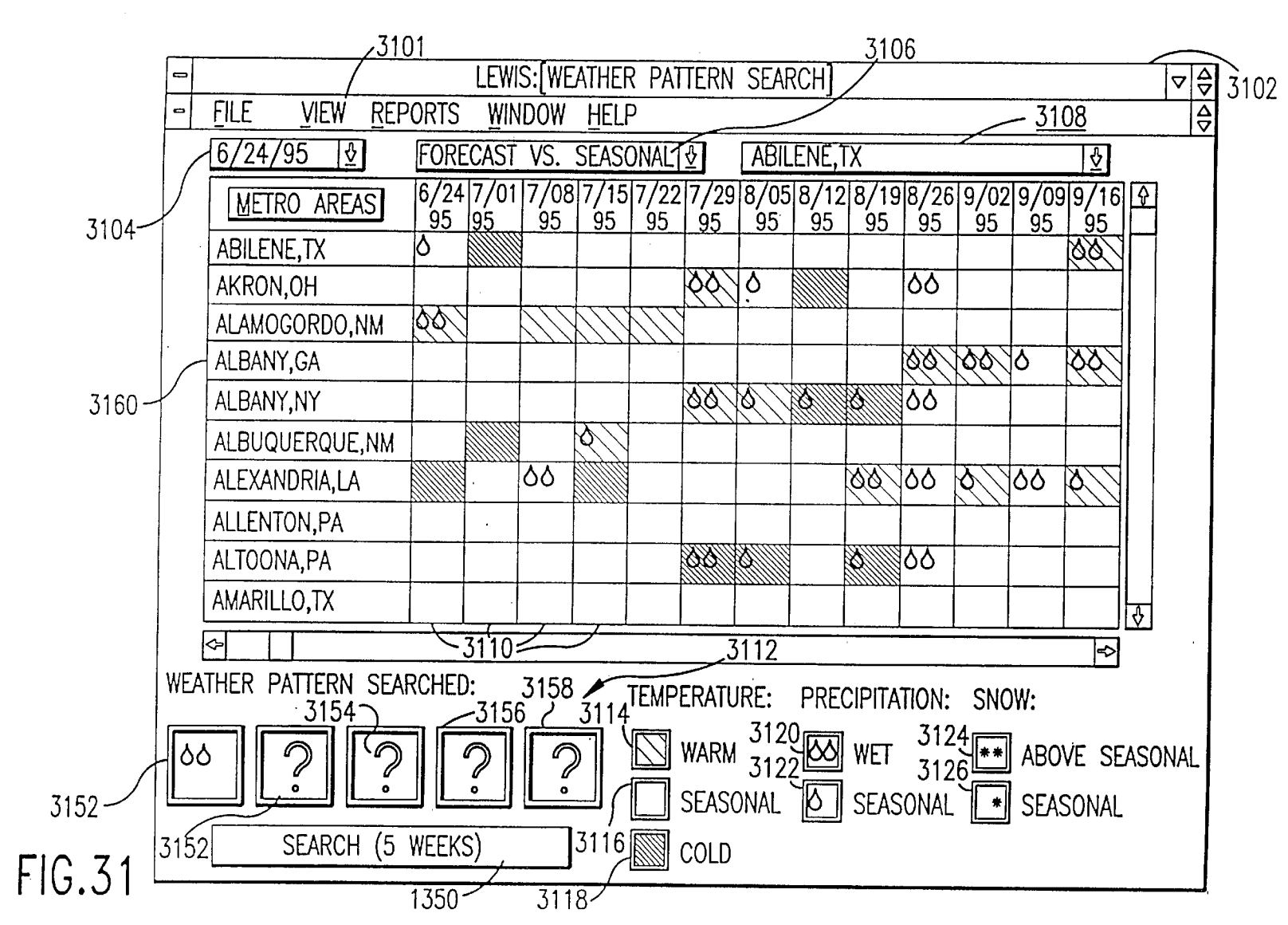

In step 1706, the GUI 110 displays a weather pattern search window 3102. The user 402 then selects a weather pattern to search for. The user 402 may enter a search key for any number of consecutive periods. The user can select the number of periods by pressing button 3150. The search keys for these periods are shown in the search selection area that is generally designated by 3112. In the example of FIG. 31, the user 402 has selected five consecutive periods. To the right of this area 3112 are various icons representing weather search pattern keys that the user 402 may select. In particular, there is an icon 3114 for warm temperature (i.e., above seasonal), an icon 3116 for seasonal temperature, and icon 3118 for cold temperature (i.e., below seasonal), an icon 3120 for wet precipitation (i.e., above seasonal), an icon 3122 for seasonal precipitation, an icon 3124 for above seasonal snowfall, and an icon 3126 for seasonal snowfall. These icons may include graphical items, such as two raindrops for wet or heavier than seasonal precipitation in icon 3120, one raindrop for seasonal precipitation in icon 3122, two snowflakes for heavier than seasonal snow in icon 3124, and one snowflake for seasonal snow in icon 3126. The icons may also be color coded, such as red for icon 3114, grey for icon 3116, and blue for icon 3118.

The user 402 specifies a weather pattern search key for a period in the area 3112 by selecting one of the search icons 3114, 3116, 3118, 3120, 3122, 3124, 3126, dragging the selected search icon to one of the periods in the area 3112, and then dropping the selected search icon into the period in the area 3112. For example, in FIG. 31, the user 402 has selected icon 3114 (warm temperature) and dropped it into period 3152 in the area 3112. The invention allows a period to have more than one search icon. Thus, in FIG. 31, the user 402 has selected icon 3120 (wet), and has dropped it into period 3152. Accordingly, for period 3152, the user 402 has indicated that he wants to search for a period of warm temperature and wet precipitation. The user 402 can specify the weather pattern for the other four periods in a similar manner (these periods have not yet been specified by the user 402), or simply leave them as "?" and the system will return the next four weather patterns following the selected weather pattern.

It step 1708, the user 402 selects the locations for the search. The user 402 preferably performs step 1708 via location selection window 2502, as described above.

In step 1712, the system 102 (either the GUI 110 or the configurator 108) searches through the weather forecast database 312 to locate a sequence of periods that match the sequence that the user specified in the search selection area 3112. Specifically, the system 102 compares the weather pattern search keys from the search selection area 3112 to the category entries in the weather forecast database 312. Consider the weather pattern search key that the user 402 entered for period 3152 in FIG. 31. This weather pattern search key represents T1P1 (temperature above seasonal/precipitation above seasonal). The system 102 searches through the temp.cat and prec. cat entries in the weather forecast database 312 to identify periods where weather pattern T1P1 is predicted to occur. Periods P1, P2, and P5 match this search criteria in the example shown in FIG. 22. The system 102 then determines whether the four periods respectively following periods P1, P2, and P5 match the weather patterns entered by the user 402 in periods 3152, 3154, 3156, and 3158 of the search selection area 3112. The period is a "don't care" if the user 402 did not enter a weather pattern into the area and will display any four patterns that happen to follow the selected pattern In step 1714, the GUI 110 displays forecast weather information for the selected locations in a calendar graph 3160. The GUI 110 performs step 1714 by retrieving from the weather forecast database 312 the weather pattern (from category entries) for the selected locations. The GUI 110 then represents these weather patterns in the calendar graph 3160 using the same icons 3114, 3116, 3118, 3120, 3122, 3124, and 3126 that the user 420 used to define the search criteria. The calendar graph 3160 includes a number of columns 3110 that corresponds to periods. The starting period displayed in the calendar graph 3160 is determined by the periods matching the search sequence (entered by the user 420 in the search selection area 3112) and appears to the left of the calendar graph 3160.

Flowchart 1702 is complete after step 1714 is performed, as indicated by step 1714.

The weather pattern search option 2014 has been described with respect to search for weather patterns predicted to occur in future periods. Alternatively, the weather pattern search option 2014 can be alternatively used to search for weather patterns that occurred in past periods. This can be achieved by using the weather history database 306, instead of the weather forecast database 312 by changing the comparison button 3106 to Last Year Actual vs Seasonal.

Weather Query

Figure 18:
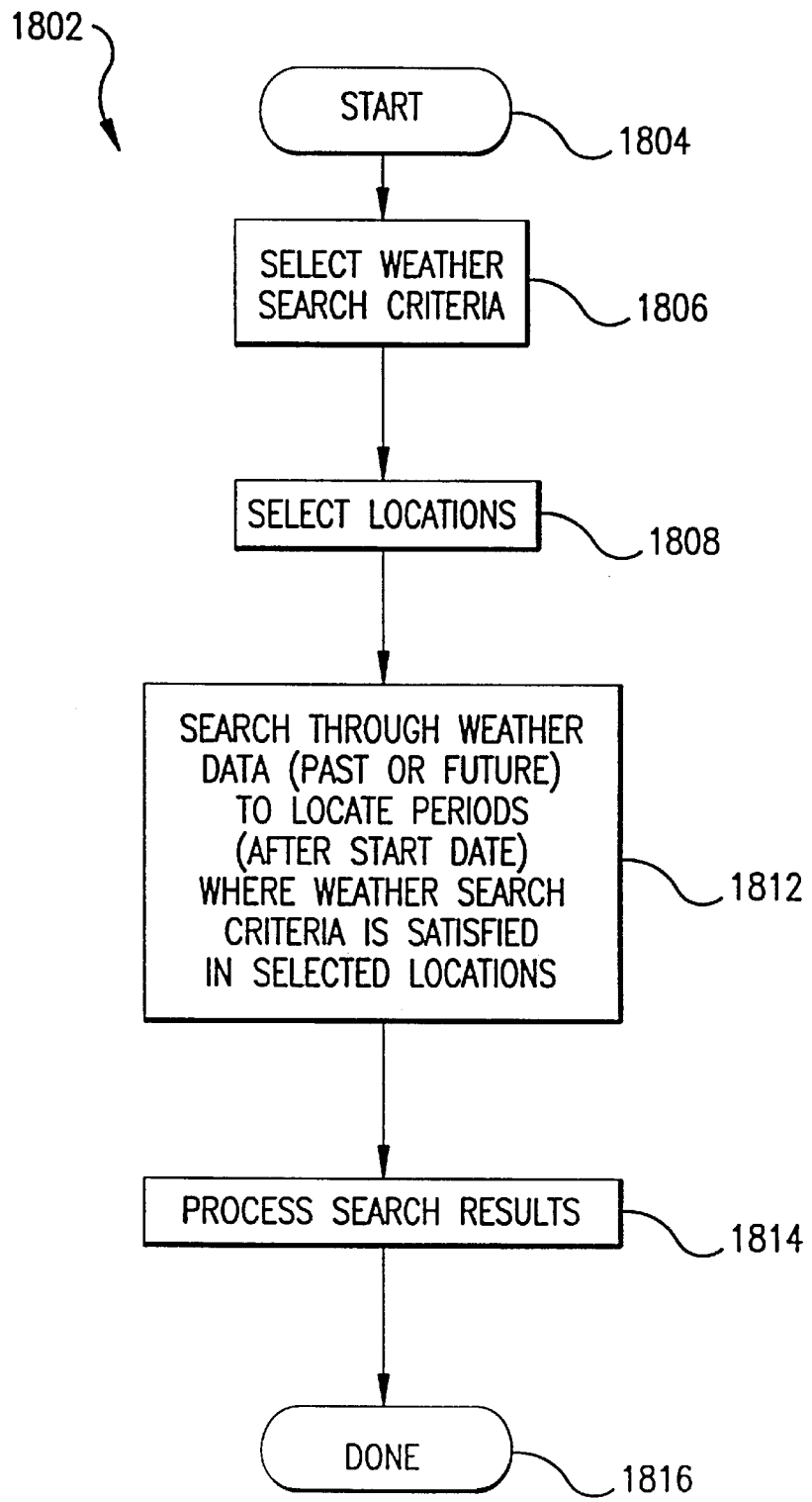

The weather pattern search option 2014 (described above) locates a sequence of periods (either past or future) that match a sequence of weather patterns entered by the user 420. The weather query option 2016 is similar to the weather pattern search option 2014. However, the weather query option 2016 locates periods (past or future) that match quantitative relationships entered by the user 420. For example, the weather query option 2016 can be used to find all periods where the temperature was greater than 85 degrees, or where the snowfall was less than 2 inches. The operation of the system 102 when performing the weather query option 2016 is represented by a flowchart 1802 in FIG. 18.

Figure 32:
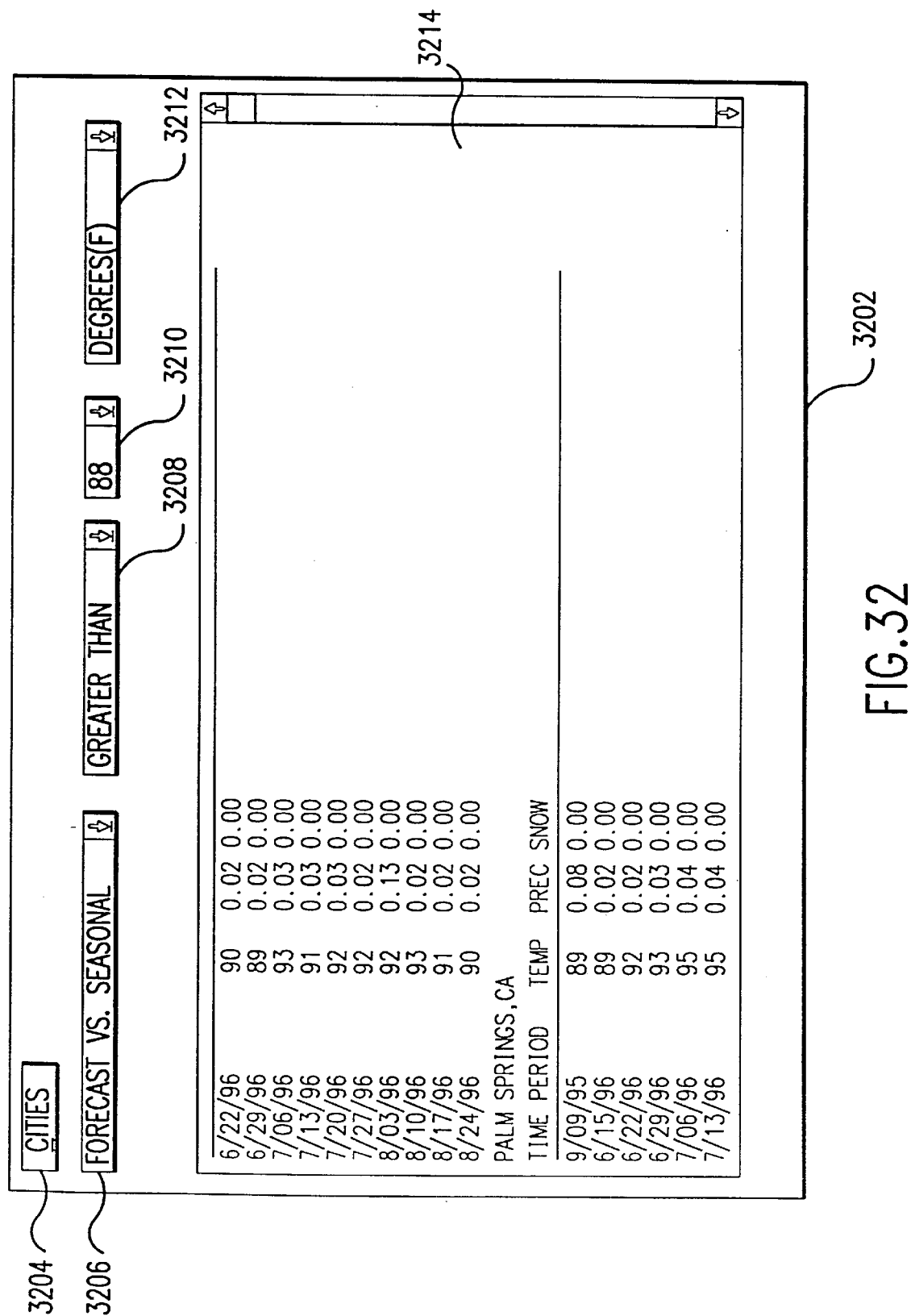

In step 1806, the GUI 110 displays a weather query window 3202 as shown in FIG. 32. The user 420 interacts with this window 3202 to define a weather search criteria. Specifically, the user 420 opens a first pull down window to select whether the search will be done using the weather forecast database 312 and/or the weather history database 306. The user 420 opens a second pull down window 3208 to define the logical relationship, such as equal to, greater than, or less than. The user 420 opens a third pull down window 3210 to enter the value that will be used for comparison. The user 420 opens a fourth pull down window 3212 to define the units (degrees, inches of snow, inches of precipitation, etc.) for the value entered via the third pull down window 3210. In the example shown in FIG. 32, the user 420 has defined the following search: locate all periods where the temperature was greater than 88 degrees.

In step 1808, the user 420 selects locations to include in the search. The user 420 preferably performs step 1808 through interaction with the location selection window 2502, described above (access to this window 2502 is achieved by pressing the cities button 3204).

In step 1812, the system 102 (either the GUI 110 or the configurator 108) searches through the weather history database 306 (if the user 420 entered a date in the past) or the weather forecast database 312 (if the user 420 entered a future date) and locates any periods for the selected locations and after the selected start date where the weather satisfies the criteria entered by the user 420 in step 1806.

In step 1814, the GUI 110 displays this information in a results area 3214 of the weather query window 3202.

Flowchart 1802 is complete after step 1814 is performed, as indicated by step 1816.

Alternative Report Formats

Figure 33:
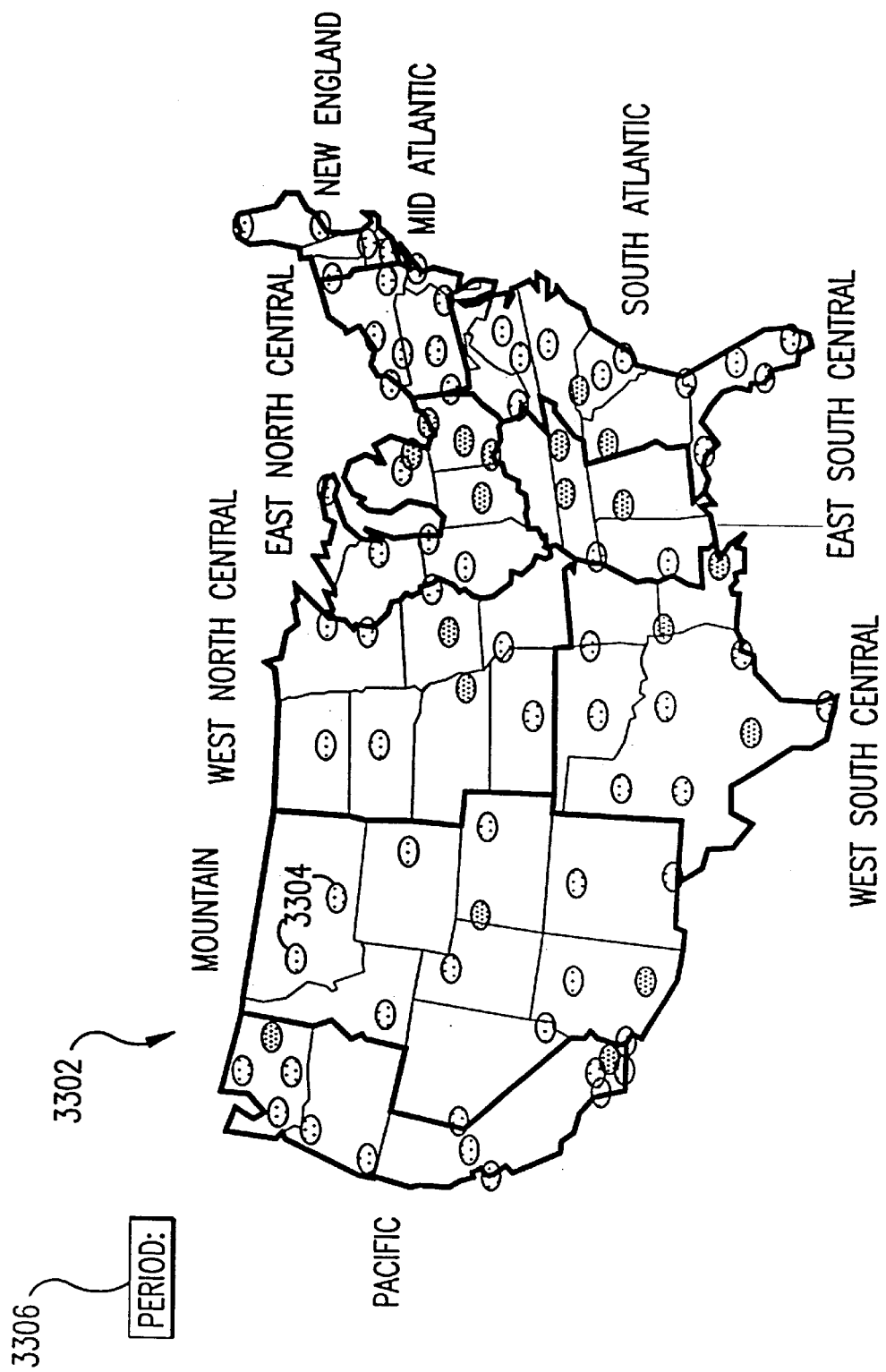

The system 102 supports reporting formats other than those discussed above. For example, the system 102 supports a location report 3302 as shown in FIG. 33. The location report 3302 includes an image of a geographical area, such as the United States. An oval 3304 is displayed over every selected location (i.e., every selected metro area or store). The ovals 3304 are color coded in the same way as the default reporting format.

For example, consider the decision view window 2802 shown in FIG. 28. This window 2802 is the default reporting format for the weather optimization option 2012. The information contained in the decision view window 2802 can alternatively be displayed using the location report 3302 (the user 402 preferably switches to the location report 3302 by selecting an appropriate option in the View pull down menu 2890). To use the location report 3302, the user 420 must enter a time period in the period field 3306. In the location report 3302, the ovals 3304 are color coded so as to graphically indicate the predicted strength of retail performance in the selected stored on the period entered into the period field 3306. As indicated above, the ovals 3304 are color coded using the scheme from the default reporting format, in this case the decision view window 2802. Accordingly, when processing the weather optimization option 2012, the color coding scheme shown in FIG. 29 is used.

The invention also supports a text based report format 3402 as shown in FIG. 34. In the example shown in FIG. 34, weather that has occurred in the past and/or that is predicted to occur in the future is displayed for a location specified in a location field 3404 (in this case, Washington, D.C.). In the text based report format 3402, the period must be greater than one day. In the example shown in FIG. 34, the period is one week. The user 402 can adjust the length of the time period to anything greater than one day. If the user 402 wishes to view information on a daily basis, then the daily report format is used (discussed below).

The user 402 can elect the text based report format 3402 from the default reporting format from any of the options available from the main menu 2004. For example, the user 402 can elect to view the results of the weather pattern search 2014 in the text based report format 3402. The user 402 does this by selecting one of the locations while at the weather pattern search window 3102 (FIG. 31), and then selecting the text based report format 3402 from the View pull down menu 3101. Information that is required for display in the text based report format 3402 is retrieved from the weather history database 306 and/or the weather forecast database 312. Electing the text based report format 3402 from the weather impact window 2302, the decision view window 2802, or the weather query window 3202 proceeds in a similar manner.

As noted above, the daily report format 3502 (FIG. 35) is used if the user 402 wishes to view data on a daily basis. The user 402 can elect the daily report format 3502 from the default reporting format from any of the options available from the main menu 2004. For example, the user 402 can elect to view the results of the weather pattern search 2014 in the daily report format 3502. The user 402 does this by selecting one of the locations while at the weather pattern search window 3102 (FIG. 31), and then selecting the daily report format 3402 from the View pull down menu 3101. Information that is required for display in the text report format 3402 is retrieved from the weather history database 306 and/or the weather forecast database 312. Electing the daily report format 3502 from the weather impact window 2302, the decision view window 2802, or the weather query window 3202 proceeds in a similar manner.

The daily report format 3502 preferably includes at least one row that is color coded for ease of viewing. In the example of FIG. 35, a temperature forecast row 3514 is color coded. In particular, cold days are color coded with a first color (such as blue), warm days are color coded with a second color (such as pink), seasonal days are color coded with a third color (such as green), and very warm days are color coded with a fourth color (such as red). What constitutes cold, warm, seasonal, and very warm is implementation dependent. Note that the text based report format 3402 can be color coded in a similar manner.

Figure 36:
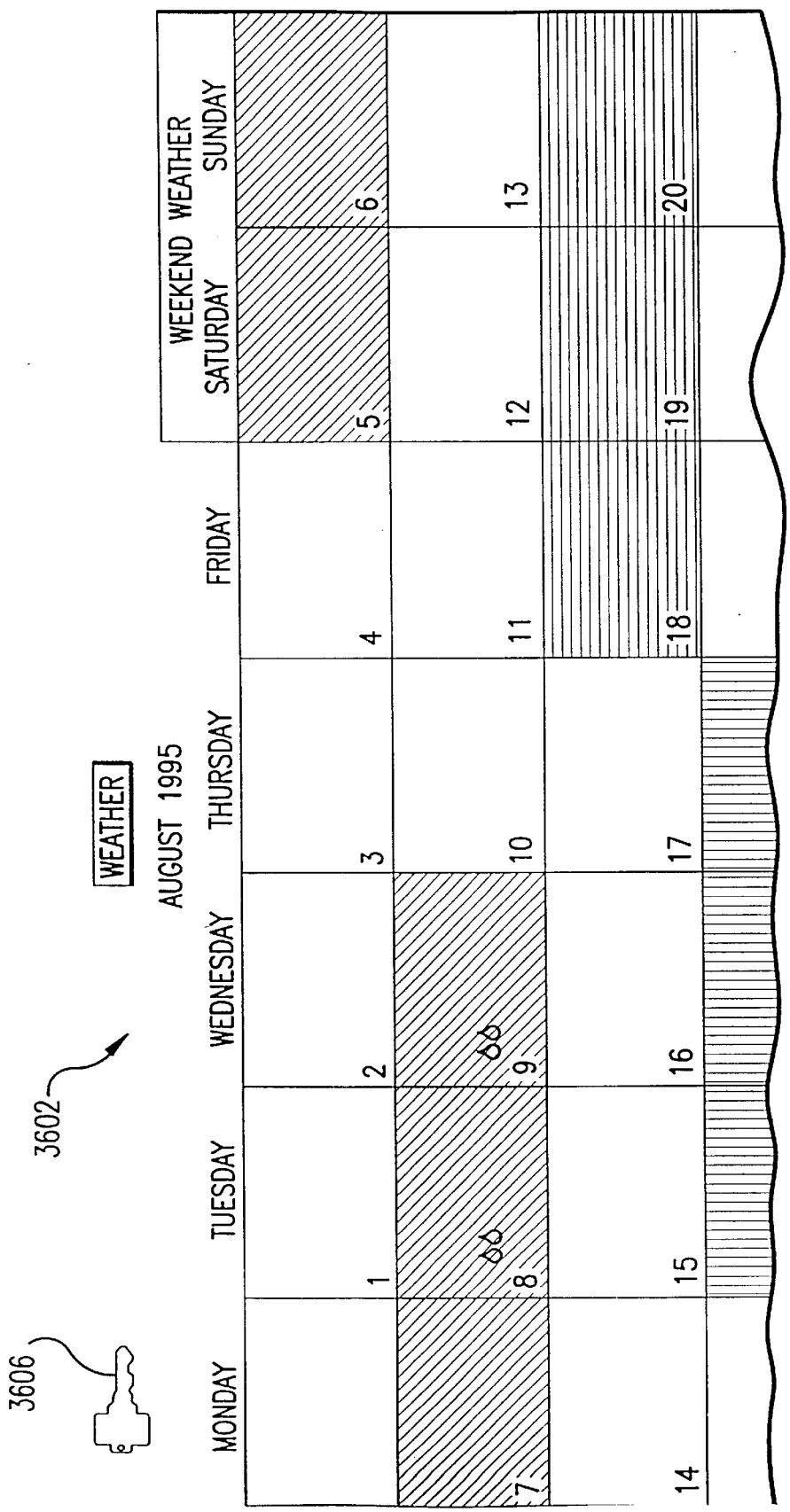

The invention also supports a calendar format 3602 (FIG. 36A). The calendar format 3602 includes a calendar image of a month selected by the user 402. Icons are displayed in the days of this month. These icons correspond to those from the default reporting format. Consider, for example, the weather pattern search window 3102. The user 402 can elect to view the results of the weather pattern search 2014 in the calendar report format 3602 by selecting one of the locations while at the weather pattern search window 3102 (FIG. 31), and then selecting the calendar report format 3502 from the View pull down menu 3101. Icons displayed in the weather pattern search window 3102 are then displayed in the corresponding days of the calendar report format 3602. The user 402 can view a legend for the icons displayed in the calendar view 3602 by pressing a key button 3606.

The calendar format 3602 also includes a summary of the weather that occurred or that is predicted to occur in the subject month. This summary is provided in both the weather history database 306 and the weather forecast database 312. A similar summary could also be displayed in any of the other reporting formats discussed herein.

Figure 36B:
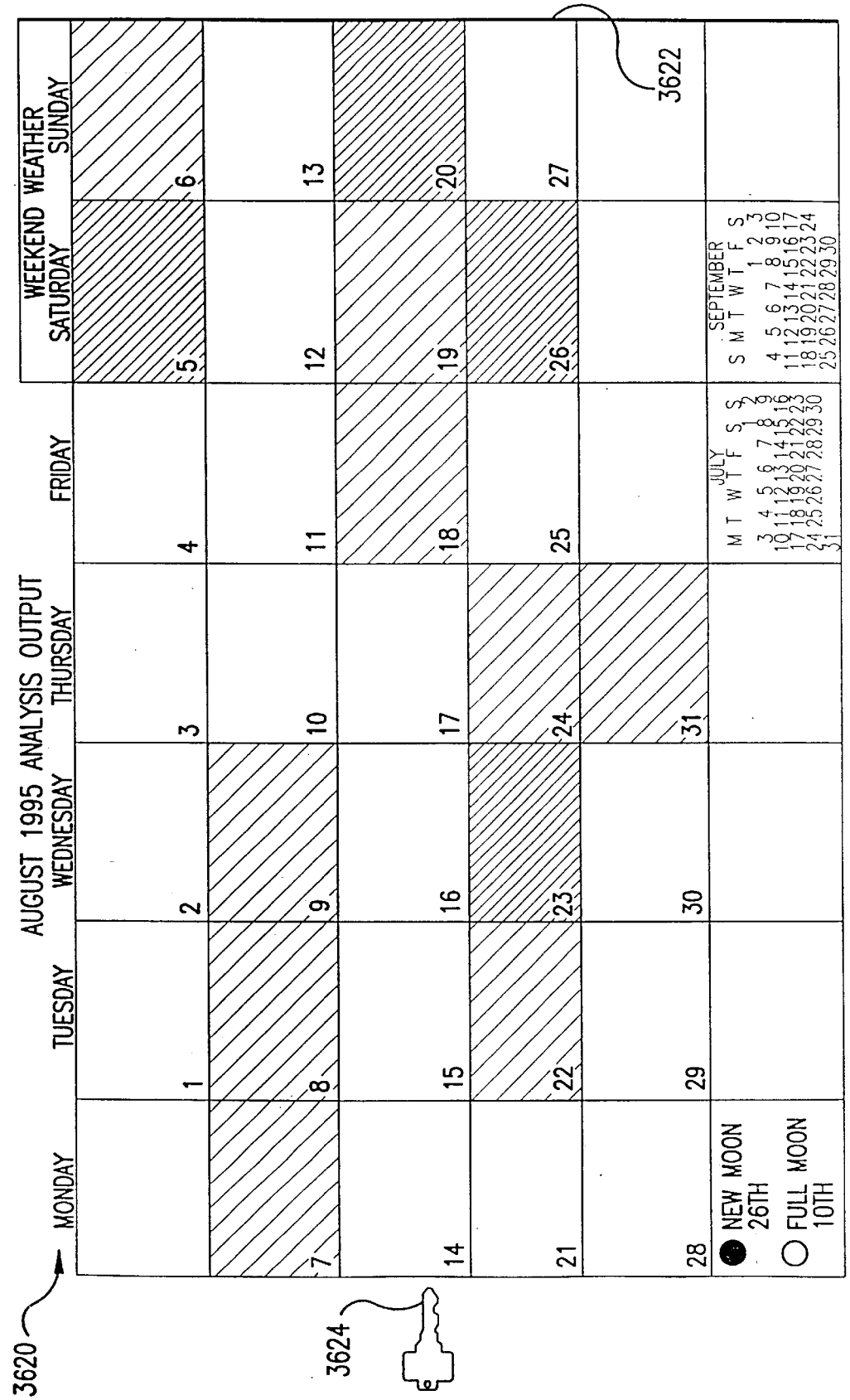

FIG. 36B illustrates the calendar format 3620 when displayed in conjunction with weather optimization 2012. The calendar format 3620 presents information for a user-selected location. An icon is displayed for each day. These icons are the same that are used in the decision view window 2802 (FIG. 28). A legend for these icons can be viewed by pressing an icon button 3624.

Scope of the Invention

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

For example, for illustrative purposes, the present invention has been described above in the context of the retail industry. However, the invention is not limited to this embodiment. The present invention is well suited, adapted, and intended for use with any endeavor and/or industry and/or market that is potentially or actually impacted by weather. This includes, but is not limited to, retail products and services, manufacturing/production (i.e., construction, utilities, movie production companies, advertising agencies, forestry, mining), transportation, the entertainment industry, the restaurant industry, etc.

Example Alternative Embodiment—Consumer Weather Planner

Introduction

While the above description has focused on business applications such as the retail industry, the present invention also contemplates a consumer application. Like business activities, such as activities of retail companies, activities of individual consumers are affected by the weather. Based on the forecasted weather, a consumer'planned special event (e.g., golfing, skiing, fishing, boating, vacations, family reunions, weddings, honeymoons, and the like) will be affected much like a retailer as described above. The present invention thus contemplates a consumer weather planner system 4300 (similar to forecasting system 102) as shown in FIG. 43.

Figure 43:
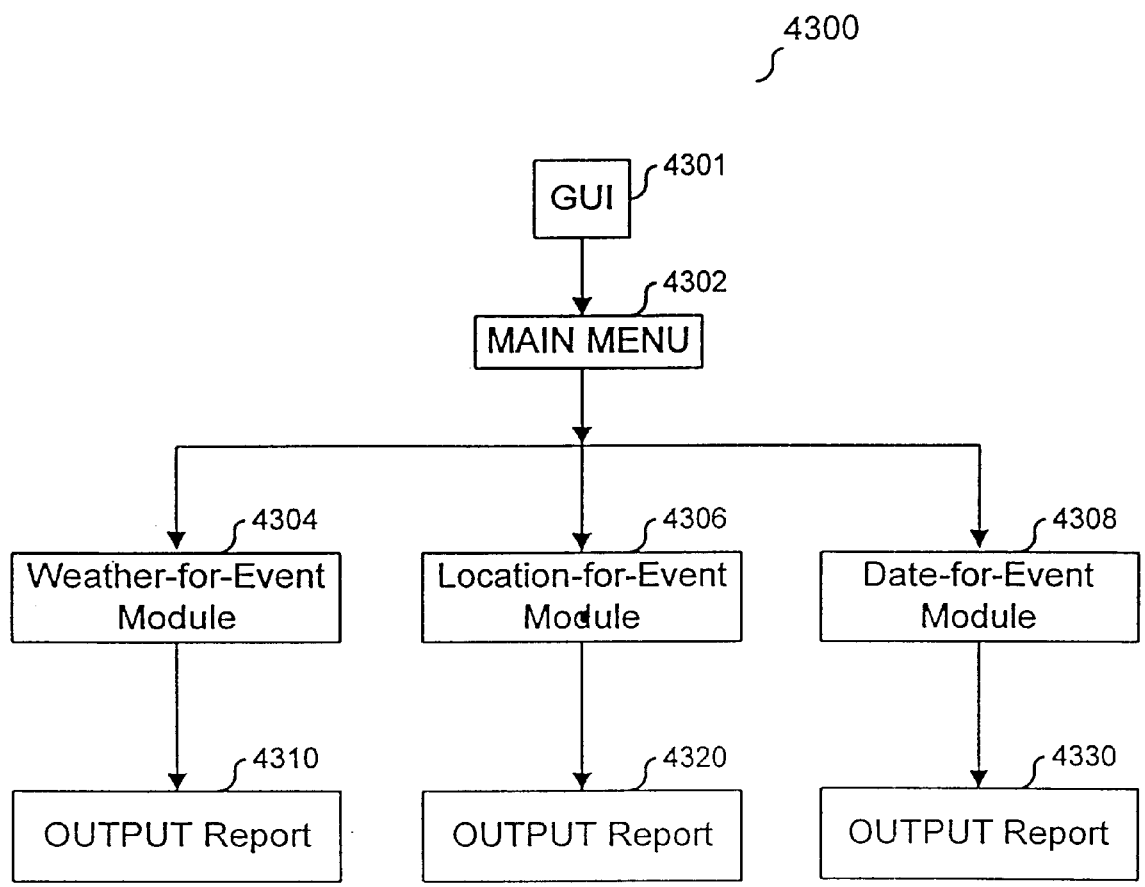
FIG. 43 is a flowchart depicting the preferred operation and control flow of the consumer forecast system of the present invention.

Referring to FIG. 43, the manner in which consumers (users 402) may navigate through functions and services provided by the consumer weather planner system 4300 according to an embodiment of the invention is shown. Consumer weather planner system 4300 may run on a computing environment similar to computer 202. The consumer weather planner system 4300 provides a GUI 4301 (similar to GUI 110) so that it may be accessible and customizable by a consumer directly on a desktop computer, via a World Wide Web page over the Internet (i.e., through on-line services), or accessible via an Intranet. In an alternative embodiment, it maybe accessible via telephone services or the like. It should be understood that the control flows shown in FIG. 43 are presented for example purposes only. The GUI 4301 of the present invention is sufficiently flexible and configurable such that users 402 may navigate through the system 4300 in ways other than that shown in FIG. 43.

If a consumer is planning a special future event such as a family reunion, a wedding or vacation, consumer weather forecast system 4300 offers a reliable way to assure "nice" weather. Consumer weather forecast system 4300 may be the basis of an advisory service, providing not just forecasts, but recommendations and advice to help consumers make better planning decisions through detailed, reliable and customized forecasts up to one year in advance.

In a preferred embodiment, consumer weather planner system 4300 provides three modules: a Weather-for-Event module 4304; a Location-for-Event module 4306; and a Date-for-Event module 4308. These three modules, accessible via a main menu 4302 linked to the GUI 4301, are first described briefly below and then in detail with reference to FIGS. 44, 46 and 48, respectively.

Weather-for-Event module 4304 may be used by a user 402, if they are sure of where they will be and when they will be there, to find the weather for their event. Consumer weather planner system 4300 causes a complete report 4310 to be outputted, which includes graphics on the conditions the user 402 may expect for their future event.

Location-for-Event module 4306 may be used by a user 402, if they know when they want to go (i.e., the time period) and the kind of weather they want. In a preferred embodiment, consumer weather planner system 4300 lets the user 402 choose three locations and then causes a report 4320 to be outputted with text and custom graphics reporting which one of the three inputted locations will have the kind of weather the user 402 desires.

Date-for-Event module 4308 may be used by a user 402, if they are sure of where they're going to be and what kind of weather they desire. Consumer weather planner system 4300 causes a report 4330 to be outputted to the user 402 that will assist in determining the best time for the future event.

Definitions

Before further describing the three modules of the consumer weather planner system 4300, the following terms used herein below (especially within the GUI 4301) are first defined. In the event that a term defined herein has a more common meaning or usage, the definition provided herein should be taken as the intended meaning.

Cold—The term most often used during the months from late fall to early spring (depending on the geographic location) to describe a period with temperatures that are below the seasonal (normal) range.

Precipitation—Any or all forms of water particles, whether liquid or solid, that fall from the atmosphere. The term includes such forms as drizzle, rain, showers, snowfall, snow pellets or grains, ice crystals, and hail.

Seasonable—In keeping with, or appropriate to, the time or season; timely; about normal or routine for the time of the year. Typical weather elements (temperature, precipitation, etc.) for a given location at a specific time (daily, weekly, monthly, yearly, etc.).

Warm—Temperatures that are above the seasonal (normal) range for a given location at a specific period of time.

Weather-for-Event Module

Figure 44:
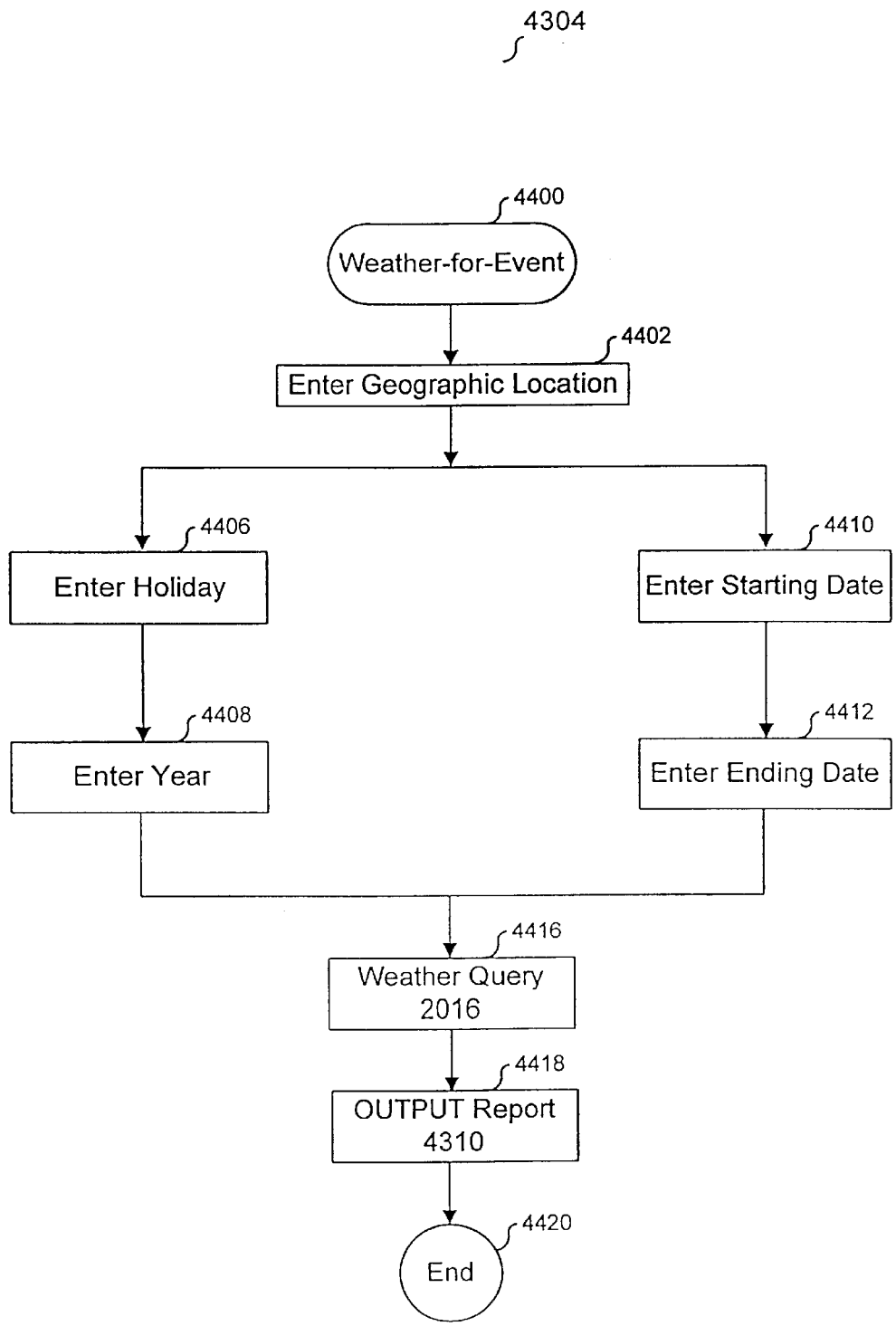
FIGS. 44, 46 and 48 are flowcharts illustrating the detailed operation of the modules of the consumer forecast system of the present invention.

Referring to FIG. 44, a flowchart illustrating the detailed operation of the Weather-for-Event module 4304 is shown.

Weather-for-Event module 4304, after being selected via the main menu 4302, begins at step 4400 with control passing immediately to step 4402. In step 4402, the user 402 is prompted to enter a geographic location. The geographic location may be identified as a state or province, a city or town or by zip code. The zip code will override any entered state or city selections. In alternate embodiments, the geographic location may also be specified, for example, from a list of known ski resorts, Caribbean resorts, national parks, and the like. An exemplary GUI screen for allowing the user 402 to enter the desired geographic location is shown in FIG. 50A.

After entering the geographic location, the user 402 is presented with a choice of how to enter the specified dates for the event (i.e., the time period). The first option is to enter a holiday (step 4406) and then enter a year for the holiday (step 4408). In a preferred embodiment, Weather-for-Event module 4304 will eventually generate a weather report for the holiday, but anticipates a possible greater/lesser than three days on either side of the holiday. Alternately, instead of entering a holiday and a year, the user 402 may enter a specific starting date (step 4410) and then a specific ending date (step 4412). The starting date and ending date are specified in the conventional terms of month, day and year. An exemplary GUI screen for allowing the user 402 to enter the desired time period, via either option, is shown in FIG. 50B.

Consumer weather planner system 4300 then proceeds to step 4416. In step 4416, the weather query step 2016 is performed as described above with reference to FIG. 20. Using the inputs entered by the user (i.e, steps 4402–4412), the weather query step 4416 searches for the specified weather for the specified time period within weather forecast database 312, as also described above. In step 4418, an output report 4310 is generated. Weather-for-Event module 4304 is thus completed as indicated by step 4420.

Referring to FIG. 45, an exemplary output report 4310 for the Weather-for-Event module 4304 is shown. The criteria entered from steps 4402–4412 are summarized on a first portion 4502 of a first page of the report 4310. Report 4330 also includes a detailed weather plan for the time period and geographic location (second portion 4504) according to the weather query search 2016 results.

It should be understood that the report 4330 shown in FIG. 45, as well as reports 4320 and 4330 described below, are presented for example purposes only. The GUI 4301 of the present invention is sufficiently flexible and configurable such that users 402 may receive reports in other formats including graphs, charts, and the like.

Location-for-Event Module

Figure 46:
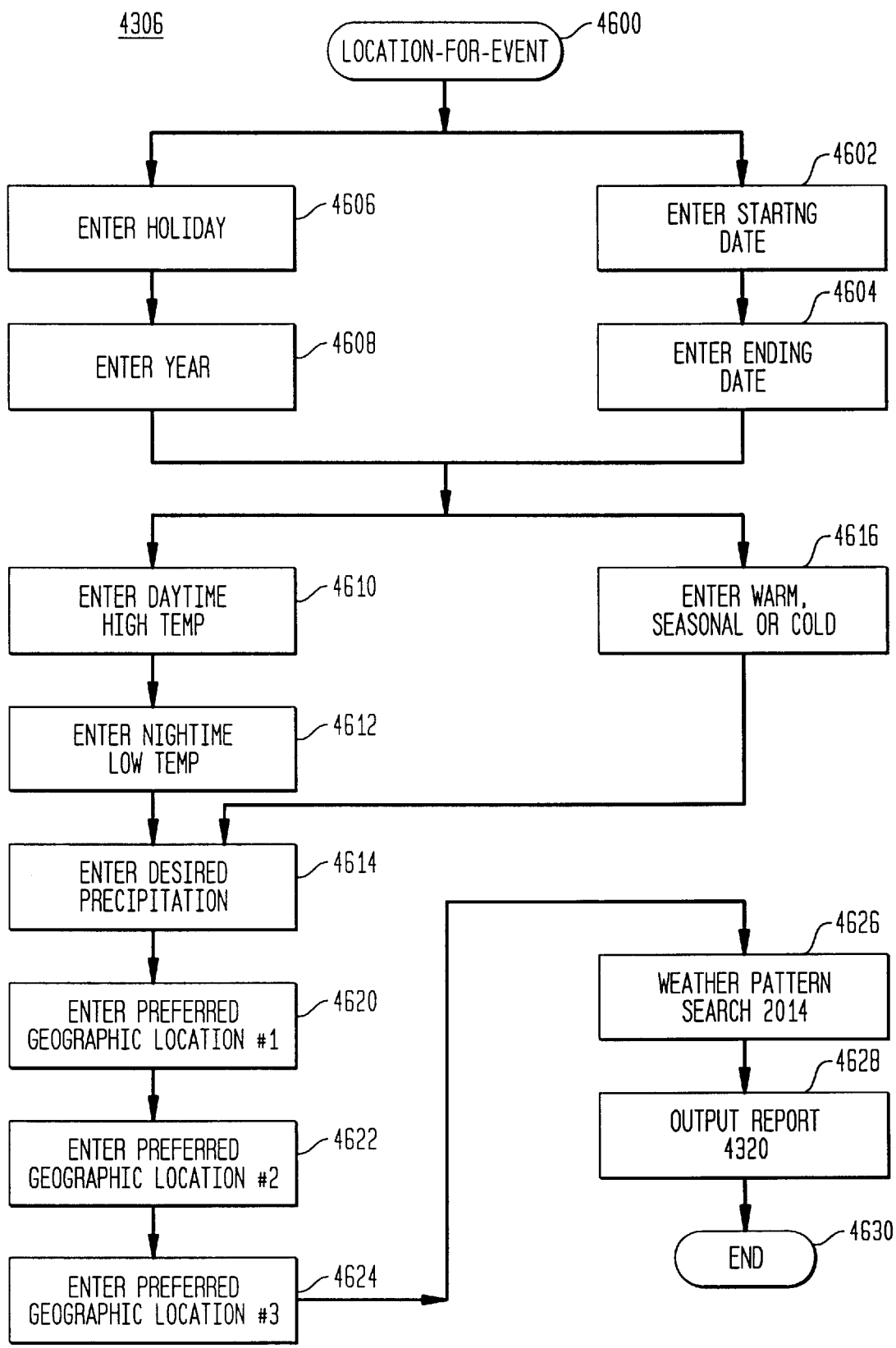

Referring to FIG. 46, a flowchart illustrating the detailed operation of the Location-for-Event module 4306 is shown. Location-for-Event module 4306, after being selected via the main menu 4302, begins at step 4600 with control passing immediately to step 4602 or to step 4606. In steps 4602–4608, the user 402 is presented with a choice of how to specify the time period for their event. The user 402 may enter a starting date and an ending date in steps 4602 and 4604, respectively. An alternate option is for the user 402 to enter a holiday and a year of the holiday in steps 4606 and 4608, respectively. The exemplary GUI screen for allowing the user 402 to enter the desired time period, as shown in FIG. 50B and described above, may also be used in the Location-for-Event module 4306.

After using one of the alternate methods to specify the time period for the event, the user 402 then again has a choice of how to enter the specific weather they desire for their event. In step 4616, the user 402 may simply enter warm, seasonable or cold to specify the type of weather they desire. Alternately, in steps 4610 and 4612, the user 402 may enter a daytime high temperature and a nighttime low temperature, respectively. An exemplary GUI screen for allowing the user 402 to enter the desired weather, via either option, is shown in FIG. 50C.

In step 4614, the user 402 is prompted to select the desired precipitation level. The level may be significant rain, non-significant rain, significant snow, non-significant snow, non-significant rain or snow, or any precipitation. Other ways to enter weather criteria can also be used, such as the techniques discussed elsewhere herein. Location-for-Event module 4306 then proceeds to step 4620. In step 4620, the user 402 enters their first choice for a preferred geographic location. The entering of the preferred geographic location is similar to that described with reference to FIG. 44 (step 4402) above. In step 4622, the user 402 enters their second choice for a preferred geographic location and, in step 4624, the user 402 enters their third choice for a preferred geographic location. The exemplary GUI screen for allowing the user 402 to enter the desired geographic location, as shown in FIG. 50A, may also be used (i.e., three iterations) for the Location-for-Event module 4306.

Figure 47A:
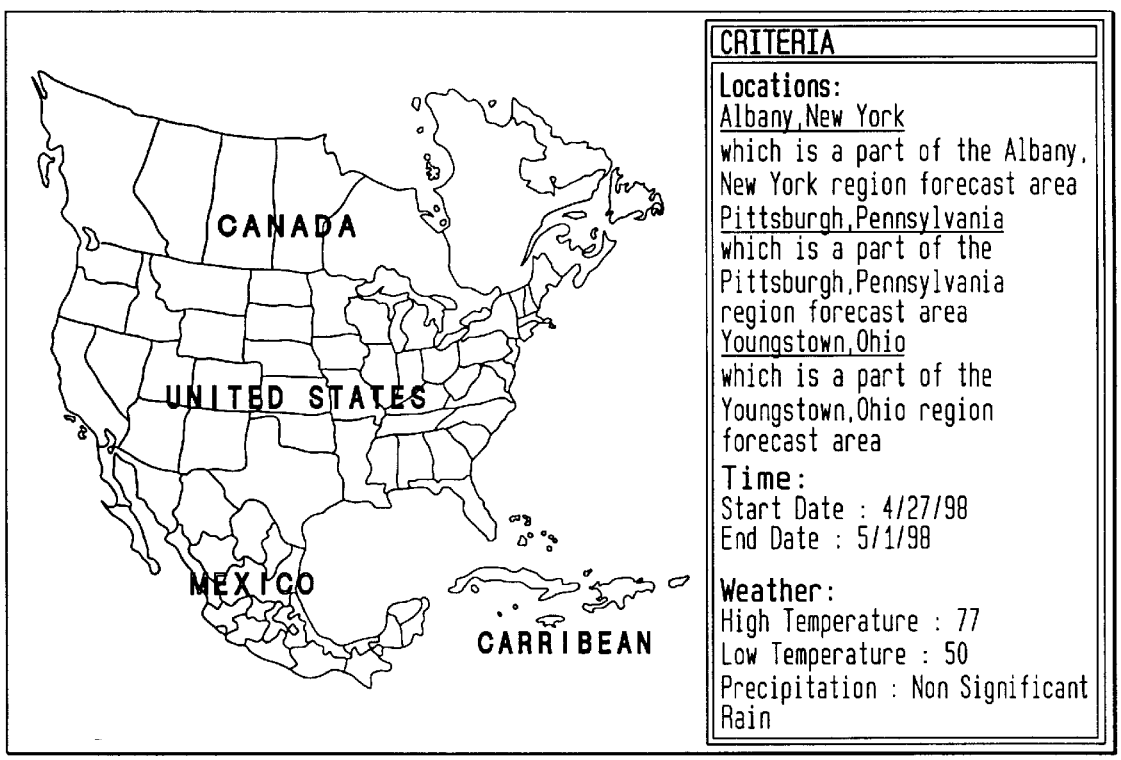

Location-for-Event 4306 then proceeds to step 4626, where weather pattern search 2014 is performed. Weather pattern search 2014 functions as described above with reference to FIG. 20 using the future data within weather patterns database 308. After the weather pattern search 2014 is performed, an output report 4320 is generated. Output report 4320 is shown in FIGS. 47A and 47B. Location for event 4306 then ends as indicated by step 4630.

Referring to FIGS. 47A and 47B, an exemplary output report 4320 for the Location-for-Event module 4306 is shown. In FIG. 47A, the criteria entered from steps 4602–4824 are summarized on a first page of the report 4320. In FIG. 47B, a detailed weather plan is given on a second page of the report 4320 for the location which ranks first according to the weather pattern search 2014 results. It should also be noted that the output report 4320 may return an empty calendar if no location matches the criteria selected by the user 402.

Date-for-Event Module

Figure 48:
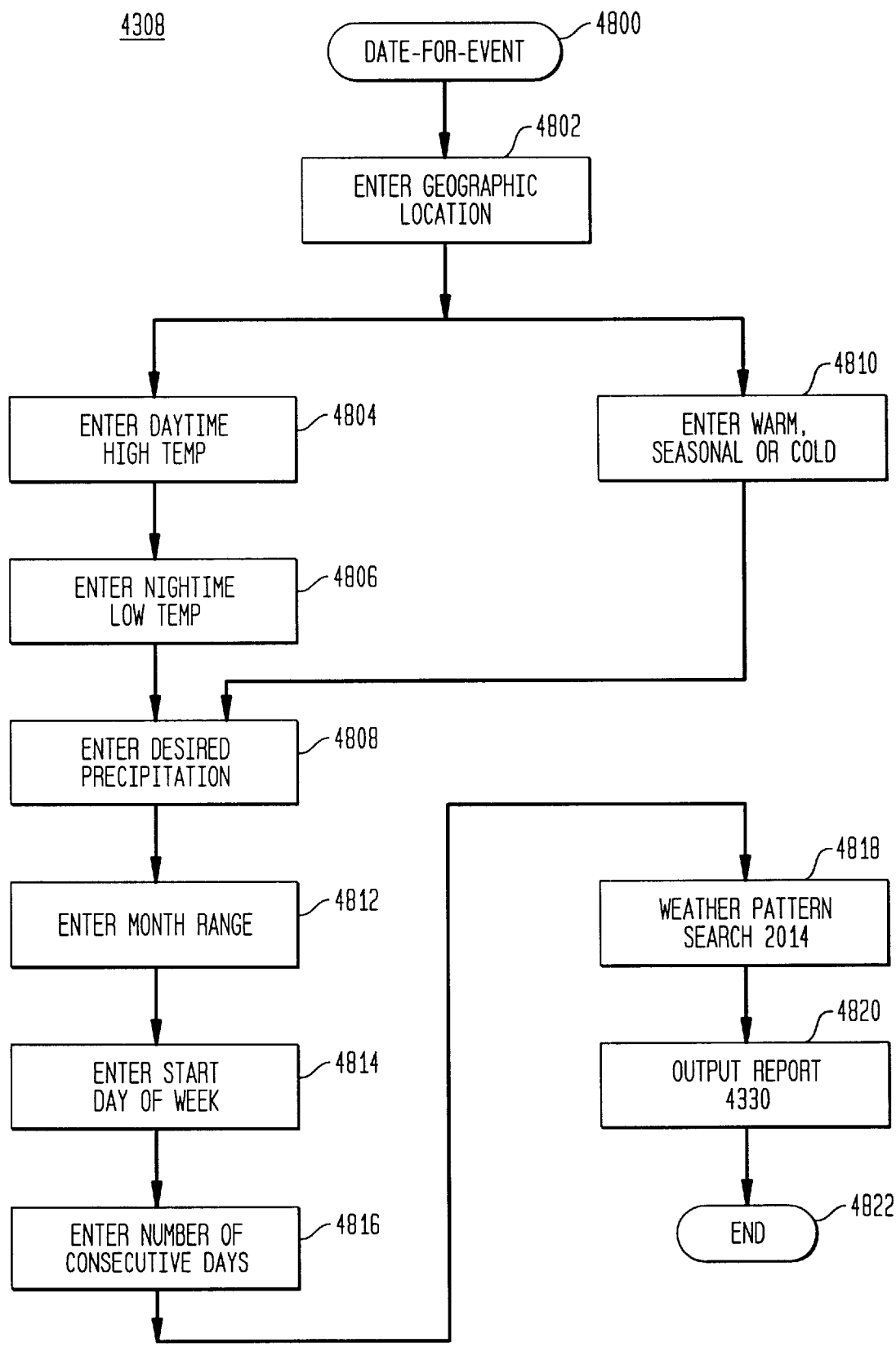

Referring to FIG. 48, a flowchart illustrating the detailed operation of the Date-for-Event module 4308 is shown. Date-for-Event module 4308, after being selected via the main menu 4302, begins at step 4800 with control passing immediately to step 4802. In step 4802, the user 402 enters their desired geographic location. Step 4802 functions as described above with reference to FIGS. 44 (step 4402) and the GUI screen of FIG. 50A.

After entering a preferred geographic location, the user 402 faces a choice. In step 4810, the user 402 may either enter warm, seasonal, or cold as their desired weather. Alternately, the user 402 may enter a daytime high temperature and a nighttime low temperature as indicated by steps 4804 and 4806, respectively. In step 4808, the user 402 is prompted to select the desired precipitation level. Steps 4804–4810 function in the same manner as steps 4610–4614, respectively, as described above with reference to FIG. 46. Further, the exemplary GUI screen for allowing the user 402 to enter the desired weather, as shown in FIG. 50C, may also be used for the Date-for-Event module 4308.

After the user 402 specifies the type of weather they desire, either by steps 4804–4806, or by step 4810, the user 402 must specify a desired date range (i.e., time period). In step 4812, the user 402 is asked to enter a month range (i.e., one month or a plurality of months). In a preferred embodiment of the present invention, the user 402 may select a month range of either one, two or three consecutive months in which the weather pattern search 2014 will eventually search.

Proceeding to step 4814, the user 402 is asked to enter the day of the week in which to start searching. The day of the week may be specified by any day (i.e., Sunday through Saturday). In step 4816, the user 402 is asked to enter a number of consecutive days in which to search. In a preferred embodiment of the present invention, the number of consecutive days in which to search is limited to ten days (for simplicity of outputting report 4330). An exemplary GUI screen for allowing the user 402 to enter the desired date range (steps 4812–4816) is shown in FIG. 50D.

In step 4814, weather pattern search 2014 functions as described above with reference to FIG. 20 using the future data within weather patterns database 308. Date-for-event module 4308 then proceeds to step 4820. In step 4820, output report 4330 is generated. Date-for-event module 4308 then ends as indicated by step 4822.

Figure 49A:
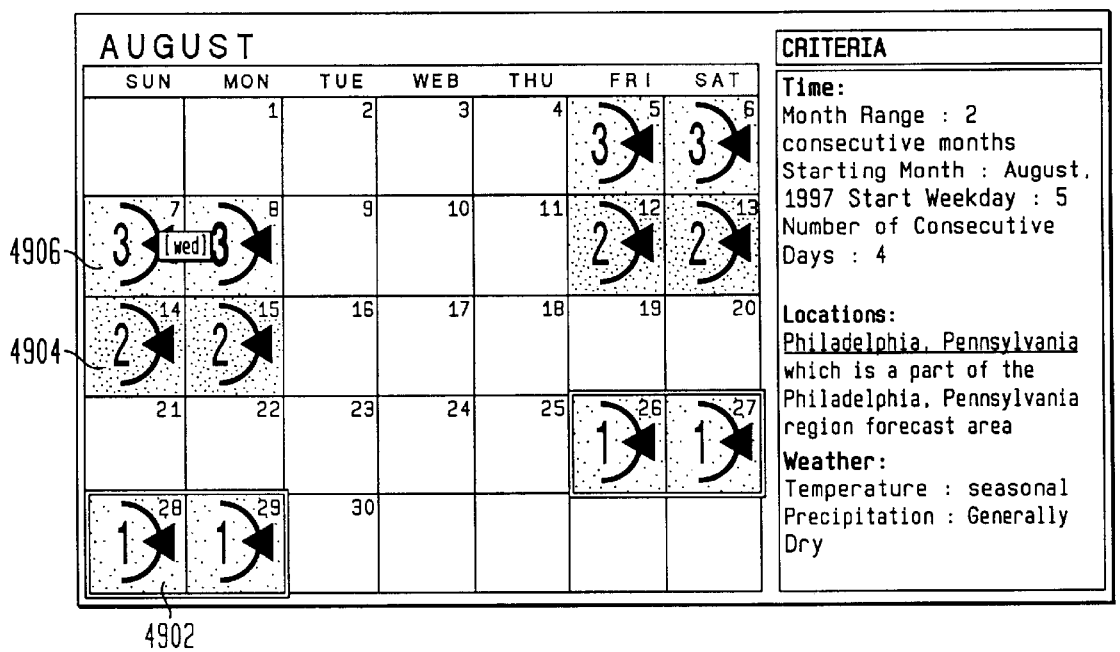
Figure 49B:
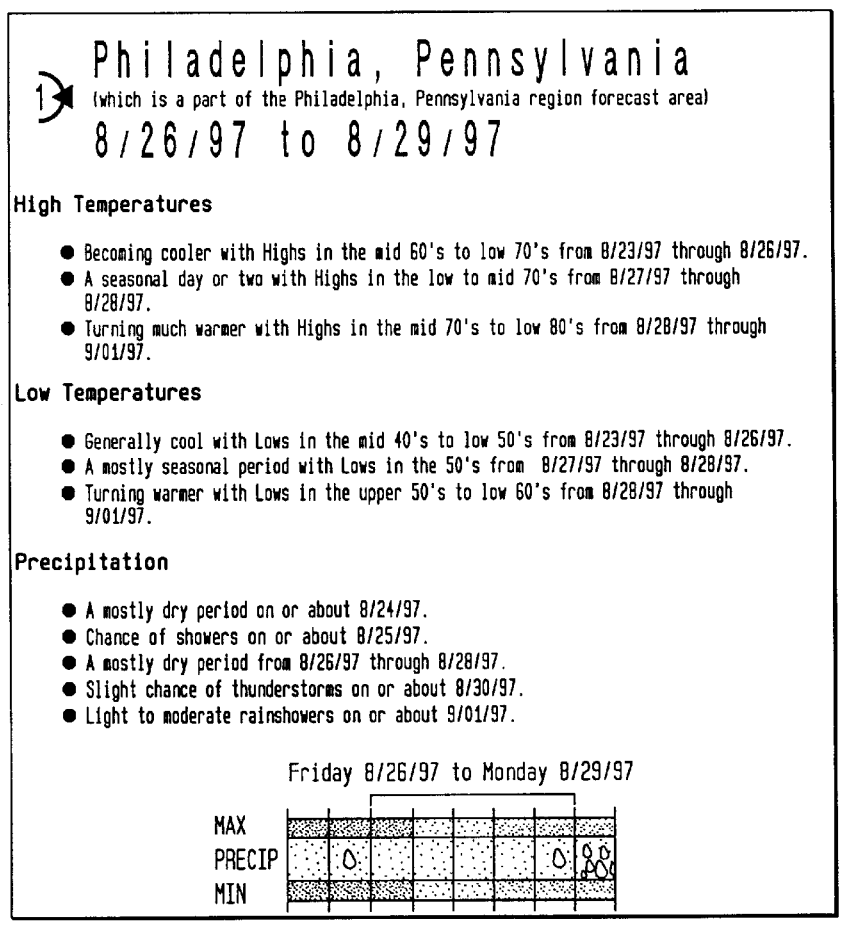

Referring to FIGS. 49A and 49B, an exemplary output report 4330 for the Date-for-Event module 4308 is shown. In FIG. 49A, the criteria entered from steps 4802–4816 are summarized on the right side of a first page of the report 4330. The rankings (i.e., first 4902, second 4904, and third 4906), which are explained in detail below, which are returned by the weather pattern search 2014 results are reflected in a calendar on the left side of the first page of the report 4330. In FIG. 49B, a detailed weather plan is given on a second page of the report 4330 for the time period which ranks first according to the weather pattern search 2014 results. It should also be noted that the output report 4330 may return an empty calendar if no date matches the criteria selected by the user 402.

In an alternate embodiment of the present invention, the consumer weather planner system 4300 will prompt the user 402 for the specific special event (e.g., golfing, skiing, wedding, etc.) they are planning. In such an embodiment, each of the output reports 4310, 4320 and 4330 may be customized accordingly.

Weather Pattern Search for Location-for-Event and Date-for-Event

As mentioned above, Location-for-Event module 4306 and Date-for-Event module 4308 make use of weather pattern search 2014. Weather pattern search 2014 functions as described above with reference to FIG. 20 using the future data within weather patterns database 308. However, consumer weather planner system 4300 employs a 24 hour "leeway" during the Location-for-Event module 4306 and the Date-for-Event module 4308. That is, the time period entered by the user is modified by ±1 day. Thus, an inputted time period of Jul. 10, 1999 to Jul. 13, 1999 (e.g., steps 4602–4604) will actually be searched as Jul. 9, 1999 to Jul. 14, 1999 in the weather forecast data 312.

Furthermore, if a user 402 desires "warm" days over a four day period, the weather pattern search 2014 has to resolve "conflicts" over competing like weather (i.e., warm) periods within a month. That is, a situation may occur where a consecutive number of seven warm days and a consecutive number of five warm days are separated by a few cool days. To resolve such conflicts, the period of seven days is given a greater weight in order to arrive at the rankings shown, for example, in FIG. 49A.

To arrive at rankings, consumer weather planner system 4300 preferably uses a weather period of at least two consecutive days with temperatures matching the desired weather (i.e., warm). In a preferred embodiment, weight assignments are then made to each of the days using a "pyramid" fashion starting from the tail ends being assigned the value of 1. For a four day period (which is turned into a six day period due to the ±1 day leeway), each day is weighted from the center to the tails as 1, 2, 3, 3, 2 and 1. Each day's weight reflects the number of warm days surrounding it. The weight for the period is then the sum total for the interval (i.e., 12). So when a user desires a warm period the Location-for-Event module 4306 and the Date-for-Event module 4308 can evaluate like (competing) warm periods using the weights. For example, the weight of 12 may be compared to smaller or larger warm periods so it can be ranked in the output reports 4320 and 4330. Ties in the rankings are simply reported in the output reports 4320 and 4330. As will be apparent to one skilled in the relevant art(s), the same pyramid weighting heuristic can be used for precipitation.

In the above, example values have been provided for a number of elements, such as but not limited to intervals, time period offsets, periods, etc. These values have been provided for illustrative purposes only. Thus, the invention is not limited to these values.

What is claimed is:

1. A computer implemented method for providing weather planning services, comprising the steps of:

(1) receiving a future time period input for a future event;

(2) receiving a preferred weather pattern input for said future event;

(3) receiving a list of preferred geographic locations for said future event; and (4) causing a report to be displayed on a display device listing dates, within said future time period, that satisfy said preferred weather pattern, for each of said preferred geographic locations, wherein causing said report to be displayed comprises the steps of:

(a) generating a weather plan for each day of said future time period for each of said preferred geographic locations;

(b) displaying on said display device said weather plan to a user; and (c) displaying on said display device a ranking for each of said list of preferred geographic locations, wherein said ranking is based on said weather plan;

whereby said report is used by said user to select the geographic location for said future event.

2. The method of claim 1, wherein step (4) further comprises the step of:

(d) resolving conflicts among said rankings by weighting said preferred weather pattern input for each day of said future time period using said weather plan.

3. A computer implemented method for providing weather planning services, comprising the steps of:

(1) receiving a preferred weather pattern input for a future event;

(2) receiving a future time period input for said future event;

(3) receiving a geographic location input for said future event; and (4) causing a report to be displayed on a display device that lists dates, within said future time period, that satisfy said preferred weather pattern for said geographic location, wherein causing said report to be displayed comprises the steps of:
(a) generating a weather plan for each day of said future time period for said geographic location;
(b) displaying on said display device said weather plan to a user; and
(c) displaying on said display device a ranking for each of said dates, wherein said ranking is based on said weather plan;
whereby said report is used by said user to select a date for said future event.

4. The method of claim 3, wherein step (4) further comprises the step of:
(d) resolving conflicts among said rankings by weighting said preferred weather pattern input for each day of said future time period using said weather plan.

5. A computer program product comprising a computer usable medium having computer readable program code means embodied in said medium for causing an application program to execute on a computer that provides weather planning services, said computer readable program code means comprising:
first computer readable program code means for causing the computer to receive a future time period input for a future event;
second computer readable program code means for causing the computer to receive a preferred weather pattern input for said future event;
third computer readable program code means for causing the computer to receive a list of preferred geographic locations for said future event; and
fourth computer readable program code means for causing the computer to display a report that list dates, within said future time period, that satisfy said preferred weather pattern, for each of said preferred geographic locations, wherein said fourth computer readable program code means comprises:
fifth computer readable program code means for causing the computer to generate a weather plan for each day of said future time period for each of said preferred geographic locations;
sixth computer readable program code means for causing the computer to display said weather plan to a user; and
seventh computer readable program code means for causing the computer to display a ranking for each of said list of preferred geographic locations, wherein said ranking is based on said weather plan;
whereby said report is used by said user to select the geographic location for said future event.

6. The computer program product of claim 5, wherein said fourth computer readable program code means further comprises:
eighth computer readable program code means for causing the computer to resolve conflicts among said rankings by weighting said preferred weather pattern input for each day of said future time period using said weather plan.

7. A computer program product comprising a computer usable medium having computer readable program code means embodied in said medium for causing an application program to execute on a computer that provides weather planning services, said computer readable program code means comprising:
first computer readable program code means for causing the computer to receive a preferred weather pattern input for a future event;
second computer readable program code means for causing the computer to receive a future time period input for said future event;
third computer readable program code means for causing the computer to receive a geographic location input for said future event; and
fourth computer readable program code means for causing the computer to display a report that lists dates, within said future time period, that satisfy said preferred weather pattern for said geographic location, wherein said fourth computer readable program code means comprises:
fifth computer readable program code means for causing the computer to generate a weather plan for each day of said future time period for said geographic location;
sixth computer readable program code means for causing the computer to display said weather plan to a user; and
seventh computer readable program code means for causing the computer to display a ranking for each of said dates, wherein said ranking is based on said weather plan;
whereby said report is used by said user to select a date for said future event.

8. The computer program product of claim 7, wherein said fourth computer readable program code means further comprises:
eighth computer readable program code means for causing the computer to resolve conflicts among said rankings by weighting said preferred weather pattern input for each day of said future time period using said weather plan.

* * * * *

UNITED STATES PATENT AND TRADEMARK OFFICE
CERTIFICATE OF CORRECTION

PATENT NO. : 6,584,447 B1
DATED : June 24, 2003
INVENTOR(S) : Fox et al.

It is certified that error appears in the above-identified patent and that said Letters Patent is hereby corrected as shown below:

Title page,
Item [56], References Cited, FOREIGN PATENT DOCUMENTS, please insert the following:
JP 4-135271
JP 4-353970
JP 5-189406
JP 6-76161
JP 6-149833
OTHER PUBLICATIONS, please replace "Mithcell" with -- Mitchell --.

Column 7,
Line 12, replace "34" with -- 34, --.

Column 18,
Line 13, replace "As" with -- as --.

Signed and Sealed this

Thirtieth Day of March, 2004

JON W. DUDAS
*Acting Director of the United States Patent and Trademark Office*